(12) United States Patent
Nishimura et al.

(10) Patent No.: US 7,760,294 B2
(45) Date of Patent: Jul. 20, 2010

(54) LIQUID CRYSTAL DEVICE AND ELECTRONIC APPARATUS

(75) Inventors: Joji Nishimura, Matsumoto (JP); Takaya Uehara, Matsumoto (JP)

(73) Assignee: Sony Corporation, Tokyo (JP)

( * ) Notice: Subject to any disclaimer, the term of this patent is extended or adjusted under 35 U.S.C. 154(b) by 418 days.

(21) Appl. No.: 11/987,368

(22) Filed: Nov. 29, 2007

(65) Prior Publication Data

US 2008/0218669 A1    Sep. 11, 2008

(30) Foreign Application Priority Data

Mar. 6, 2007   (JP) .............................. 2007-055172

(51) Int. Cl.
*G02F 1/1335*   (2006.01)
(52) U.S. Cl. ................. 349/110; 349/143; 349/144
(58) Field of Classification Search ................. 349/110, 349/111
See application file for complete search history.

(56) References Cited

U.S. PATENT DOCUMENTS

| | | | |
|---|---|---|---|
| 4,869,576 A * | 9/1989 | Aoki et al. ................... | 349/143 |
| 6,577,366 B1 | 6/2003 | Kim et al. | |
| 7,061,562 B2 | 6/2006 | Kim et al. | |
| 7,227,605 B2 | 6/2007 | Kim et al. | |
| 7,518,685 B2 | 4/2009 | Kim et al. | |
| 2005/0195353 A1 | 9/2005 | Park et al. | |

FOREIGN PATENT DOCUMENTS

| | | |
|---|---|---|
| JP | A-2000-122080 | 4/2000 |
| JP | A 2003-043525 | 2/2003 |
| JP | A 2005-107454 | 4/2005 |
| JP | A 2005-202034 | 7/2005 |
| JP | A 2005-227482 | 8/2005 |
| JP | A-2005-258410 | 9/2005 |
| JP | A 2005-345757 | 12/2005 |
| JP | A 2006-078540 | 3/2006 |
| JP | A 2006-227338 | 8/2006 |
| JP | A 2006-234870 | 9/2006 |
| JP | A 2006-234871 | 9/2006 |
| JP | A 2006-252529 | 9/2006 |
| JP | A 2006-293410 | 10/2006 |
| JP | A 2006-338051 | 12/2006 |

* cited by examiner

*Primary Examiner*—Richard H Kim
(74) *Attorney, Agent, or Firm*—K&L Gates LLP

(57) ABSTRACT

The invention provides a liquid crystal device including: a pair of substrates; a liquid crystal layer having a negative dielectric anisotropy; a pixel electrode; a counter electrode, the counter electrode being opposed to the pixel electrode; a vertical alignment film that aligns liquid crystal molecules of the liquid crystal layer in a direction in which the long axes of the liquid crystal molecules are oriented perpendicular to the pair of substrates. The pixel electrode is made up of island-pattern sub pixel elements each two adjacent ones of which are connected to each other via a connection portion having a width narrower than that of the sub pixel element. In addition, the light shielding film is formed, on one of the pair of substrates, in each region not corresponding to the connection portion between each two of the sub pixel elements that are adjacent to each other.

11 Claims, 20 Drawing Sheets

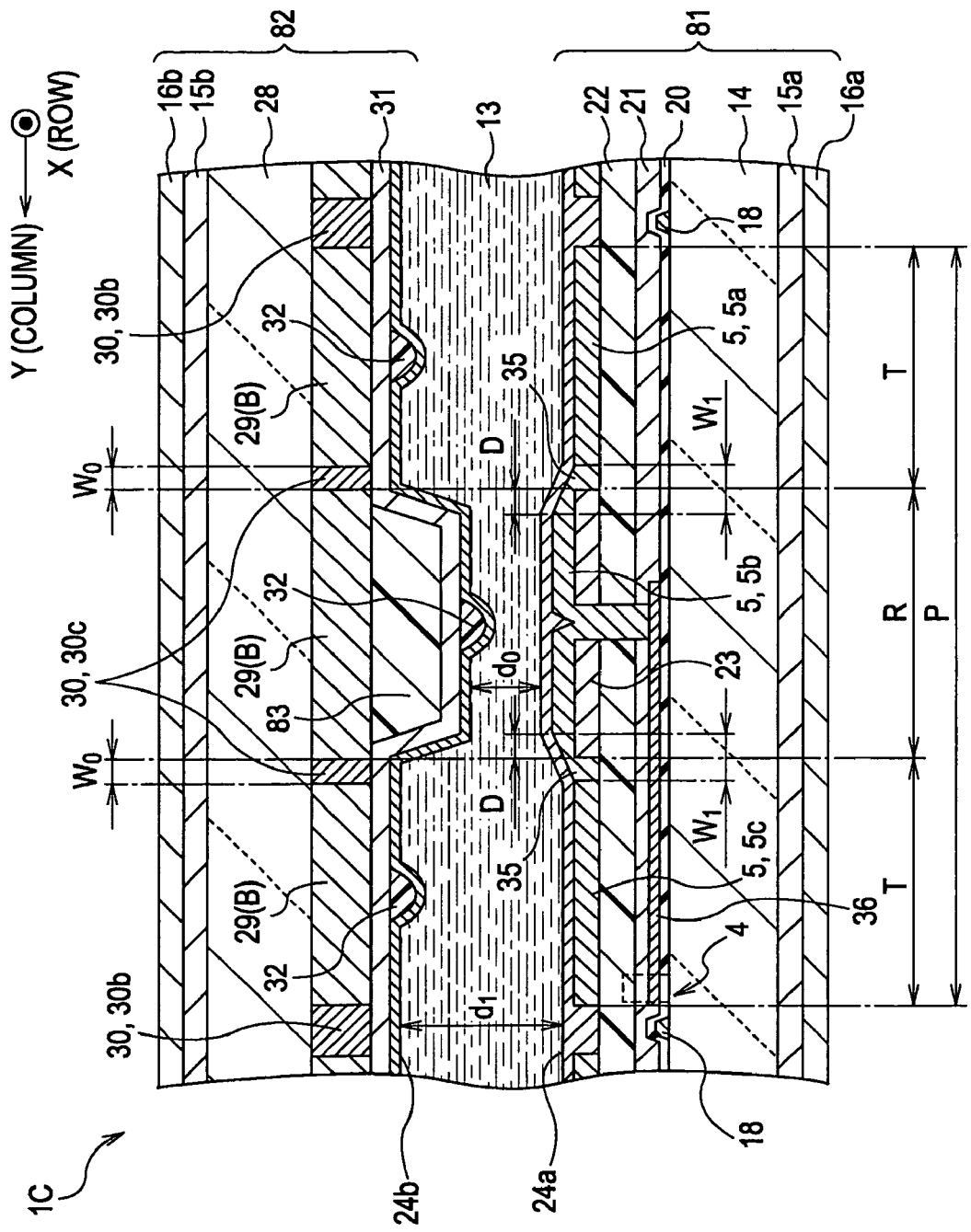

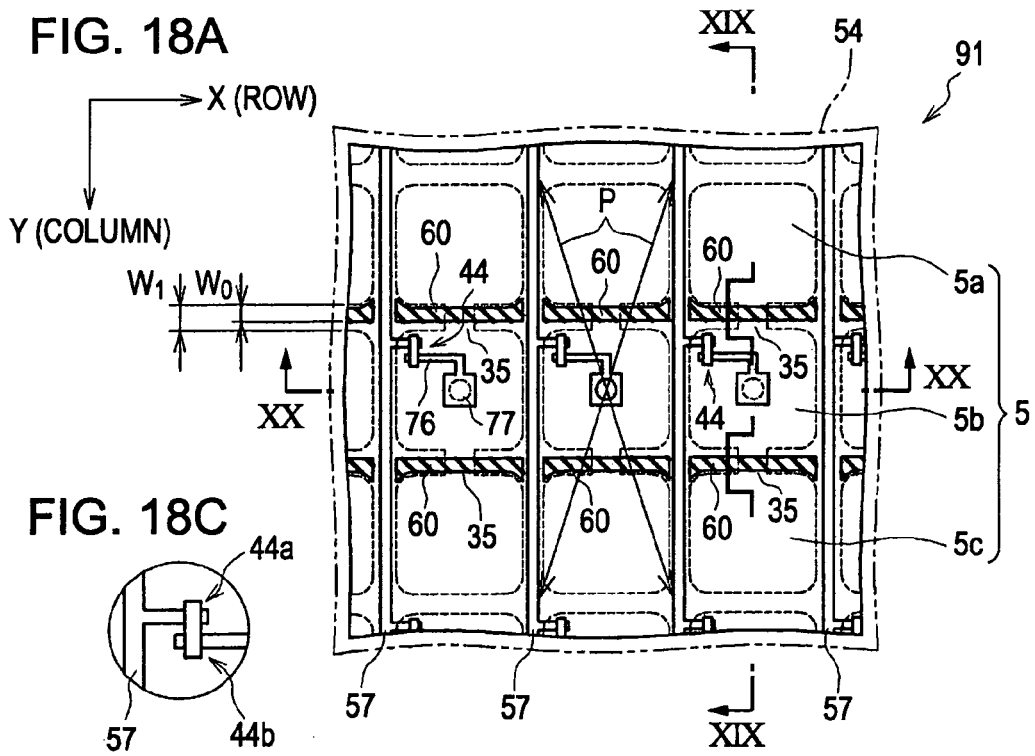
FIG. 18A
FIG. 18C
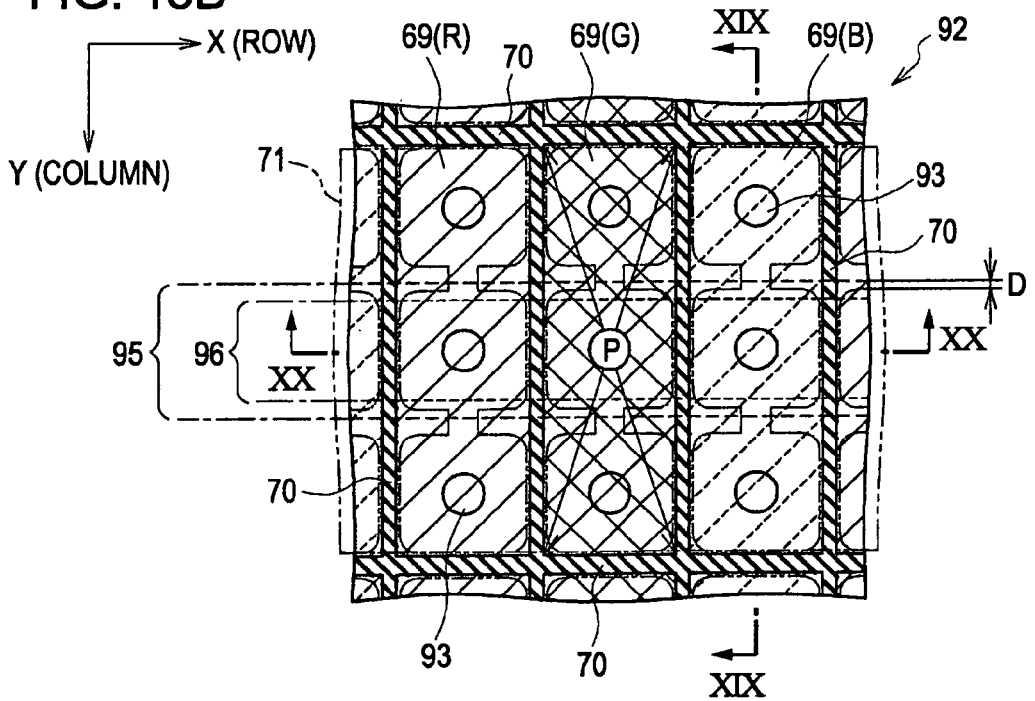
FIG. 18B

LIQUID CRYSTAL DEVICE AND ELECTRONIC APPARATUS

The entire disclosure of Japanese Patent Application No. 2007-055172, filed Mar. 6, 2007 is expressly incorporated by reference herein.

BACKGROUND

1. Technical Field

The present invention relates to a liquid crystal device and an electronic apparatus. More particularly, the invention relates to a technique for achieving a high contrast and a wide viewing angle in a homeotropic liquid crystal device that uses liquid crystal having vertical alignment. The invention further relates to an electronic apparatus that is provided with a liquid crystal device having such enhanced features.

2. Related Art

These days, liquid crystal devices are used in a variety of electronic apparatuses such as mobile phones, hand held terminals, personal digital assistants (PDA), and the like. As one example of applications thereof, liquid crystal devices are used as display devices of electronic apparatuses that display various kinds of images. In the operation of a liquid crystal device, a voltage that is applied to a liquid crystal layer thereof is controlled on a pixel-by-pixel basis so as to control the alignment, that is, orientation, of liquid crystal molecules present in the liquid crystal layer. Light that transmits through the liquid crystal layer is modulated for each pixel by means of the alignment control of the liquid molecules. Modulated light is supplied to optical component layers such as a light polarization layer, a phase difference retardation layer, though not limited thereto, so as to display images.

Liquid crystal devices have a variety of types of operation modes. A twisted nematic (TN) mode and a vertically aligned (VA) mode are typical examples of operation modes thereof that are known in the related art. In the TN mode liquid crystal device, liquid crystal molecules are aligned in a direction that is substantially parallel to the surface(s) of a (pair of) substrate(s) when an OFF driving voltage is supplied thereto. As its name suggests, the liquid crystal molecules of the TN mode liquid crystal device have a twisted orientation toward a direction perpendicular to the substrate. On the other hand, in the VA mode liquid crystal device, liquid crystal molecules are aligned in a direction that is substantially perpendicular to the surface(s) of a (pair of) substrate(s) when an OFF driving voltage is supplied thereto. In the VA mode liquid crystal device, an orientation state where liquid crystal molecules are aligned in a direction that is substantially perpendicular to the surface of a substrate is used as black display. In other words, black display is performed when there is not any optical retardation when viewed along a normal direction with respect to the substrate. For this reason, it is possible to obtain a high contrast in the vertically aligned mode. In addition, in the vertically aligned mode, it is further possible to obtain a wide viewing angle by providing a plurality of areas that have different tilting orientations of the liquid crystal molecules that change their alignment direction at the time of the application of an ON voltage.

A related-art liquid crystal device that operates in the vertically aligned mode described above has the following electrode configuration. A set of a pixel electrode and a counter electrode, or in other words, an opposite electrode, forms each sub pixel, which constitutes a unitary display region for white display and black display. The pixel electrode is configured to have more than one dot portions (i.e., configured to have an "island-shaped" layout structure). With such a configuration, each one of the sub pixels is made up of sub dots, which constitute a plurality of dot regions. The above-described electrode configuration of the VA mode liquid crystal device of the related art is disclosed in, for example, the following publications of Japanese patent applications: JP-A-2003-43525 (specifically, refer to Page 7 and FIG. 1 thereof), JP-A-2005-345757 (specifically, refer to Page 6 and FIG. 2 thereof), and JP-A-2006-338051 (specifically, refer to Page 7 and FIG. 2 thereof).

In the VA mode liquid crystal device described above, the alignment of liquid crystal molecules is controlled by means of an oblique electric field that is generated in accordance with the planar shape of a pixel electrode as well as by the functioning of dielectric projections or slits formed on a counter electrode. When an ON voltage is applied to a liquid crystal layer, the orientation of liquid crystal molecules are changed into a direction that is specified by the alignment control. As a result thereof, a plurality of domains or multi-domains is formed. In the configuration of the VA mode liquid crystal device, each sub pixel is formed at a region where one pixel electrode and its corresponding common electrode overlap each other in a plan view. In particular, in the configuration of the VA mode liquid crystal device of the related art, a light shielding film is formed on the substrate(s) at each region that corresponds to a gap, or clearance, between two adjacent sub pixels. The light shielding film of the related art functions to prevent any light from leaking through the gap between each of adjacent sub pixels. That is, the light shutting film of the related art is provided in consideration of adverse effects that could be exerted by a voltage applied at each gap therebetween.

As described above, in the configuration of a liquid crystal device of the related art, a light shielding film is provided so as to block the leakage of light through the gap between each of sub pixels adjacent to one another in a pixel layout constituted by the plurality of sub pixels that are arrayed in a two-dimensional pattern, where each of the sub pixels is formed at a region where one pixel electrode and its corresponding common electrode overlap each other in a plan view. In the above layout configuration of the related art, the light shielding film prevents light from leaking through a peripheral region around each sub pixel, thereby further preventing the problem of contrast degradation at a level effective to some degree. The light-shutting technique described above has not been limitedly used in the VA mode liquid crystal device but also used in various types of liquid crystal devices that operate in a variety of modes other than the VA mode. Although the above-described light-shielding technique is not unique to the VA mode liquid crystal device, the intensity of an oblique electric field tends to be greater in the VA mode liquid crystal device at each peripheral region around a plurality of sub dots provided in each of the sub pixels for its functional reason. Therefore, in the configuration of the VA mode liquid crystal device of the related art, the leakage of light is likely to occur at each peripheral region around the sub dots, which causes a decrease in contrast.

SUMMARY

An advantage of some aspects of the invention is to provide an improved layout of a light shielding film in the configuration of a homeotropic VA mode liquid crystal device so as to achieve an enhanced contrast. The VA mode liquid crystal device to which the invention is directed has an electrode configuration in which, as in the related art, a plurality of dot regions that is constituted by a plurality of sub dots is provided in each sub pixel.

In order to address the above-identified problem without any limitation thereto, the invention provides, as a first aspect thereof, a liquid crystal device including: a pair of substrates; a liquid crystal layer having a negative dielectric anisotropy, the liquid crystal layer being sandwiched between the pair of substrates; a pixel electrode that is provided on the liquid crystal side of one of the pair of substrates; a counter electrode that is provided on the liquid crystal side of the other of the pair of substrates, the counter electrode being opposed to the pixel electrode; a vertical alignment film that aligns liquid crystal molecules of the liquid crystal layer in a direction in which the long axes of the liquid crystal molecules are oriented perpendicular to the pair of substrates; and a light shielding film, wherein the pixel electrode is made up of a plurality of island-pattern sub pixel elements each two adjacent ones of which are connected to each other via a connection portion having a width narrower than that of the sub pixel element; and the light shielding film is formed, on at least one of the pair of substrates, at least in each region not corresponding to the connection portion between each two of the plurality of sub pixel elements that are adjacent to each other.

The liquid crystal device according to the first aspect of the invention is a vertically aligned (VA) mode liquid crystal device that is provided with a (set of) vertical alignment film(s) that aligns liquid crystal molecules of a liquid crystal having a negative dielectric anisotropy in a vertical orientation. In addition, the liquid crystal device according to the first aspect of the invention has pixel electrodes each of which is made up of a plurality of dot-like sub pixel elements each two adjacent ones of which are connected to each other via a connection portion having a width narrower than that of the sub pixel element. Each of quadrangular (mostly, rectangular) areas, which contains a planar region where each pixel electrode that is made up of the plurality of sub pixel elements connected to each other (one another) and the corresponding common electrode that is provided to be opposed to the pixel electrode overlap each other in a plan view, constitutes one sub pixel P. When an image is displayed in black and white or any two alternative color components other than black and white, each one of the sub pixels P constitutes one display pixel. On the other hand, when an image is displayed in three color components, red (R), green (G), and blue (B), each set of three sub pixels P constitutes one display pixel.

In the configuration of a VA-mode liquid crystal device of the related art, a light shielding film is provided so as to block the leakage of light through the gap between each of sub pixels arrayed adjacent to one another. In contrast, in the configuration of the VA-mode liquid crystal device of the related art, the light shielding film is not provided in a gap region between each two of the plurality of sub pixel elements that are adjacent to each other in each of the plurality of sub pixels.

In the operation of the VA mode liquid crystal device, an oblique electric field is generated at a peripheral portion (i.e., region) of each of the plurality of sub pixel elements that make up a pixel electrode at the time of application of an ON voltage to a liquid crystal layer. Then, the generated oblique electric field specifies the tilting orientation of the liquid crystal molecules. Since the electric field intensity of the oblique electric field is large (i.e., strong), the leakage of light is likely to occur at the peripheral region of each of the plurality of sub pixel elements, which could cause the problem of contrast degradation. In the configuration of a VA-mode liquid crystal device of the related art in which the light shielding film is not provided in a gap region between each two of the plurality of sub pixel elements that are adjacent to each other in each of the plurality of sub pixels although a light shielding film is provided in a gap region between each of sub pixels arrayed adjacent to one another, the leakage of light through the gap region between each two adjacent ones of the plurality of sub pixel elements could cause the problem of contrast degradation.

In contrast, in the configuration of a liquid crystal device according to the first aspect of the invention described above, the light shielding film is formed at least in each region not corresponding to the connection portion between each two adjacent ones of the plurality of sub pixel elements that are connected to each other thereby. With such a unique configuration, the invention makes it possible to effectively prevent the leakage of light through the gap region between each two adjacent ones of the plurality of sub pixel elements in each of the plurality of sub pixels. Therefore, advantageously, the invention makes it further possible to offer a high contrast. As a further advantage, in the above-described layout, since the light shielding film never overlaps any of the sub pixel elements that make up a pixel electrode in a plan view, the invention makes it possible to offer a bright display without decreasing a transmission factor (that is, aperture ratio).

In the configuration of the liquid crystal device according to the first aspect of the invention described above, it is preferable that the light shielding film should be formed to have a planar shape that matches with that of a region between each two of the plurality of sub pixel elements that are adjacent to each other. In other words, it is preferable that the shape of the light shielding film should be adapted so as to match the shape of the sub pixel element. With such a configuration, it is possible to effectively prevent the leakage of light through the gap region between each two adjacent ones of the plurality of sub pixel elements in each of the plurality of sub pixels.

In the configuration of the liquid crystal device according to the first aspect of the invention described above, it is preferable that the light shielding film formed between each two of the plurality of sub pixel elements that are adjacent to each other has a portion that extends along, at least, a side of each of the island-pattern sub pixel elements; and the light shielding film formed between each two of the plurality of sub pixel elements that are adjacent to each other surrounds at least a part of the outer boundary of each of the island-pattern sub pixel elements. In addition, in the configuration described above, it is preferable that the light shielding film should be formed to have a planar shape that matches with that of a region between each two of the plurality of sub pixel elements that are adjacent to each other.

In the configuration of the liquid crystal device according to the first aspect of the invention described above, it is preferable that the light shielding film should be formed on the above-mentioned one of the pair of substrates on which the pixel electrode is provided. The formation of the light shielding film on the same substrate as one on which the pixel electrode is provided means that the light shielding film is directly formed in a gap region between each two of the plurality of sub pixel elements that are adjacent to each other to constitute a pixel electrode in each of the plurality of sub pixels. If the light shielding film is formed on the counter substrate that is opposed to the above-mentioned one of the pair of substrates on which the pixel electrode is provided, the light shielding film could undesirably overlap the pixel electrodes when viewed in two dimensions, or any undesirable gap could be formed between the light shielding film and the pixel electrodes, in a case where some positional misalignment (margin of alignment error) occurs between these substrates when they are adhered to each other. If such a positional misalignment occurs to cause the overlapping of the light shielding film and the pixel electrodes in a plan view, the aperture ratio decreases. Or if such a positional misalignment occurs to cause a gap therebetween, there is a possibility of contrast degradation due to the possible leakage of light therethrough. In contrast, the above-described configuration of the invention makes it possible to prevent the occurrence of positional misalignment because the light shielding film is formed on the same substrate as one on which the pixel electrodes are formed, which makes it further possible to effectively avoid a decrease in the aperture ratio.

In the configuration of the liquid crystal device according to the first aspect of the invention described above, it is preferable that the light shielding film should be formed on the above-mentioned other of the pair of substrates, which is opposed to the above-mentioned one of the pair of substrates on which the pixel electrode is provided.

In the liquid crystal device having the configuration described above, it is preferable that the width of the light shielding film should be smaller than the width of the region between each two of the plurality of sub pixel elements that are adjacent to each other. If such a configuration is adopted, in a plan view, a clearance is formed between a side of each of the sub pixel elements and the corresponding side of the light shielding film. If the light shielding film is formed on the counter substrate that is opposed to the above-mentioned one of the pair of substrates on which the pixel electrode is provided, a positional misalignment could occur between the pixel electrodes and the light shielding film when these substrates are adhered to each other. If there is a "pre-gap" provided between the sub pixel elements and the light shielding film, it is possible to effectively avoid the light shielding film and the pixel electrodes from overlapping each other in a plan view even in a case where a positional misalignment occurs therebetween. Therefore, such a configuration makes it possible to avoid a decrease in the aperture ratio thereof.

In the configuration of the liquid crystal device according to the first aspect of the invention described above, it is preferable that switching elements should be provided on one of the pair of substrates. A few examples of such a switching element includes, though not limited thereto, a three-terminal switching device such as a thin film transistor (TFT) or the like, and a dual-terminal switching device such as a thin film diode (TFD) or the like. When such a switching element is adopted, it is preferable that the light shielding film should be provided on the substrate on which the switching element is provided; and it is further preferable that the light shielding film should be made of the same material as that of the switching element. Such a configuration is advantageous because it is possible to form both of the switching elements and the light shielding film in the same single manufacturing process, which means that it is further possible to reduce material cost and manufacturing cost.

In the liquid crystal device having the configuration described above, it is preferable that the switching element should be a thin film diode having a first electrode made of Ta or Ta alloy, an anode oxide film formed on the first electrode, and a second electrode made of an electro-conductive metal material, the second electrode being formed on the anode oxide film. In such a configuration, it is further preferable that the light shielding film should be made of the same material as that of the first electrode. Such a configuration is advantageous because it is possible to form both of the thin film diodes, which are the switching elements, and the light shielding film in the same single manufacturing process, which means that it is further possible to reduce material cost and manufacturing cost.

In the liquid crystal device having the configuration described above, it is preferable that a plurality of coloration films having colors different from each other or one another should be provided on the above-mentioned other of the pair of substrates, which is opposed to the above-mentioned one of the pair of substrates on which the pixel electrode is provided, so as to form a color filter on the counter (i.e., opposed) substrate. In such a configuration, it is further preferable the light shielding film should be configured by overlaying at least one coloration film on another coloration film on the counter substrate. Such a configuration is advantageous in terms of material cost and manufacturing cost in comparison with a case where the light shielding film is formed by means of a dedicated (i.e., non-common) material.

In order to address the above-identified problem without any limitation thereto, the invention provides, as a second aspect thereof, a liquid crystal device including: a pair of substrates; a liquid crystal layer having a negative dielectric anisotropy, the liquid crystal layer being sandwiched between the pair of substrates; a pixel electrode that is provided on the liquid crystal side of one of the pair of substrates; a counter electrode that is provided on the liquid crystal side of the other of the pair of substrates, the counter electrode being opposed to the pixel electrode; a vertical alignment film that aligns liquid crystal molecules of the liquid crystal layer in a direction in which the long axes of the liquid crystal molecules are oriented perpendicular to the pair of substrates; and a light shielding film, wherein the pixel electrode is made up of a plurality of island-pattern sub pixel elements each two adjacent ones of which are connected to each other via a connection portion having a width narrower than that of the sub pixel element; and the light shielding film is formed, on at least one of the pair of substrates, in each region having the connection portion between each two of the plurality of island-shaped sub pixel elements that are adjacent to each other, whereas the light shielding film does not cover each region not having the connection portion between each two of the plurality of island-shaped sub pixel elements that are adjacent to each other.

In the configuration of the liquid crystal device according to the aforementioned first aspect of the invention, it is defined that the light shielding film is formed "(at least) in each region not corresponding to the connection portion between each two of the plurality of sub pixel elements that are adjacent to each other". That is, according to the aforementioned definition of the liquid crystal device according to the first aspect of the invention, it is not restrictively defined whether the light shielding film is further formed in other region or not in addition to "(at least) in each region not corresponding to the connection portion between each two of the plurality of sub pixel elements that are adjacent to each other". In contrast, in the configuration of the liquid crystal device according to the second aspect of the invention, the light shielding film is formed, on at least one of the pair of substrates, in each region having the connection portion between each two of the plurality of island-shaped sub pixel elements that are adjacent to each other, whereas the light shielding film does not cover each region not having the connection portion between each two of the plurality of island-shaped sub pixel elements that are adjacent to each other. Since the light shielding film is further formed in each region having the connection portion, it is possible to prevent, with a greater reliability, the leakage of light through a gap region between each two of the plurality of island-shaped sub pixel elements that are connected to each other.

In order to address the above-identified problem without any limitation thereto, the invention provides, as a third aspect thereof, a liquid crystal device including: a pair of substrates; a liquid crystal layer having a negative dielectric anisotropy, the liquid crystal layer being sandwiched between the pair of substrates; a pixel electrode that is provided on the liquid crystal side of one of the pair of substrates; a counter electrode that is provided on the liquid crystal side of the other of the pair of substrates, the counter electrode being opposed to the pixel electrode; a vertical alignment film that aligns liquid crystal molecules of the liquid crystal layer in a direction in which the long axes of the liquid crystal molecules are oriented perpendicular to the pair of substrates; and a light shielding film, wherein the pixel electrode is made up of a plurality of island-pattern sub pixel elements each two adjacent ones of which are connected to each other in a predetermined direction via a connection portion having a width narrower than that of the sub pixel element; and the light shielding film, which has a first light shielding portion that extends in the predetermined direction along which the island-pattern sub pixel elements are connected to one another and further has a second light shielding portion that intersects with the first light shielding portion and protrudes from the first light shielding portion toward the connection portion, is provided on at least one of the pair of substrates in such a manner that the light shielding film does not cover each region corresponding to the connection portion.

In the configuration of the liquid crystal device according to the third aspect of the invention described above, the light shielding film, which has a first light shielding portion that extends in the predetermined direction along which the island-pattern sub pixel elements are connected to one another and further has a second light shielding portion that intersects with the first light shielding portion and protrudes from the first light shielding portion toward the connection portion, is provided. Therefore, with such a configuration, it is possible to effectively prevent light from leaking through each gap region between two sub pixel elements adjacent to each other in each of the sub pixels. It should be noted that the configuration of the liquid crystal device according to the third aspect of the invention described above makes it also possible to prevent the leakage of light through outer regions around the corners of each of the sub pixel elements. In addition, in the configuration of the liquid crystal device according to the third aspect of the invention described above, since the light shielding film does not cover each region corresponding to the connection portion between each two of the plurality of island-shaped sub pixel elements that are adjacent to each other, it is possible to increase the aperture ratio thereof.

In the configuration of the liquid crystal device according to the third aspect of the invention described above, it is preferable that the light shielding film does not cover a part of each of the sides of each of the island-pattern sub pixel elements; and the light shielding film has a cross shape. With such a configuration, it is possible to prevent the leakage of light through a gap region surrounded by each four (2×2) sub pixel elements arrayed adjacent to one another, where two sets of two sub pixel elements are arrayed adjacent to each other along a direction in which a set of sub pixel elements that make up a pixel electrode (or, in other words, a sub pixel) are connected to one another, and when viewed in an orthogonal direction thereof, two sets of two sub pixel elements are arrayed adjacent to each other along the above-mentioned orthogonal direction thereof.

In order to address the above-identified problem without any limitation thereto, the invention provides, as a fourth aspect thereof, a liquid crystal device including: a pair of substrates; a liquid crystal layer having a negative dielectric anisotropy, the liquid crystal layer being sandwiched between the pair of substrates; a pixel electrode that is provided on the liquid crystal side of one of the pair of substrates; a counter electrode that is provided on the liquid crystal side of the other of the pair of substrates, the counter electrode being opposed to the pixel electrode; a vertical alignment film that aligns liquid crystal molecules of the liquid crystal layer in a direction in which the long axes of the liquid crystal molecules are oriented perpendicular to the pair of substrates; and a light shielding film, wherein the pixel electrode is made up of a plurality of island-pattern sub pixel elements each two adjacent ones of which are connected to each other via a connection portion having a width narrower than that of the sub pixel element, each of the plurality of island-shaped sub pixel elements having corner portions and side portions; and the light shielding film is formed, on at least one of the pair of substrates, in each region between each two of the plurality of island-pattern sub pixel elements that are adjacent to each other, whereas the light shielding film does not cover regions corresponding to the corner portions of each of the plurality of island-shaped sub pixel elements.

In the configuration of the liquid crystal device according to the fourth aspect of the invention described above, it is defined that the light shielding film is provided on "both of each region not corresponding to the connection portion between each two of the plurality of sub pixel elements that are connected adjacent to each other and each region corresponding to the connection portion between each two of the plurality of sub pixel elements that are connected adjacent to each other", and in addition, on "each of outer regions along the sides of each of the sub pixel elements", whereas, the light shielding film covers none of "outer regions around the corners of each of the sub pixel elements". With such a configuration, it is possible to prevent the leakage of light through a gap region between each two of the plurality of sub pixel elements that are connected to each other; and in addition thereto, it is further possible to prevent the leakage of light through outer regions along the sides of each of the sub pixel elements.

In order to address the above-identified problem without any limitation thereto, the invention provides, as a fifth aspect thereof, a liquid crystal device including: a pair of substrates; a liquid crystal layer having a negative dielectric anisotropy, the liquid crystal layer being sandwiched between the pair of substrates; a pixel electrode that is provided on the liquid crystal side of one of the pair of substrates; a counter electrode that is provided on the liquid crystal side of the other of the pair of substrates, the counter electrode being opposed to the pixel electrode; a vertical alignment film that aligns liquid crystal molecules of the liquid crystal layer in a direction in which the long axes of the liquid crystal molecules are oriented perpendicular to the pair of substrates; and a light shielding film, wherein the pixel electrode is made up of a plurality of island-pattern sub pixel elements each two adjacent ones of which are connected to each other via a connection portion having a width narrower than that of the sub pixel element; and the light shielding film is formed, on at least one of the pair of substrates, in an entire region around each of the plurality of island-shaped sub pixel elements except each region corresponding to the connection portion.

In the configuration of the liquid crystal device according to the fifth aspect of the invention described above, the light shielding film is formed in an entire region around each of the plurality of sub pixel elements except each region corresponding to the connection portion. With such a configuration, the liquid crystal device according to the fifth aspect of the invention described above makes it possible to effectively prevent the leakage of light through an entire peripheral region of each of the plurality of sub pixel elements, that is, an entire region around each of the plurality of sub pixel elements except each region corresponding to the connection portion.

In order to address the above-identified problem without any limitation thereto, the invention provides, as a sixth aspect thereof, an electronic apparatus that is provided with the liquid crystal device having the configuration described above. A variety of electronic apparatuses including but not limited to a mobile phone, a handheld terminal, a personal digital assistant (PDA), is conceivable. A liquid crystal device according to the invention adopts a unique and improved layout of a light shielding film that is formed on a substrate (or substrates) that constitutes a part of the vertically aligned (VA) mode liquid crystal device so as to obtain a high-contrast display image. Accordingly, the electronic apparatus according to the sixth aspect of the invention, which is provided with the liquid crystal device having the unique and distinctively characteristic features/configurations described above, also makes it possible to obtain a high-contrast display image.

BRIEF DESCRIPTION OF THE DRAWINGS

The invention will be described with reference to the accompanying drawings, wherein like numbers reference like elements.

FIG. 2A illustrates the planar configuration of one pixel formed on a color filter substrate, whereas FIG. 2B illustrates the planar configuration of one pixel formed on an element substrate.

FIG. 7A illustrates an example of alignment control by means of projections, whereas FIG. 7B illustrates an example of alignment control by means of slits.

FIG. 12A illustrates the planar configuration of one pixel formed on an element substrate, whereas FIG. 12B illustrates the planar configuration of one pixel formed on a color filter substrate.

FIG. 15A illustrates the planar configuration of one pixel formed on a color filter substrate, whereas FIG. 15B illustrates the planar configuration of one pixel formed on an element substrate.

FIG. 16 is a sectional view taken along the line XVI-XVI of FIGS. 15A and 15B, which extends in the direction in which each column extends, that is, the Y direction.

FIGS. 18A, 18B and 18C is a set of plan views that schematically illustrates an example of an essential part of a liquid crystal device according to a fourth embodiment of the invention, where FIG. 18A illustrates the planar configuration of one pixel formed on an element substrate, whereas FIG. 18B illustrates the planar configuration of one pixel formed on a color filter substrate.

DESCRIPTION OF EXEMPLARY EMBODIMENTS

First Embodiment of Liquid Crystal Device

With reference to the accompanying drawings, a liquid crystal device according to the invention is described below while explaining exemplary embodiments thereof. In the first embodiment of the invention, the characteristic layout of a light shielding film according to the invention is applied to a transmissive mode active matrix liquid crystal device that uses amorphous silicon thin film transistors (TFT) as its switching elements. Needless to say, the scope of the invention should in no case be understood to be limited to the exemplary embodiment of the invention described below. It should be noted that, in the accompanying drawings that are referred to in the explanation given below, the dimensions and/or scales of constituent members and/or constituent elements are modified from those that will be adopted in an actual implementation of the invention for the purpose of facilitating the understanding of the characteristic features of the invention.

Figure 1:
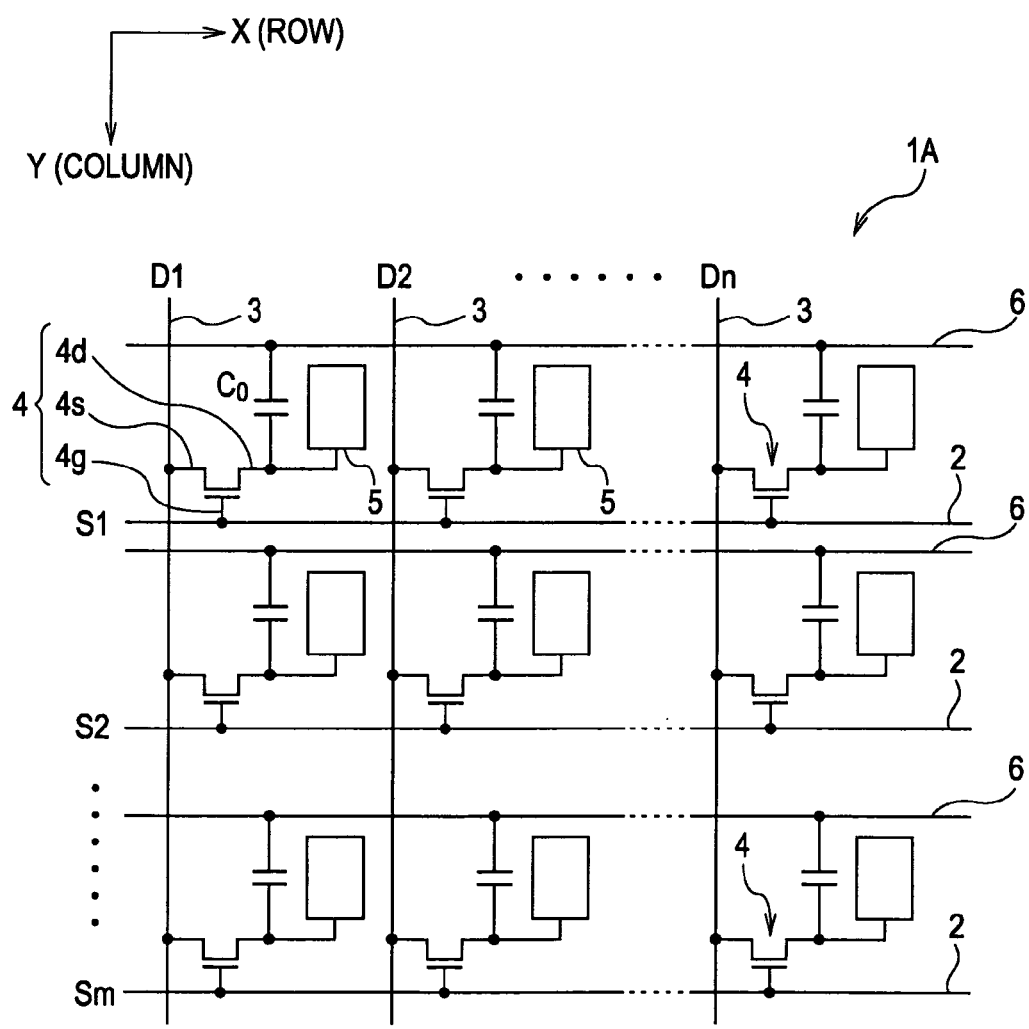
FIG. 1 is an equivalent circuit diagram that schematically illustrates an example of the electric configuration of a liquid crystal device according to an exemplary embodiment of the invention.
Figure 2A:
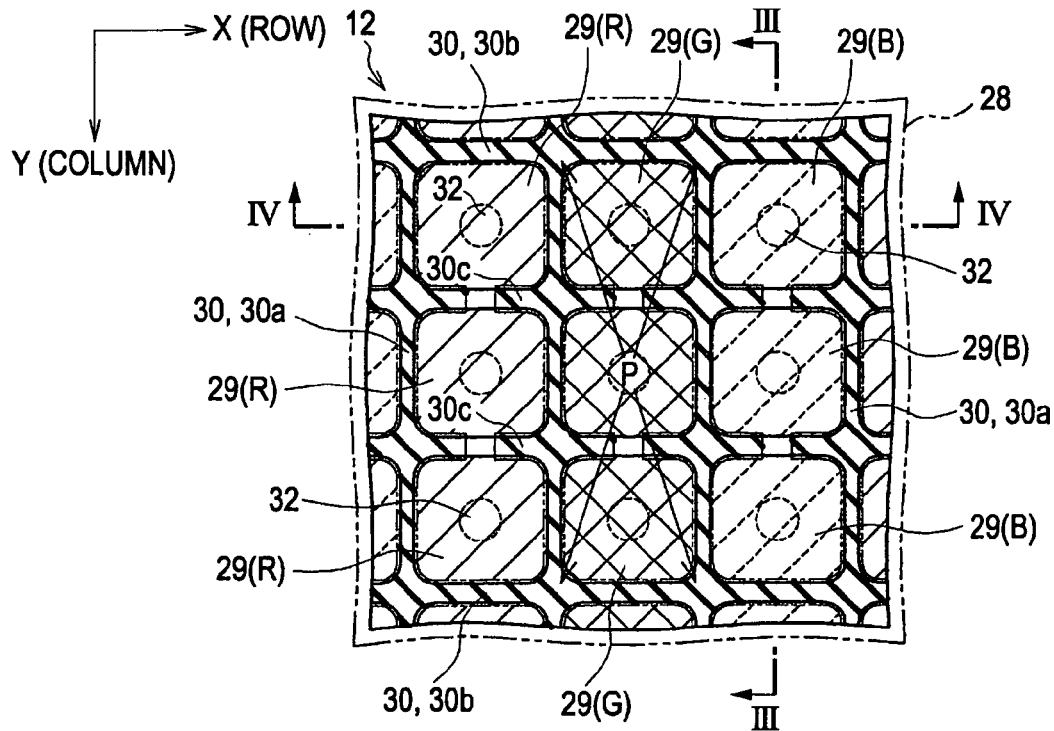
FIGS. 2A and 2B is a set of plan views that schematically illustrates an example of an essential part of a liquid crystal device according to a first embodiment of the invention, where
Figure 2B:
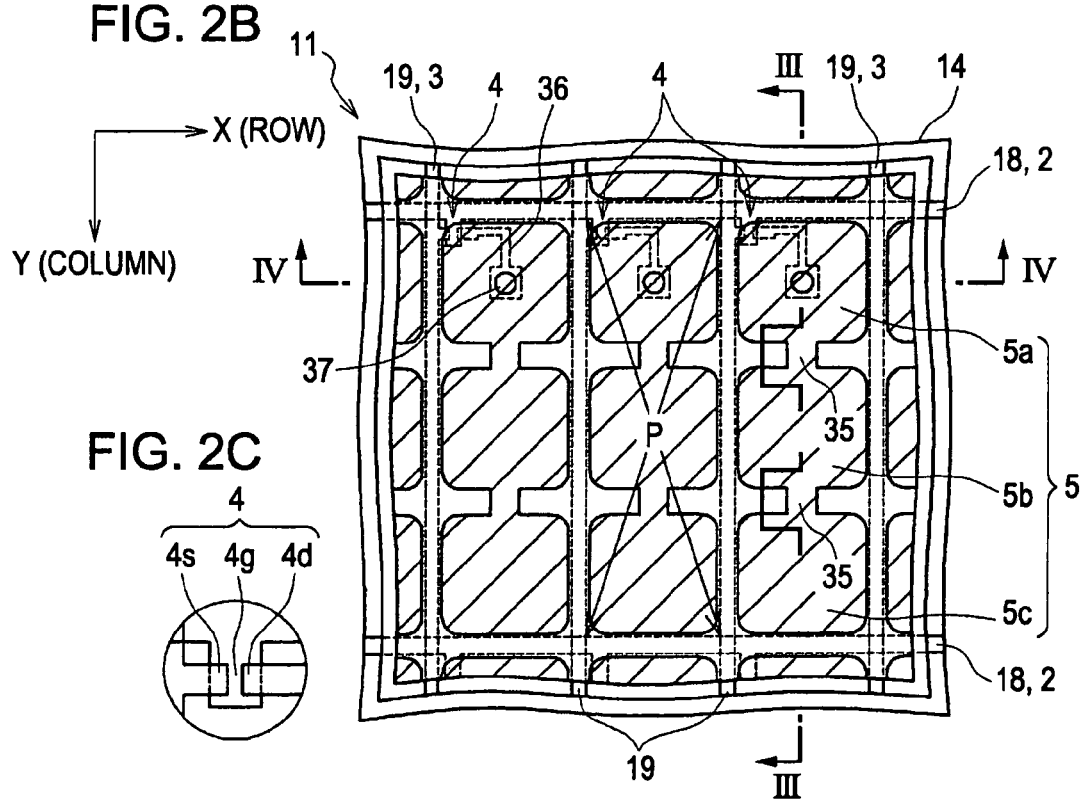
Figure 3:
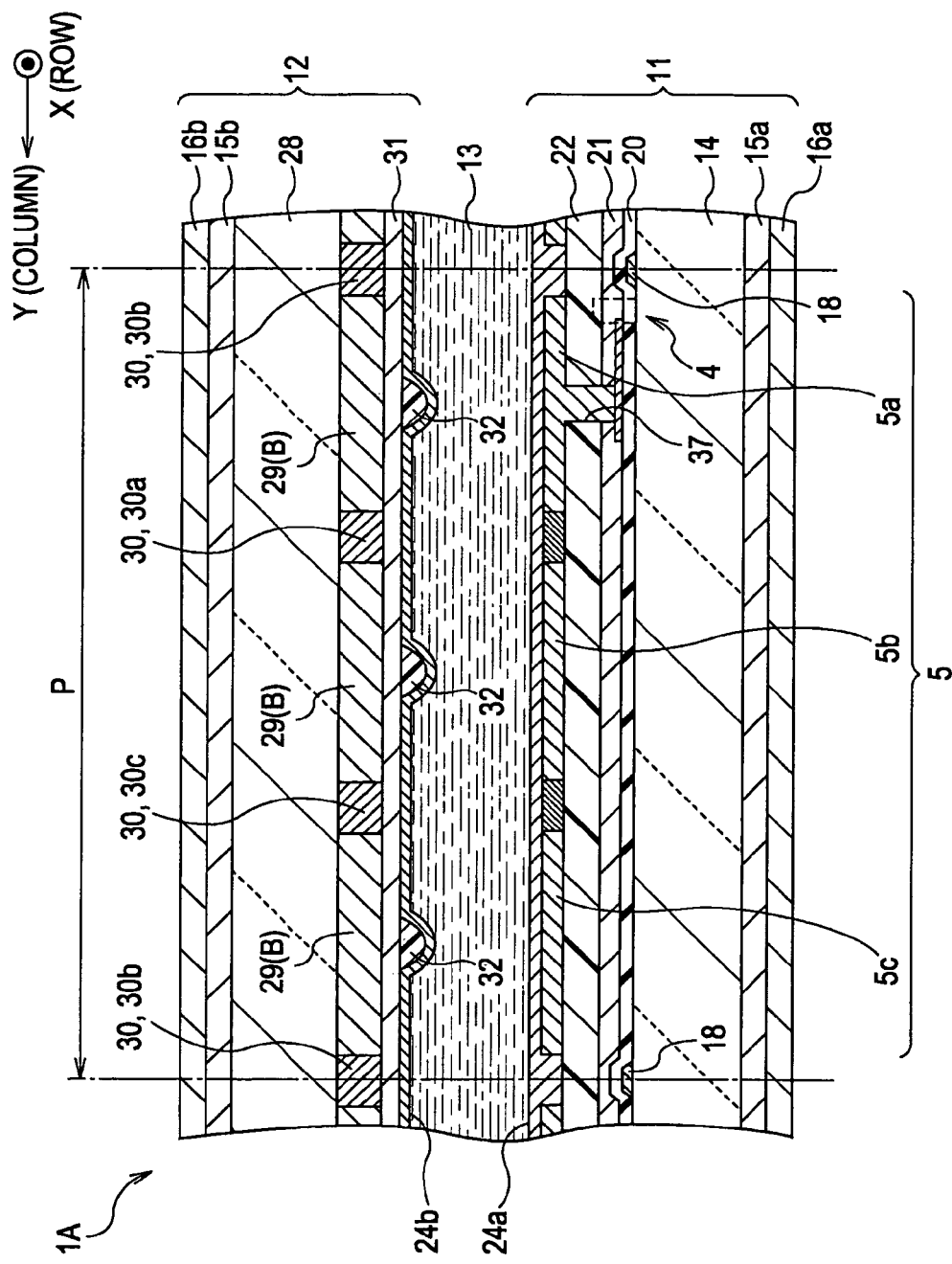
FIG. 3 is a sectional view taken along the line III-III of FIGS. 2A and 2B, which extends in the direction in which each column extends, that is, the Y direction.
Figure 4:
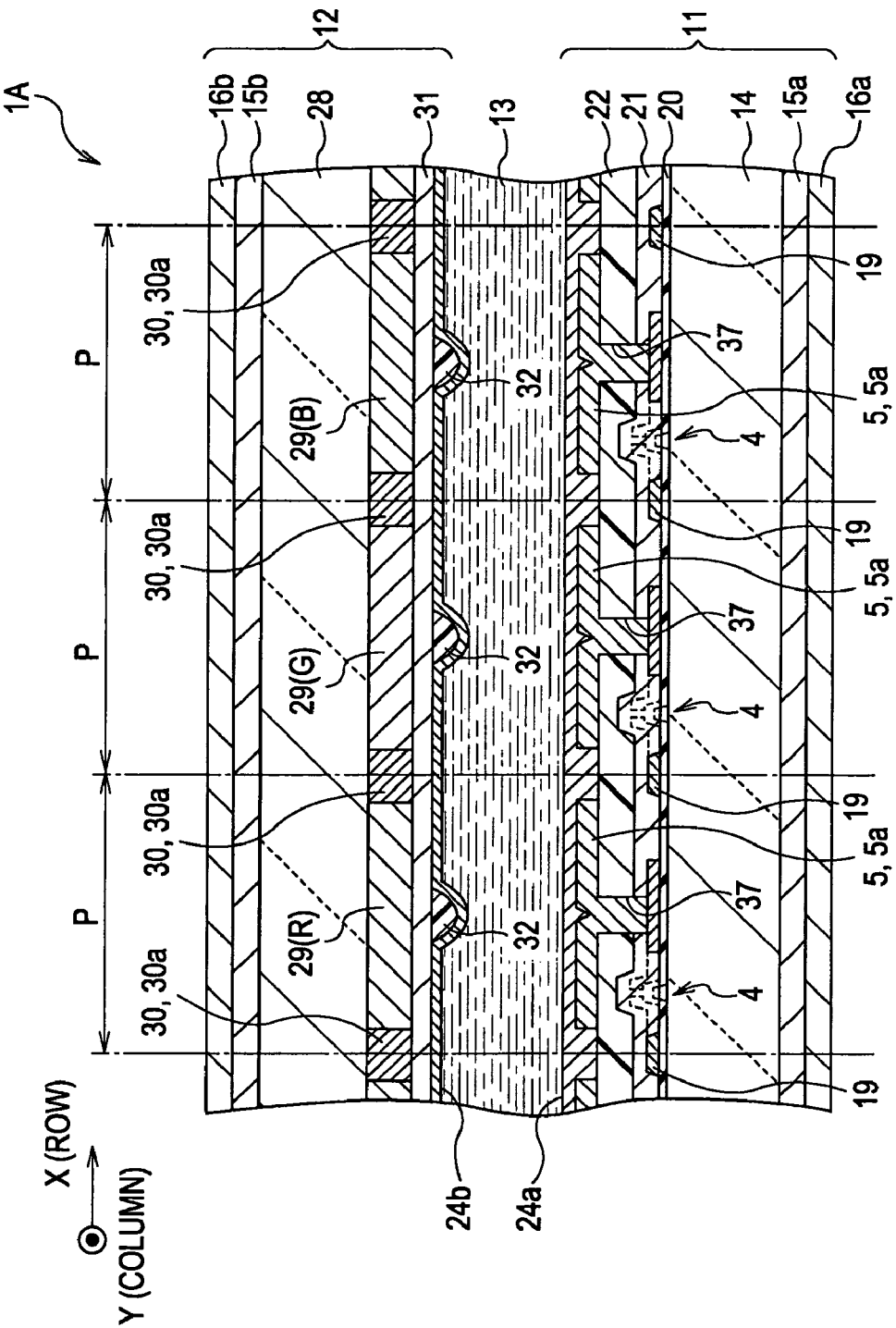
FIG. 4 is a sectional view taken along the line IV-IV of FIGS. 2A and 2B, which extends in the direction in which each row extends, that is, the X direction.

FIG. 1 is an equivalent circuit diagram that schematically illustrates an example of the electric configuration of a liquid crystal device according to an exemplary embodiment of the invention. FIG. 2A is a plan view that schematically illustrates an example of the configuration of one pixel that lies on a color filter substrate. FIG. 2B is a plan view that schematically illustrates an example of the configuration of one pixel that lies on an element substrate. FIG. 3 is a sectional view taken along the line III-III of FIGS. 2A and 2B, which extends in the direction in which each column extends, that is, the Y direction. FIG. 4 is a sectional view taken along the line IV-IV of FIGS. 2A and 2B, which extends in the direction in which each row extends, that is, the X direction.

As illustrated in FIG. 1, a liquid crystal device 1A is provided with a plurality of scanning lines 2, each of which supplies a scanning signal, and a plurality of data lines 3, each of which supplies an image signal. The scanning lines 2 and the data lines 3 are arrayed on an element substrate, which is one of two substrates opposed to each other, in such a manner that, the former group, that is, the scanning lines 2, is orthogonal to the latter group, that is, the data lines 3, in a plan view. In addition, an insulation film covers each group of lines. Accordingly, the former group of lines and the latter group of lines are insulated from each other. In the present embodiment of the invention, a direction in which the scanning lines 2 extend is referred to as the row direction (X), whereas a direction in which the data lines 3 extend is referred to as the column direction (Y). A TFT element 4, which functions as a switching element, is provided at a position in the neighborhood of each intersection formed by the scanning lines 2 and the data lines 3. Each of the TFT elements 4 is configured as a three-terminal switching element having a gate electrode (gate region) 4g, a source electrode (source region) 4s, and a drain electrode (drain region) 4d.

The scanning line 2 is connected to the gate electrode 4g of each of the TFT elements 4. Scanning signals S1, S2, . . . , and Sm are applied to the plurality of the scanning lines 2 in a line-sequential manner at a predetermined timing like a pulse. The data line 3 is connected to the source electrode 4s of each of the TFT elements 4. Image signals D1, D2, . . . , and Dn are supplied to the plurality of the data lines 3 in a line-sequential manner. Or, alternatively, they may be supplied to a plural set (i.e., line group) of data lines 3 that are adjacent to each other or one another on a group-by-group basis.

A pixel electrode 5 is connected to the drain electrode 4d of each of the TFT elements 4. A liquid crystal capacitor/capacitance is formed between each of the pixel electrodes 5 and a common electrode that is opposed to the pixel-electrode 5. It should be noted that the common electrode is not shown in the drawing. While the TFT elements 4 are set into an ON state for a certain time period, the image signals D1, D2, . . . , and Dn supplied from the data lines 3 are written into liquid crystal at a predetermined timing via the pixel electrodes 5. Then, the image signals that are written in the liquid crystal are retained for a certain time period. As the image signal is written in the liquid crystal, a voltage applied to the liquid crystal changes. In accordance with the change in the voltage applied to the liquid crystal, the orientation, or in other words, alignment, of liquid crystal molecules present inside the liquid crystal changes. Light that passes through the liquid crystal is subjected to optical modulation as the orientation of the liquid crystal molecules changes. As a result of the optical modulation thereof, gradation display is performed. A capacitor line 6 extends in parallel with corresponding one of the scanning lines 2. A storage capacitor C0 that is formed by the capacitor line 6 is provided in parallel with the liquid crystal capacitance described above. The storage capacitor C0 functions to prevent the leakage of the image signals retained in the liquid crystal.

Next, with reference to the sectional views illustrated in FIGS. 3 and 4, the general configuration of the liquid crystal device according to the present embodiment of the invention is explained. The liquid crystal device 1A according to the present embodiment of the invention is provided with an element substrate 11 and a color filter substrate 12. The element substrate 11 and the color filter substrate 12 are adhered to each other with a "cell gap" being interposed therebetween, which is a clearance having a certain distance. Liquid crystal is injected and sealed inside the cell gap so as to constitute a liquid crystal layer 13. Nematic liquid crystal having a negative dielectric anisotropy is used as the liquid crystal component of the liquid crystal layer 13. Generally speaking, as the orientation characteristic of liquid crystal having a negative dielectric anisotropy, the alignment of the long axes of liquid crystal molecules thereof changes into a direction that intersects with an electric field.

In the present embodiment of the invention, the long axes of the liquid crystal molecules that are interposed between the substrates opposed to each other are oriented in a direction that is substantially perpendicular to the surfaces of the substrates in their initial alignment state where an OFF voltage is applied thereto. When an ON voltage is applied thereto, the orientation of the long axes of the liquid crystal molecules change into a direction where the long axes of the liquid crystal molecules intersect with an electric field, that is, in a direction that is parallel to the substrates. In the present embodiment of the invention, the color filter substrate 12 is provided at a position closer to an observation side, whereas the element substrate 11 is provided at an opposite position that is not closer to the observation side. An illumination device that is not shown in the drawing is provided outside the element substrate 11. The illumination device functions as a backlight. Transmissive mode display is performed by means of light that is emitted from the illumination device.

The element substrate 11 has a substrate 14 that is made of a translucent material such as a silica glass, plastic, or the like. A first phase difference retardation film 15a is deposited on the outer surface of the substrate 14. A first polarization sheet (i.e., polarizing plate) 16a is deposited on the first phase difference retardation film 15a. If needed, a plurality of the first phase difference retardation films 15a may be provided. In the present embodiment of the invention, in which the liquid crystal device 1A performs transmissive mode display, the first phase difference retardation film 15a includes, as its constituent elements, without any limitation thereto, a λ/4 film (i.e., sheet/plate) that functions to form circularly-polarized light, a phase difference compensation film (i.e., sheet/plate) that functions to compensate for a phase difference.

Gate lines 18, source lines 19, and TFT elements 4 are provided on the inner surface of the translucent substrate 14. As illustrated in FIG. 2B, a plurality of the gate lines 18 are provided thereon. Each of the plurality of the gate lines 18 extends in the row direction (X). The plurality of the gate lines 18 is arrayed in parallel with one another with a predetermined Y-directional pitch (i.e., interval) being allocated each between two adjacent gate lines 18. As illustrated in FIG. 2B, a plurality of the source lines 19 are provided thereon. Each of the plurality of the source lines 19 extends in the column direction (Y). The plurality of the source lines 19 is arrayed in parallel with one another with a predetermined X-directional pitch (i.e., interval) being allocated each between two adjacent source lines 19. The TFT element 4 is provided at a position in the neighborhood of each intersection formed by the gate lines 18 and the source lines 19. Each of the gate lines 18 functions as the scanning line 2 illustrated in FIG. 1. On the other hand, each of the source lines 19 functions as the data line 3 illustrated in FIG. 1. A gate insulation film 20 illustrated in FIG. 3 is deposited between the gate lines 18 and the source lines 19. A passivation film 21 covers the TFT elements 4. A resin film 22 is deposited on the passivation film 21. The pixel electrodes 5 that are made of indium tin oxide (ITO), indium zinc oxide (IZO), or the like, is provided on the resin film 22. A vertical alignment film (i.e., vertical orientation film) 24a is deposited on the pixel electrodes 5. Each of the pixel electrodes 5 has a special planar configuration for achieving vertically aligned (VA) mode operations. A more detailed explanation of the special planar configuration thereof will be given later.

The gate insulation film 20, the passivation film 21, and the resin film 22 are made of an insulating synthetic resin, or an insulating organic material. It should be noted that the capacitor lines 6 illustrated in FIG. 1 are not shown in FIGS. 3 and 4. The capacitor lines 6 are provided at positions opposed to the pixel electrodes 5 with the gate insulation film 20, the passivation film 21, and the resin film 22 being interposed therebetween.

The color filter substrate 12 has a substrate 28 that is made of a translucent material such as a silica glass, plastic, or the like. A second phase difference retardation film 15b is deposited on the outer surface of the substrate 28. A second polarization sheet (i.e., polarizing plate) 16b is deposited on the second phase difference retardation film 15b. As the first phase difference retardation film 15a includes, as its constituent elements, without any limitation thereto, the λ/4 film and the phase difference compensation film, so does the second phase difference retardation film 15b.

A coloration film 29, which constitutes a color filter, is provided on the inner surface of the translucent substrate 28. The suffixes attached to the reference numeral 29, that is, the letters "R, G, and B", indicate that the coloration films 29 (i.e., coloration films 29R, 29G, and 29B) are a red coloration film, a green coloration film, and a blue coloration film, respectively. In the present embodiment of the invention, a stripe array pattern is adopted. Accordingly, the coloration layers 29 of the same color component are arrayed to form a line in the column direction (Y). In the illustrated example of FIG. 3 (FIG. 2A), blue coloration layers 29B are aligned in the column direction (Y). When viewed from an orthogonal direction thereof, the coloration layers 29 of different color components, 29R, 29G, and 29B, are arrayed in a repetitive sequential order along the row direction (X) as shown in FIG. 4 (FIG. 2A). A light shielding film 30 is provided each between two adjacent coloration films 29. As illustrated in FIG. 2A, the light shielding film 30 is formed in a grid pattern so as to surround each of the coloration films 29. The light shielding film 30 may be made of a photosensitive resin material having a light shutting property. Or, it may be made of a light-shutting metal material. As an example of another alternative configuration, the light shielding film 30 may be configured by overlaying at least one coloration film 29, which is a resin film, on another coloration film 29, where the above-mentioned at least one coloration film 29 and the above-mentioned another coloration film 29 have colors different from each other or one another. In the present embodiment of the invention, it is assumed that the light shielding film 30 is configured by overlaying at least one coloration film 29 on another coloration film 29, where the above-mentioned at least one coloration film 29 and the above-mentioned another coloration film 29 have colors different from each other or one another. If needed, a planarizing film may be deposited on the coloration film 29 and the light shielding film 30. A more detailed explanation of the light shielding film 30 will be given later.

A common electrode 31, which is a counter electrode opposed to each of the pixel electrodes 5, is provided on the coloration film 29 and the light shielding film 30. The common electrode 31 is made of ITO, IZO, or the like, that is, the same material as that of the pixel electrode 5. The common electrode 31 is configured as a planar (i.e., sheet-type) electrode that is common to all sub pixels. In other words, the common electrode 31 is formed to cover the entire region of these sub pixels. A plurality of projections 32 is provided on the surface of the common electrode 31. Each of the projections 32, which are made of dielectric substances, functions as an alignment control means. A vertical alignment film (i.e., vertical orientation film) 24b is deposited on the common electrode 31. The vertical alignment film 24b covers the projections 32.

Liquid crystal molecules of the liquid crystal layer 13 are oriented in a direction perpendicular to the surfaces of the substrates in its initial alignment state, that is, when an OFF voltage is applied thereto, through the functioning of the vertical alignment films 24a and 24b. The orientation direction perpendicular to the surfaces of the substrates is shown as the vertical direction in FIGS. 3 and 4. The liquid crystal molecules are aligned in an oblique direction (i.e., slanted, or inclined) in the proximity of each of the projections 32 in such a manner that the liquid crystal molecules are oriented to be perpendicular to the surface of each of the projections 32. With the alignment control of the liquid crystal molecules, the tilting orientation (i.e., direction) of the liquid crystal molecules at the time of application of an ON voltage to the liquid crystal layer 13 is specified in a desired manner so as to ensure a stable (i.e., reliable) orientation change operations of the liquid crystal molecules.

Next, with reference to FIGS. 2A and 2B, the planar configuration of one pixel is explained below. FIG. 2A illustrates the planar configuration of one pixel formed on the color filter substrate 12, which is viewed from the observation side of FIGS. 3 and 4, that is, the upper side of each of these drawings. On the other hand, FIG. 2B illustrates the planar configuration of the element substrate 11, which is viewed from the observation side of FIGS. 3 and 4, that is, the upper side of each of these drawings. A positional alignment between the color filter substrate 12 illustrated in FIG. 2A and the element substrate 11 illustrated in FIG. 2B is performed in such a manner that they become opposed to each other without inverting the orientation of either one thereof, for example, without turning it upside down. In other words, either one of the color filter substrate 12 illustrated in FIG. 2A and the element substrate 11 illustrated in FIG. 2B is translated (i.e., moved in parallel), which means that it is moved without changing its orientation illustrated in the drawing, to become opposed to the other. Liquid crystal is injected and sealed between the color filter substrate 12 illustrated in FIG. 2A and the element substrate 11 illustrated in FIG. 2B that are opposed to each other. It should be noted that the second phase difference retardation film 15b and the second polarization sheet 16b are not shown in FIG. 2A. In addition, the translucent substrate 28 is shown by means of virtual chain lines in FIG. 2A. On the other hand, the vertical alignment film 24a is not shown in FIG. 2B.

On the element substrate 11 illustrated in FIG. 2B, each of rectangular regions demarcated by the gate lines 18, which are scanning lines, and the source lines 19, which are data lines, constitutes one sub pixel P. A plurality of the sub pixels P is formed adjacent to one another in a pixel plane. These sub pixels P are arrayed in a so-called matrix pattern that is made up of a plurality of rows extending in the X direction and a plurality of columns extending in the Y direction. These sub pixels P make up, in combination thereof, an image display area. When viewed in two dimensions, that is, in a plan view, each individual sub pixel P corresponds to one color component of the coloration filter 29 provided on the color filter substrate 12 shown in FIG. 2A, that is, either one of the red coloration film 29R, the green coloration film 29G, and the blue coloration film 29B. Three color components, that is, R, G, and B, of the sub pixels P (i.e., three sub pixels P) arrayed in the row direction (X) make up one pixel. If the number of color components of the coloration film 29 is configured to be more than three, for example, if the number of color components of the coloration film 29 is configured to be four in a modified implementation of the invention, each one pixel is constituted by a group of four sub pixels P each of which corresponds to one color component different from the remaining three thereof.

The TFT element 4 is formed at a position in the neighborhood of each intersection defined by the gate lines 18 and the source lines 19. Each of the pixel electrodes 5 is formed in a sub pixel P that is demarcated by corresponding two of the gate lines 18 and corresponding two of the source lines 19. The pixel electrodes 5 are arrayed in a matrix pattern that has a plurality of rows extending in the X direction and a plurality of columns extending in the Y direction. Each of the pixel electrodes 5 is made up of a plurality of sub pixel elements (i.e., pixel-electrode elements) each of which has a dot-like pattern, or in other words, an "island" pattern. In the present embodiment of the invention, it is assumed that one pixel electrode 5 has three sub pixel elements 5a, 5b, and 5c as its constituent elements. The sub pixel elements 5a and 5b are electrically connected to each other via a connection portion 35 that is configured as a narrow path. In addition, the sub pixel elements 5b and 5c are also electrically connected to each other via another connection portion 35 that is also configured as a narrow path. These sub pixel elements 5a, 5b, and 5c, which are electrically connected to one another by means of these connection portions 35, make up one pixel electrode 5 that is elongated in the column direction (Y). Each individual region at which the sub pixel element 5a, 5b, or 5c is provided is sometimes called as a sub dot. As illustrated in FIG. 2B, open gap regions that are provided both on the left and right of each of the connection portions 35 constitute "cutout" spaces that are not covered by the pixel electrode 5. Each of the cutout portions functions as a slit that generates an oblique electric field for controlling the orientation of liquid crystal molecules in the VA mode operations.

Figure 5A:
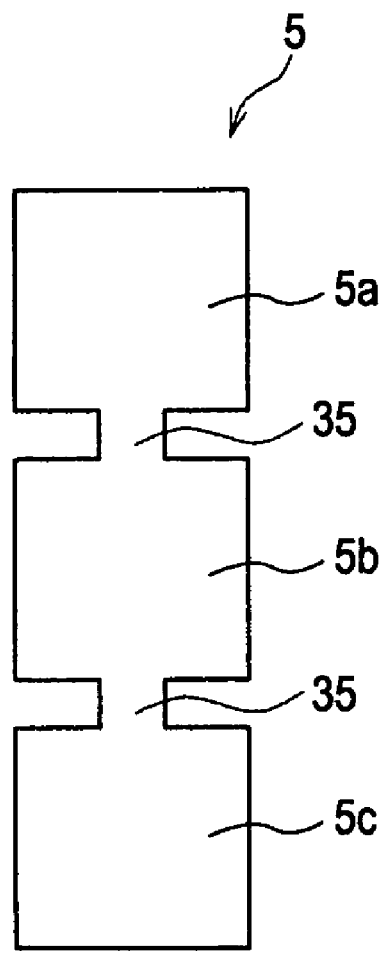
FIGS. 5A and 5B is a set of plan view that schematically illustrates variation examples of a pixel electrode.
Figure 5B:
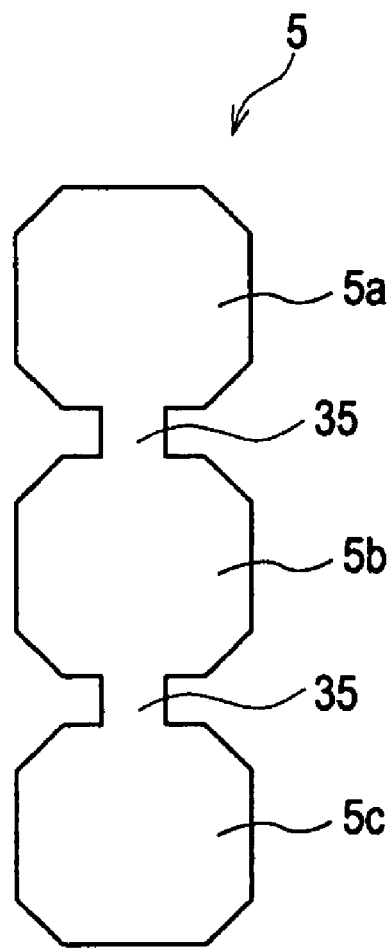
Figure 6A:
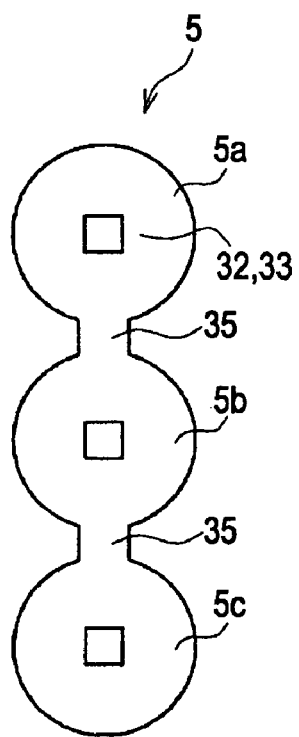
FIGS. 6A, 6B, and 6C is a set of plan views that schematically illustrates specific examples of an alignment control means provided on a pixel electrode.
Figure 6B:
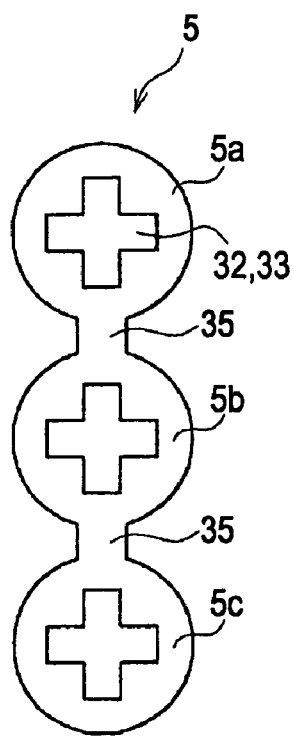
Figure 6C:
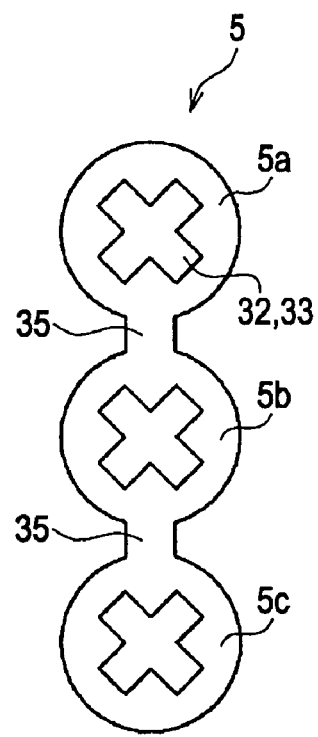

In the illustrated example, each of the sub pixel elements 5a, 5b, and 5c is configured to have a substantially square shape; and in addition thereto, each of four corners thereof is rounded into an arc shape. In other words, in the illustrated example, each sub pixel element is made up of four corner portions and four side portions. Notwithstanding the foregoing, the shape of each of the sub pixel elements 5a, 5b, and 5c is not limited to the specific example described above but may be modified into a square having a right angle at each of four corners thereof as illustrated in FIG. 5A. Or, as another non-limiting example of alternative configurations, the shape of each of the sub pixel elements 5a, 5b, and 5c may be modified into an octagon as illustrated in FIG. 5B. As still another non-limiting example of alternative configurations, the shape of each of the sub pixel elements 5a, 5b, and 5c may be modified into a circle as illustrated in FIGS. 6A, 6B, and 6C. Although the sub pixel elements 5a, 5b, and 5c are arrayed in only one line in each of the sub pixels P in the present embodiment of the invention, the invention may be modified in such a manner that the sub pixel elements 5a, 5b, and 5c are arrayed in two or more lines in each of the sub pixels P.

Figure 2C:
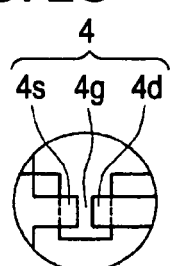

Each of the TFT elements 4 illustrated in FIG. 2B has, as illustrated in a partial enlarged view (FIG. 2C) thereof, a source region 4s and a drain region 4d formed in a semiconductor layer, which is made of an amorphous silicon, with a channel region being formed therebetween. The source line 19 (data line 3) is electrically connected to the source region 4s of each of the TFT elements 4, whereas the corresponding one of the pixel electrodes 5 is electrically connected to the drain region 4d thereof. The gate line 18 (scanning line 2) has a portion opposed to the channel region of the semiconductor layer. The above-mentioned portion of the gate line 18 functions as the gate electrode 4g of each of the TFT elements 4. The drain region 4d of each of the TFT elements 4 is electrically connected to the corresponding one of the pixel electrodes 5 via a connection line portion 36, which extends from the drain region 4d thereof, and a contact hole 37. Specifically, the drain region 4d of each of the TFT elements 4 is connected to the sub pixel element 5a of the corresponding one of the pixel electrodes 5, which lies at the TFT-element (4) side, in an electrically conductive manner through the connection line portion 36 and the contact hole 37. The contact hole 37 is formed at the substantially central position of each of the TFT-side sub pixel elements 5a.

As understood from FIGS. 2A and 2B, each of the projections 32 formed on the common electrode 31 as shown in FIG. 3, which functions as an alignment control means, is provided at the substantially central position of the corresponding one of the sub pixel elements 5a, 5b, and 5c, which is viewed along a normal direction with respect to the substrate in two dimensions. With such a configuration, the liquid crystal molecules become tilted in a direction from the center of each of the sub pixel elements 5a, 5b, and 5c toward the sides (i.e., edges) thereof when an ON voltage is applied to the liquid crystal. Each of the projections 32 has the shape of a circle in a plan view taken along the normal direction with respect to the substrate. On the other hand, when viewed horizontally along a direction parallel to the substrate, each of the projections 32 has the shape of a round chevron or a hemisphere that bulges outward. Such chevron-shaped or hemispheric projections 32 make it possible to obtain the radial orientation of the liquid crystal molecules around each of the projections 32. That is, in a plan view, the orientation direction of the liquid crystal molecules varies in a progressive manner in the angular range of three hundred and sixty (360°) degrees with each of the projections 32 being the center of the radial orientation thereof. By this means, it is possible to form a so-called "multi-domain" in a stable manner.

Notwithstanding the foregoing, the shape of each of the projections 32 may be modified into any arbitrary one as long as the orientation of the liquid crystal molecules is controlled in a certain alignment direction. As a non-limiting example of modified configurations, each of the projections 32 may be configured to have the shape of a linear chevron that does not bulge outward when viewed horizontally along the direction parallel to the substrate. In addition thereto, the planar shape of each of the projections 32 is not limited to a circle, which is taken as a mere example in the present embodiment of the invention described above. That is, as a few non-limiting examples of the modified planar shape of the projection 32, it may be configured as a variety of quadrangles such as a square, a rectangle, or the like, as illustrated in FIG. 6A; or, it may be configured in the shape of a cross as illustrated in FIG. 6B. As another non-limiting example of the modified planar configuration thereof, each of the projections 32 may have the shape of an alphabet "X" as illustrated in FIG. 6C. Or, each of the projections 32 may be configured to have the shape of a polygon other than those illustrated in the accompanying drawings. The alignment control means does not necessarily have the shape of a projection. For example, as a modified configuration thereof, each alignment control means may be formed as an opening that is provided in the common electrode 31, that is, a slit. As in the case of the projection described above, the planar shape of each of the slits may be a circle, a quadrangle, a cross, an alphabet "X", all of which should be understood as non-limiting examples.

Figure 7A:
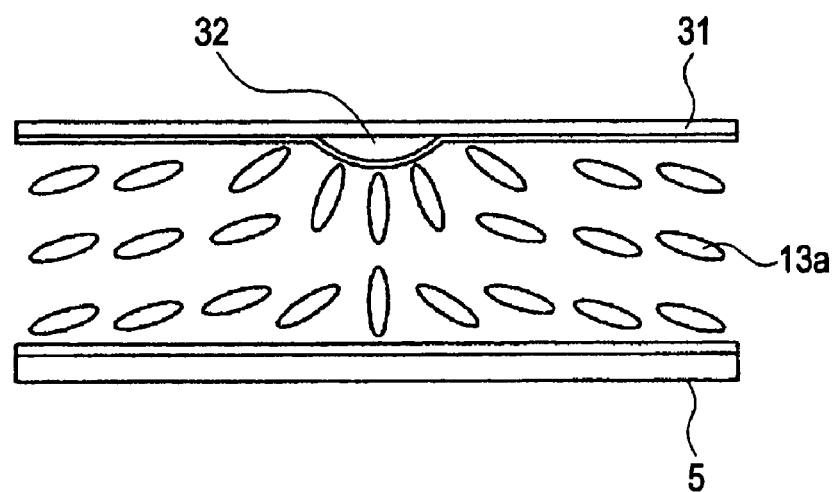
FIGS. 7A and 7B is a set of diagrams that schematically illustrates an example of the alignment control of liquid crystal molecules, where
Figure 7B:
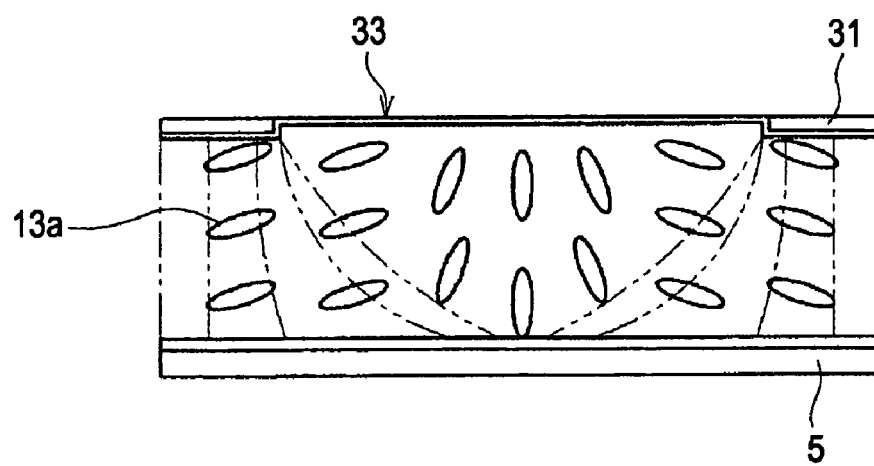

Next, with reference to FIGS. 7A and 7B, a brief explanation is given of the alignment control of liquid crystal molecules that is performed on a liquid crystal layer having a negative dielectric anisotropy where the projection 32 or the slit functions as the alignment control means. FIG. 7A is a diagram that schematically illustrates alignment control that is performed by means of the projection 32. In particular, FIG. 7A illustrates the orientation of liquid crystal molecules 13a when an electric field is generated due to the application of an ON voltage to a liquid crystal layer. The liquid crystal molecules 13a of the liquid crystal layer having a negative dielectric anisotropy are aligned in a direction in which the long axes of the liquid crystal molecules 13a are oriented perpendicular to the surface of the substrate in its initial alignment state, that is, when an OFF voltage is applied thereto. Since the surface of the projection 32 is configured as a slanted or inclined face, the liquid crystal molecules 13a are "pre-tilted". When each of the projections 32 is configured to have the shape of a chevron or a hemisphere, the surface of the projection 32 has an inclination from the center toward the circumference thereof. With such a configuration, the liquid crystal molecules 13a have a radial progressive orientation; that is, the liquid crystal molecules 13a are aligned in such a manner that they become tilted in a radial pattern in a progressive manner (i.e., gradually) from the center toward the circumference of each of the projections 32. When an ON voltage is applied between the pixel electrode 5 and the common electrode 31 so as to generate an electric field between the substrates opposed to each other, a tilting operation (i.e., orientation) force is exerted onto the liquid crystal molecules 13a toward a direction in which the long axes thereof intersect with an electric field direction. Since the tilting orientation of the liquid crystal molecules 13a are specified, or in other words, controlled by the "pre-tilt" that has been applied in advance to the liquid crystal molecules 13a, it is always possible to tilt the liquid crystal molecules 13a into a predetermined desired orientation in a stable manner.

FIG. 7B is a diagram that schematically illustrates alignment control that is performed by means of a slit 33. In particular, FIG. 7B illustrates the orientation of the liquid crystal molecules 13a when an electric field is generated due to the application of an ON voltage to a liquid crystal layer. The liquid crystal molecules 13a of the liquid crystal layer having a negative dielectric anisotropy are aligned in a direction in which the long axes of the liquid crystal molecules 13a are oriented perpendicular to the surface of the substrate in its initial alignment state, that is, when an OFF voltage is applied thereto. When an ON voltage is applied between the pixel electrode 5 and the common electrode 31 so as to generate an electric field between the substrates opposed to each other, a tilting operation force is exerted onto the liquid crystal molecules 13a toward a direction in which the long axes thereof intersect with an electric field direction. An electric field that is generated at the slit 33 contains a horizontal directional component that is exerted across the slit 33. Therefore, with such a configuration, the liquid crystal molecules 13a are tilted from the center of the slit 33 toward the end thereof in a progressive manner in accordance with the strength of the electric field on the basis of the applied voltage.

Next, the layout of a light shielding film according to the present embodiment of the invention is described below. As illustrated in FIG. 2A, the light shielding film 30 is provided on (in) the color filter substrate 12. The light shielding film 30 is formed in a so-called grid pattern. Specifically, the grid-arrayed light shielding film 30 has, in the illustrated example, a longitudinal portion that extends in a direction along the long sides of each of the pixel electrodes 5 (longitudinal direction of each of the pixel electrodes 5) that are provided on the element substrate 11, which is the counter substrate opposed to the color filter substrate 12 in which the light shielding film 30 is provided. In other words, the grid-arrayed light shielding film 30 has the longitudinal portion that extends in a direction along the long sides of each of the sub pixels P, that is, the column direction (Y). In addition, the grid-arrayed light shielding film 30 further has, in the illustrated example, a latitudinal portion that extends in a direction along the short sides of each of the pixel electrodes 5 (latitudinal direction of each of the pixel electrodes 5). In other words, the grid-arrayed light shielding film 30 has the latitudinal portion that extends in a direction along the short sides of each of the sub pixels P, that is, the row direction (X). The longitudinal portion of the light shielding film 30 and the latitudinal portion thereof intersect with each other. The light shielding film 30 may be made of a photosensitive resin material having a light shutting property, where the photosensitive resin material is subjected to patterning treatment by means of a photolithography technique so as to form the light shielding film 30. Or, the light shielding film 30 may be made of two or three color components of the coloration films 29R, 29G, and 29B that make up the color filter, which are deposited one on another. As another non-limiting example of light shielding film formation methods/materials, the light shielding film 30 may be made of a light-shutting metal material, which is subjected to patterning treatment by means of a photo etching technique. As a few examples of the light-shielding metal material, tantalum (Ta) non-alloy, Ta alloy, chromium (Cr) non-alloy, or Cr alloy may be used though not limited thereto. In the present embodiment of the invention, it is assumed that the light shielding film 30 is configured by overlaying at least one coloration film 29 on another coloration film 29, where the above-mentioned at least one coloration film 29 and the above-mentioned another coloration film 29 have colors different from each other or one another.

As illustrated in FIG. 2A, the light shielding film 30 is made up of three portions 30a, 30b, and 30c. The portion 30a (longitudinal portion) extends in the column direction (Y) between each two of the plurality of sub pixels P that are arrayed adjacent to each other along the row direction (X). The portion 30b (latitudinal portion) extends in the row direction (X) between each two of the plurality of sub pixels P that are arrayed adjacent to each other along the column direction (Y). The portion 30c extends in the row direction (X) between each two adjacent ones of three sub pixel elements 5a, 5b, and 5c that are arrayed (connected) adjacent to each other in each of the plurality of the sub pixels P, to be more specifically, between the sub pixel element 5a and the sub pixel element 5b as well as between the sub pixel element 5b and the sub pixel element 5c. It is prior art to provide the light shielding film portions 30a and 30b at gap regions between the sub pixels P that are arrayed adjacent to one another. In contrast, in the prior art configuration, the light shielding film portion 30c has not been provided in gap regions between the sub pixel element 5a and the sub pixel element 5b as well as between the sub pixel element 5b and the sub pixel element 5c in each of the plurality of sub pixels P so far.

In the operation of the VA mode liquid crystal device, an oblique electric field is generated in a gap region between the sub pixel element 5a and the sub pixel element 5b as well as a gap region between the sub pixel element 5b and the sub pixel element 5c shown in FIG. 2B. The generated oblique electric field specifies the tilting orientation of the liquid crystal molecules. The gap region where an oblique electric field is generated is susceptible to the leakage of light. For this reason, in the configuration of a liquid crystal device of prior art, which does not have the light shielding film portion corresponding to the above-mentioned gap region between the sub pixel elements, the problem of a contrast decrease is likely to occur due to the leakage of light, which could eventually degrade the quality of image display. In contrast, in the configuration of a liquid crystal device according to the present embodiment of the invention, the light shielding film portion 30c is provided in the color filter substrate 12 on a gap region between the sub pixel element 5a and the sub pixel element 5b as well as a gap region between the sub pixel element 5b and the sub pixel element 5c. With such a unique configuration, it is possible to effectively prevent light from leaking through each gap region between these two sub pixel elements adjacent to each other. Therefore, it is further possible to prevent contrast from being decreased due to the leakage of light. As a result thereof, advantageously, the invention offers an enhanced image quality.

In the exemplary configuration according to the present embodiment of the invention, as illustrated in FIG. 2A, the light shielding film portion 30a and the light shielding film portion 30b, a combination of which block every gap region between each two of the plurality of sub pixels P that are adjacent to each other, are formed to have the same (i.e., matching) planar shape as that of the above-mentioned gap region between each two of the plurality of sub pixels P that are adjacent to each other. In addition thereto, the light shielding film portion 30c, which blocks every gap region between each two of the plurality of sub pixel elements 5a, 5b, and 5c that are adjacent to each other, that is, each gap region between the sub pixel element 5a and the sub pixel element 5b as well as each gap region between the sub pixel element 5b and the sub pixel element 5c, is formed to have the same (i.e., matching) planar shape as that of the above-mentioned gap region between each two of the plurality of sub pixel elements 5a, 5b, and 5c that are adjacent to each other. In the manufacturing process of a liquid crystal device according to the present embodiment of the invention, the element substrate 11 and the color filter substrate 12 are adhered to each other after determining the positions of the sides (i.e., edges) of the light shielding film portions 30a, 30b, and 30c so that each of which is in alignment with the corresponding one of the sides of the sub pixel elements 5a, 5b, and 5c in a plan view taken along the normal direction with respect to these substrates. With such a distinctively characteristic configuration, the invention makes it possible to prevent the leakage of light through any gap region between each two of the plurality of sub pixel elements 5a, 5b, and 5c that are adjacent to each other without sacrificing the aperture ratio of each pixel.

In the present embodiment of the invention, the light shielding film portion 30c formed at a gap region between each two of the plurality of (in the example described herein, three) island-shaped sub pixel elements 5a, 5b, and 5c that are arrayed adjacent to each other has a portion (i.e., region) that extends along, at least, a side of each of the sub pixel elements 5a, 5b, and 5c; and the light shielding film portion 30c formed at a gap region between each two of the plurality of island-shaped sub pixel elements 5a, 5b, and 5c that are arrayed adjacent to each other surrounds at least a part of the outer boundary of each of the island-shaped sub pixel elements 5a, 5b, and 5c. In addition, in the present embodiment of the invention, the light shielding film portion 30c is formed to have a planar shape that matches with that of a gap region between each two of the plurality of sub pixel elements 5a, 5b, and 5c that are adjacent to each other. With the layout configuration described above, it is possible to effectively prevent the leakage of light through a gap region between each two of the plurality of sub pixel elements 5a, 5b, and 5c that are adjacent to each other.

Variation Example

In the configuration described above in the foregoing exemplary embodiment of the invention, each of the light shielding film portion 30a and the light shielding film portion 30b, a combination of which correspond to every gap region between each two of the plurality of sub pixels P that are adjacent to each other, is formed to have the same width as that of the planar shape of the above-mentioned gap region between each two of the plurality of sub pixels P that are adjacent to each other. As a modified example of the configuration described above in the foregoing exemplary embodiment of the invention, each of the light shielding film portion 30a and the light shielding film portion 30b, a combination of which correspond to every gap region between each two of the plurality of sub pixels P that are adjacent to each other, may be formed to have a width that is narrower than the width of the planar shape of the above-mentioned gap region between each two of the plurality of sub pixels P that are adjacent to each other. When so configured, a gap/clearance is formed between each of the sides of the light shielding film portions 30a and 30b and the corresponding one of the sides of the sub pixels P. In addition, in the configuration described above in the foregoing exemplary embodiment of the invention, the light shielding film portion 30c, which corresponds to every gap region between each two of the plurality of sub pixel elements 5a, 5b, and 5c that are arrayed (connected) adjacent to each other in each of the plurality of the sub pixels P, is formed to have the same width as that of the planar shape of the above-mentioned gap region between each two of the plurality of sub pixel elements 5a, 5b, and 5c that are adjacent to each other. As a modified example of the configuration described above in the foregoing exemplary embodiment of the invention, the light shielding film portion 30c, which corresponds to every gap region between each two of the plurality of sub pixel elements 5a, 5b, and 5c that are adjacent to each other in each of the plurality of the sub pixels P, may be formed to have a width that is narrower than the width of the planar shape of the above-mentioned gap region between each two of the plurality of sub pixel elements 5a, 5b, and 5c that are adjacent to each other. When so configured, a gap/clearance is formed between each of the sides of the light shielding film portion 30c and the corresponding one of the sides of the sub pixel elements 5a, 5b, and 5c.

In the modified configuration described above in which a clearance is formed between each of the sides of the light shielding film portions 30a and 30b and the corresponding one of the sides of the sub pixels P, and/or between each of the sides of the light shielding film portion 30c and the corresponding one of the sides of the sub pixel elements 5a, 5b, and 5c, a positional misalignment between the element substrate 11 and the color filter substrate 12 is tolerated to a certain degree. That is, even in a case where some positional misalignment (margin of alignment error) occurs between the element substrate 11 and the color filter substrate 12 when these substrates are adhered to each other, such a clearance prevents the light shielding film portions 30a, 30b, and/or 30c from overlapping the sub pixel elements 5a, 5b, and 5c in a plan view. Therefore, the modified configuration described above makes it possible to effectively prevent the aperture ratio of each pixel from being decreased.

On the other hand, as another modified example of the configuration described above in the foregoing exemplary embodiment of the invention, each of the light shielding film portion 30a and the light shielding film portion 30b, a combination of which correspond to every gap region between each two of the plurality of sub pixels P that are adjacent to each other, may be formed to have a width that is wider than the width of the planar shape of the above-mentioned gap region between each two of the plurality of sub pixels P that are adjacent to each other. When so configured, each of the side portions/regions of the light shielding film portions 30a and 30b and the corresponding one of the side portions/regions of the sub pixels P partially overlap each other in a plan view. In addition, as another modified example of the configuration described above in the foregoing exemplary embodiment of the invention, the light shielding film portion 30c, which corresponds to every gap region between each two of the plurality of sub pixel elements 5a, 5b, and 5c that are adjacent to each other in each of the plurality of the sub pixels P, may be formed to have a width that is wider than the width of the planar shape of the above-mentioned gap region between each two of the plurality of sub pixel elements 5a, 5b, and 5c that are adjacent to each other. When so configured, each of the side portions/regions of the light shielding film portion 30c and the corresponding one of the side portions/regions of the sub pixel elements 5a, 5b, and 5c partially overlap each other in a plan view.

In the modified configuration described above in which each of the side portions/regions of the light shielding film portions 30a and 30b is configured to partially overlap the corresponding one of the side portions/regions of the sub pixels P in a plan view, it is possible to prevent, with an increased reliability, light from leaking through a gap region between each two of the plurality of sub pixels P that are adjacent to each other. Therefore, the modified configuration described above makes it possible to avoid contrast degradation with an enhanced light-shutting effect. Similarly, in the modified configuration described above in which each of the side portions/regions of the light shielding film portion 30c is configured to partially overlap the corresponding one of the side portions/regions of the sub pixel elements 5a, 5b, and 5c in a plan view, it is possible to prevent, with an increased reliability, light from leaking through a gap region between each two of the plurality of sub pixel elements 5a, 5b, and 5c that are adjacent to each other. Therefore, the modified configuration described above makes it possible to avoid contrast degradation with an enhanced light-shutting effect.

In the configuration of a liquid crystal device according to the foregoing exemplary embodiment of the invention illustrated in FIG. 2A, the light shielding film 30 is provided on (in) the color filter substrate 12. As a modified example of the configuration described above, the light shielding film 30 may be provided on (in) the element substrate 11. Since the pixel electrodes 5 are provided on the element substrate 11, such a configuration makes it possible to form the light shielding film 30 at a certain desired layout position, with a positional precision, with respect to the pixel electrodes 5 on the element substrate 11. That is, the provisioning of the light shielding film 30 on the element substrate 11 makes it possible to prevent any otherwise possible positional displacement between the light shielding film 30 and the pixel electrodes 5 that could be caused by a positional misalignment between the element substrate 11 and the color filter substrate 12 when these substrates are adhered to each other. Therefore, the modified configuration described above makes it possible to effectively prevent the aperture ratio of each pixel from being decreased. As another example of the modified configuration, some part (i.e., portion) of the light shielding film 30 may be formed on the element substrate 11, whereas other remaining part of the light shielding film 30 may be formed on the color filter substrate 12. With such an initially split configuration, the element-substrate (11) part of the light shielding film 30 is combined with the color-filter-substrate (12) part of the light shielding film 30 so as to make up one integrated light shielding film, which has the same layout as that illustrated in FIG. 2A, when the element substrate 11 and the color filter substrate 12 are adhered to each other.

Figure 8:
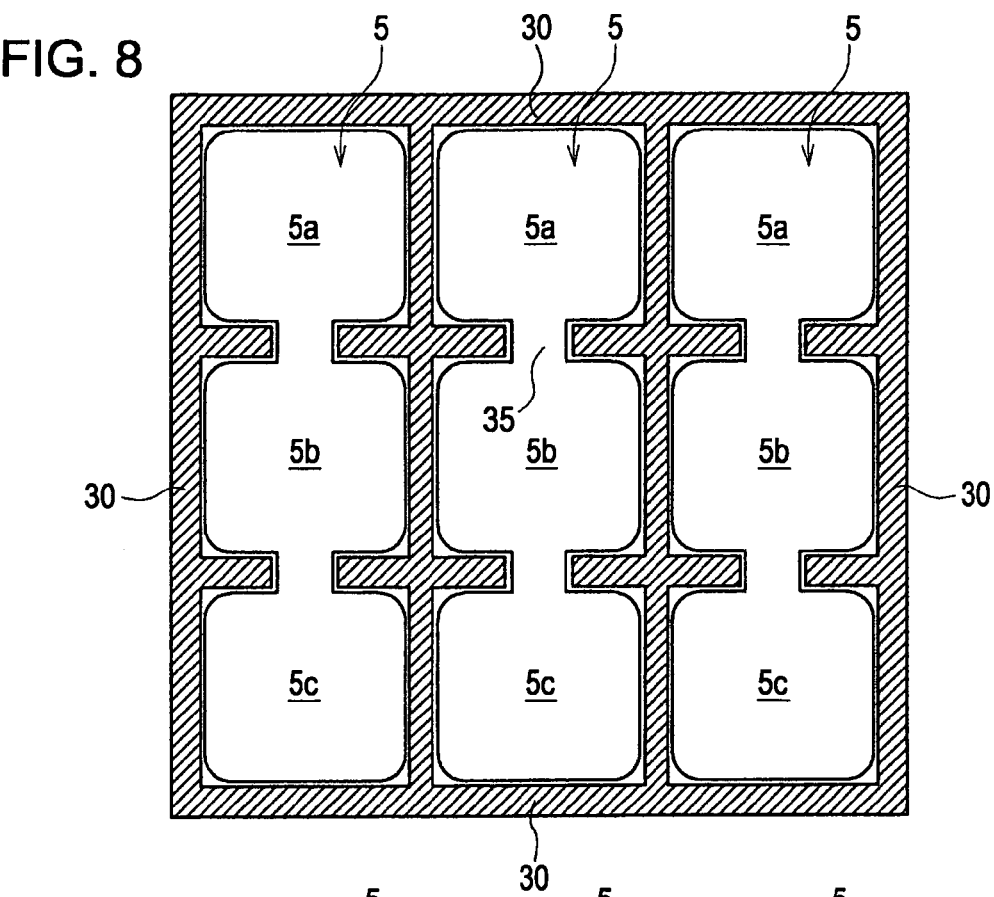
FIG. 8 is a plan view that schematically illustrates a variation example of the layout of a light shielding film.

In the configuration of a liquid crystal device according to the foregoing exemplary embodiment of the invention illustrated in FIG. 2A, the light shielding film 30 is provided on the entire region around the outer boundary of each of the sub pixel elements 5a, 5b, and 5c. As a modified example of the configuration described above, as illustrated in FIG. 8, the light shielding film 30 may be provided, on at least one of the element substrate 11 and the color filter substrate 12, on the entire region around the outer boundary of each of the sub pixel elements 5a, 5b, and 5c except for each region corresponding to the connection portion 35. In other words, the configuration of a liquid crystal device according to the foregoing exemplary embodiment of the invention may be modified in such a manner that the modified light shielding film 30, which has a first light shielding (film) portion that extends in a direction along which the island-shaped sub pixel elements 5a, 5b, and 5c are connected to one another and further has a second light shielding (film) portion that intersects with the first light shielding (film) portion and protrudes from the first light shielding (film) portion toward the connection portion 35, is provided on at least one of a pair of the element substrate 11 and the color filter substrate 12 opposed to each other in such a manner that the light shielding film 30 does not cover each region corresponding to the connection portion 35.

Figure 9:
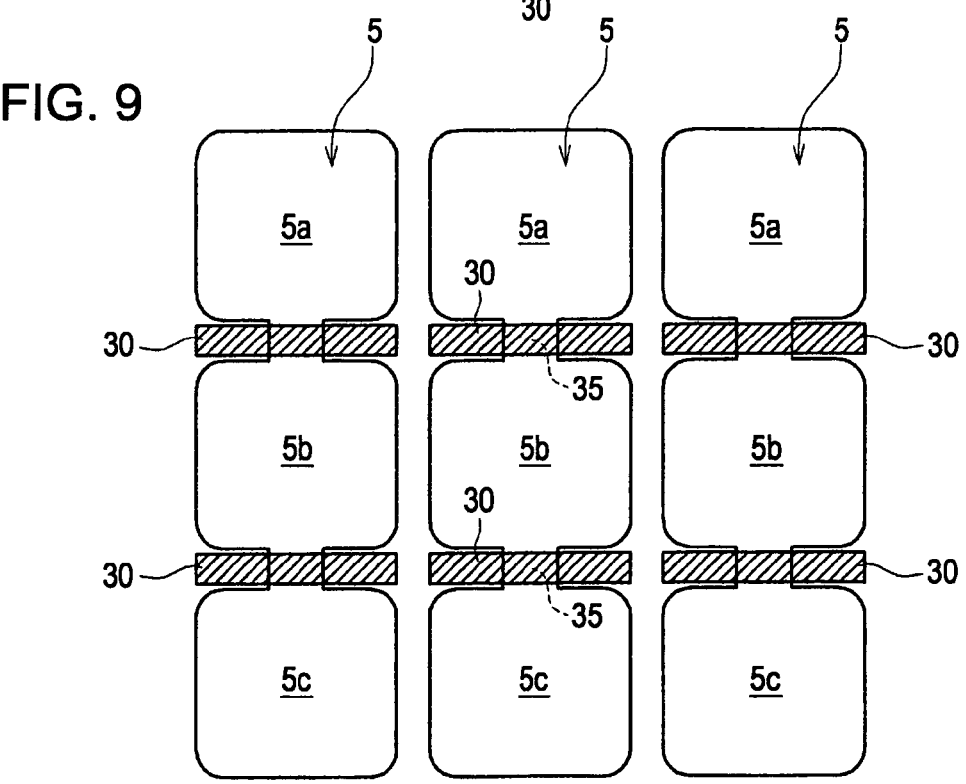
FIG. 9 is a plan view that schematically illustrates another variation example of the layout of a light shielding film.

As another example of the modified configuration, as illustrated in FIG. 9, the light shielding film 30 may be provided, on at least one of the element substrate 11 and the color filter substrate 12, on both of each region not corresponding to the connection portion 35 between each two of the plurality of sub pixel elements 5a, 5b, and 5c that are arrayed (connected) adjacent to each other and each region corresponding to the connection portion 35 between each two of the plurality of sub pixel elements 5a, 5b, and 5c that are arrayed (connected) adjacent to each other, while, on the other hand, the modified light shielding film 30 covers none of outer regions along the sides and around corners of each of the sub pixel elements 5a, 5b, and 5c. In other words, the configuration of a liquid crystal device according to the foregoing exemplary embodiment of the invention may be modified in such a manner that the modified light shielding film 30 is provided on at least one of a pair of the element substrate 11 and the color filter substrate 12 opposed to each other in each gap region having the connection portion 35 between each two of the plurality of island-shaped sub pixel elements 5a, 5b, and 5c that are arrayed adjacent to each other (i.e., between the sub pixel element 5a and the adjacent sub pixel element 5b, and between the sub pixel element 5b and the adjacent sub pixel element 5c), while, on the other hand, the modified light shielding film 30 does not cover each gap region not having the connection portion 35 between the sub pixel element 5a and the adjacent sub pixel element 5a, between the sub pixel element 5b and the adjacent sub pixel element 5b, and between the sub pixel element 5c and the adjacent sub pixel element 5c.

Figure 10:
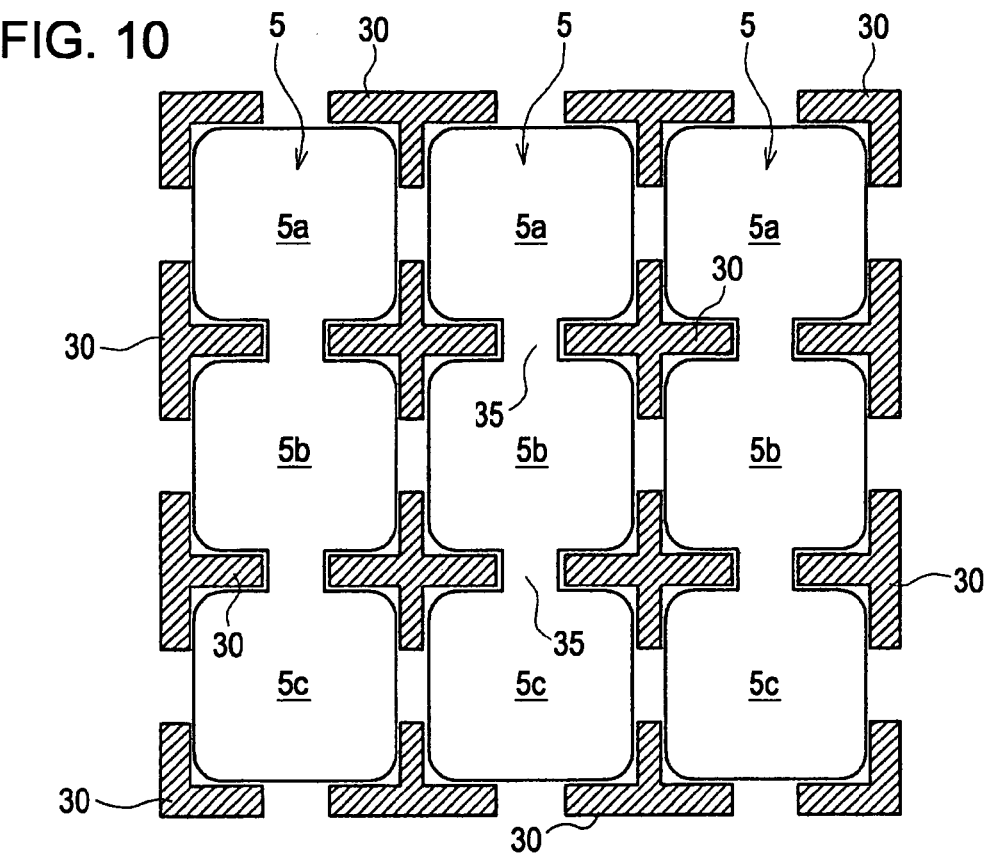
FIG. 10 is a plan view that schematically illustrates still another variation example of the layout of a light shielding film.

As still another example of the modified configuration, as illustrated in FIG. 10, the light shielding film 30 may be provided, on at least one of the element substrate 11 and the color filter substrate 12, on each region not corresponding to the connection portion 35 between each two of the plurality of sub pixel elements 5a, 5b, and 5c that are arrayed adjacent to each other and each of outer regions around the corners of each of the sub pixel elements 5a, 5b, and 5c, while, on the other hand, the modified light shielding film 30 covers none of outer regions along the center areas of the sides of each of the sub pixel elements 5a, 5b, and 5c. In other words, the configuration of a liquid crystal device according to the foregoing exemplary embodiment of the invention may be modified in such a manner that the modified light shielding film 30 does not cover a part of each of the sides of each of the sub pixel elements 5a, 5b, and 5c, while, on the other hand, the modified light shielding film 30 has a cross shape at a region surrounded by four island-shaped sub pixel elements arrayed adjacent to one another (for example, sub pixel elements 5a, 5a, 5b, and 5b, though not limited thereto).

Figure 11:
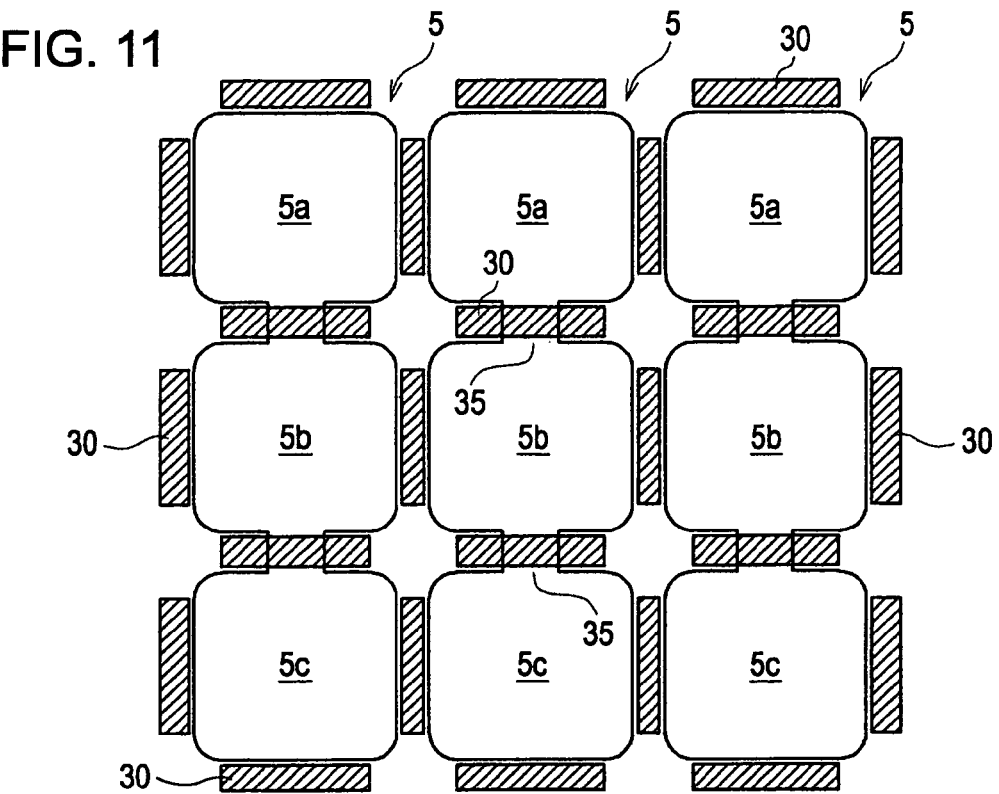
FIG. 11 is a plan view that schematically illustrates still another variation example of the layout of a light shielding film.

As still another example of the modified configuration, as illustrated in FIG. 11, the light shielding film 30 may be provided, on at least one of the element substrate 11 and the color filter substrate 12, on both of each region not corresponding to the connection portion 35 between each two of the plurality of sub pixel elements 5a, 5b, and 5c that are arrayed adjacent to each other and each region corresponding to the connection portion 35 between each two of the plurality of sub pixel elements 5a, 5b, and 5c that are arrayed adjacent to each other, and in addition, on each of outer regions along the sides of each of the sub pixel elements 5a, 5b, and 5c while, on the other hand, the modified light shielding film 30 covers none of outer regions around the corners of each of the sub pixel elements 5a, 5b, and 5c.

Second Embodiment of Liquid Crystal Device

Figure 12A:
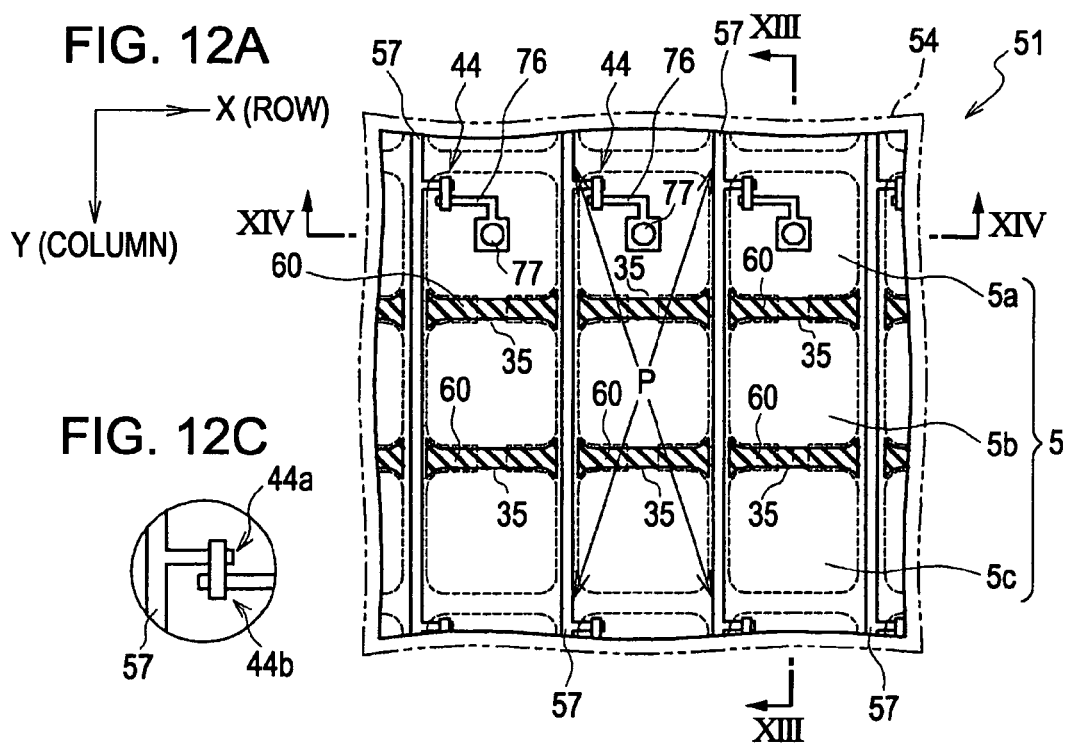
FIGS. 12A and 12B is a set of plan views that schematically illustrates an example of an essential part of a liquid crystal device according to a second embodiment of the invention, where
Figure 12C:
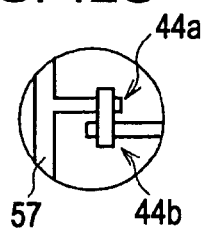
Figure 12B:
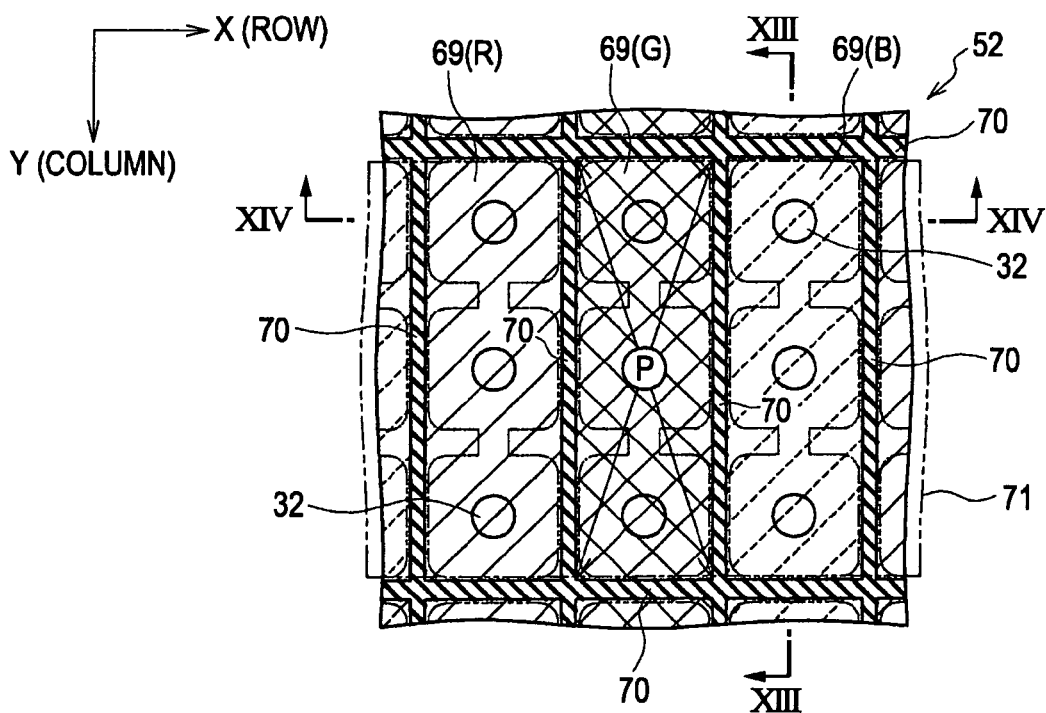
Figure 13:
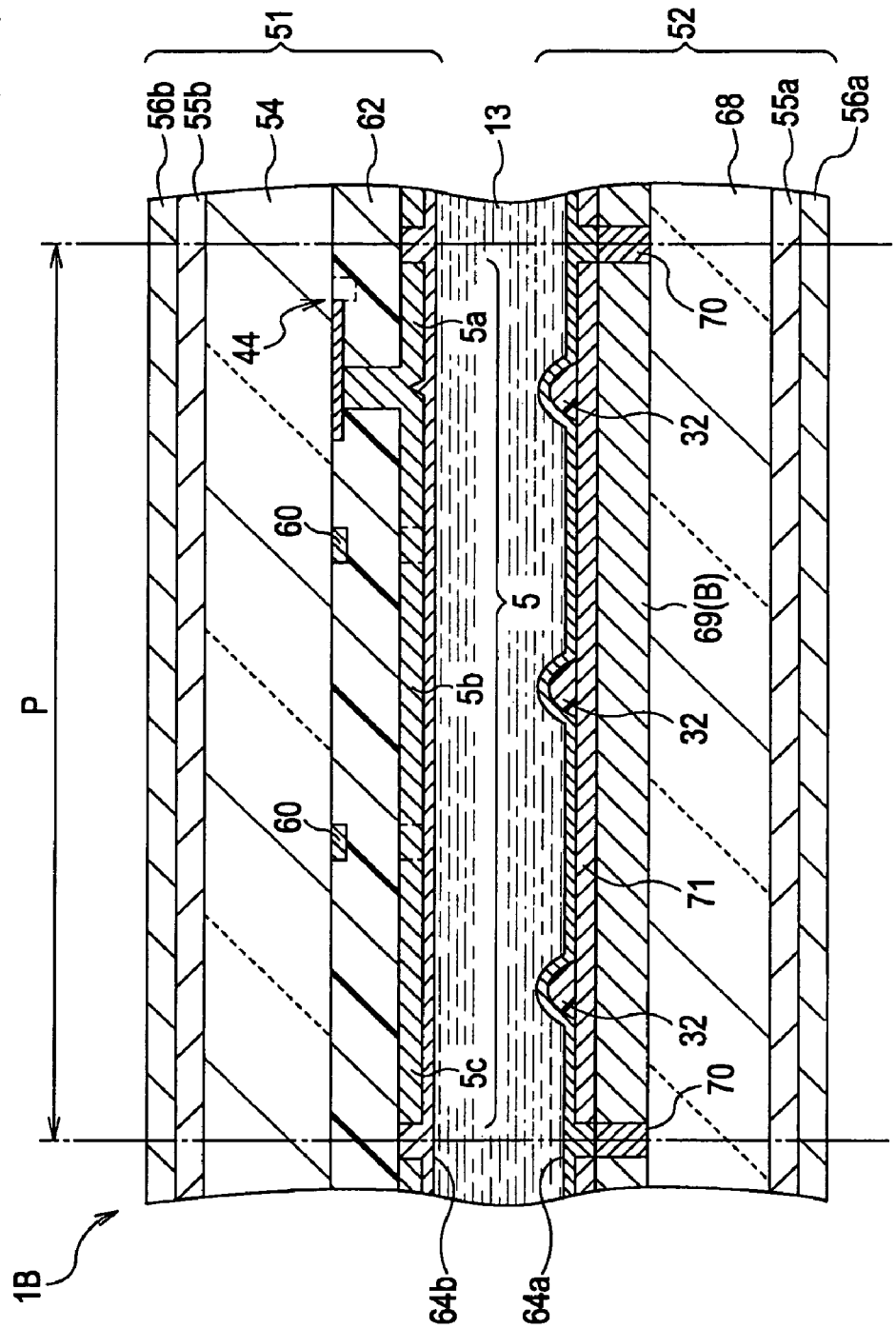
FIG. 13 is a sectional view taken along the line XIII-XIII of FIGS. 12A and 12B, which extends in the direction in which each column extends, that is, the Y direction.
Figure 14:
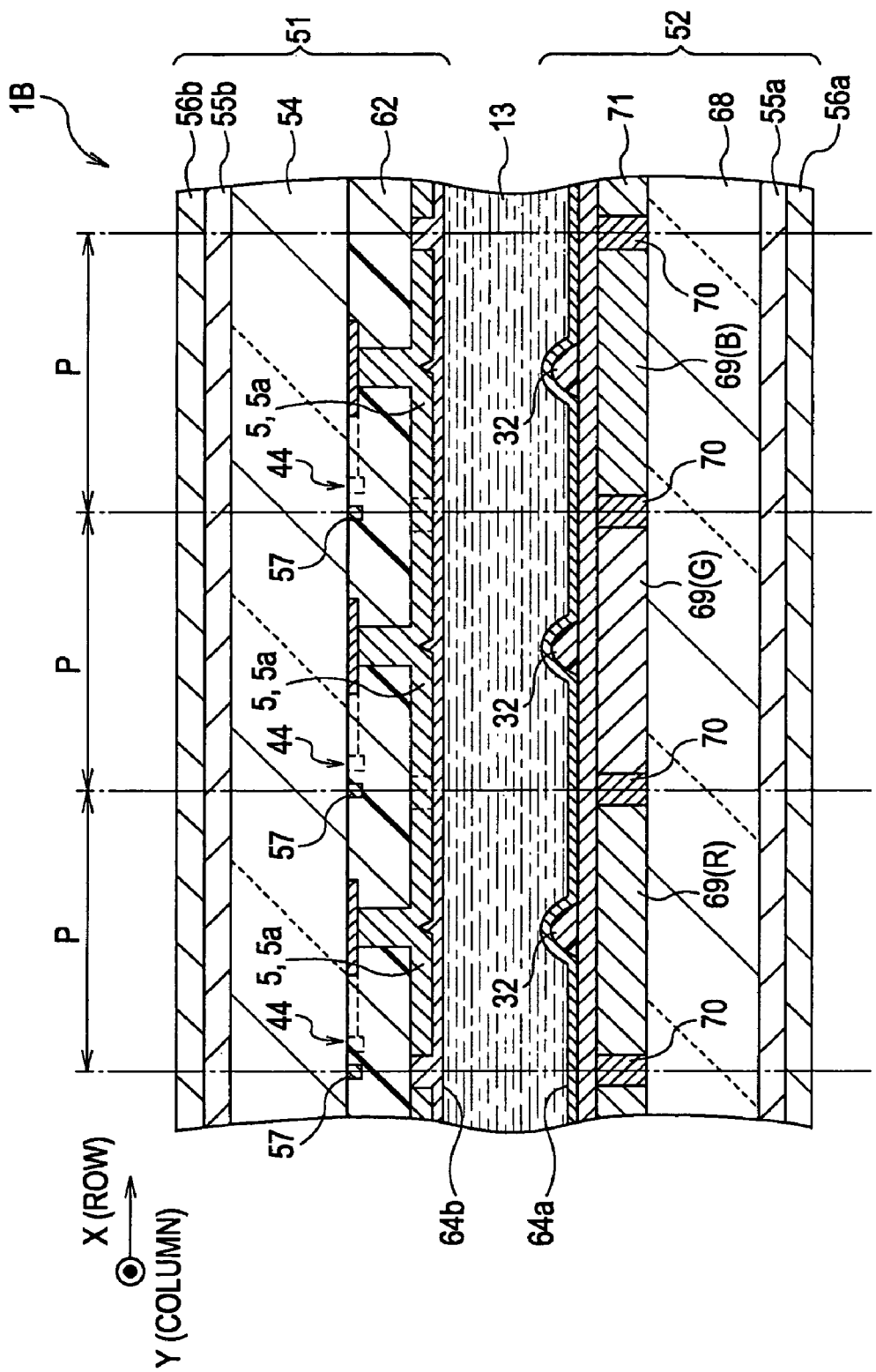
FIG. 14 is a sectional view taken along the line XIV-XIV of FIGS. 12A and 12B, which extends in the direction in which each row extends, that is, the X direction.

With reference to FIGS. 12, 13, and 14, a liquid crystal device according to a second embodiment of the invention is described below. In the second embodiment of the invention, the characteristic layout of a light shielding film according to the invention is applied to a transmissive mode active matrix liquid-crystal device that uses thin film diodes (TFD) as its switching elements.

FIG. 12A is a plan view that schematically illustrates an example of the configuration of one pixel that lies on an element substrate. FIG. 12B is a plan view that schematically illustrates an example of the configuration of one pixel that lies on a color filter substrate. Each of FIGS. 12A and 12B shows a two-dimensional layout of pixel constituent elements of a substrate, which is viewed from the observation side. Specifically, FIG. 12A illustrates the planar configuration of one pixel formed on an element substrate, which is viewed from an outer side opposite to a liquid-crystal-layer side. On the other hand, FIG. 12B illustrates the planar configuration of one pixel formed on a color filter substrate, which is viewed from the liquid-crystal-layer side. FIG. 13 is a sectional view taken along the line XIII-XIII of FIGS. 12A and 12B, which extends in the direction in which each column extends, that is, the Y direction. FIG. 14 is a sectional view taken along the line XIV-XIV of FIGS. 12A and 12B, which extends in the direction in which each row extends, that is, the X direction.

First of all, with reference to the sectional views illustrated in FIGS. 13 and 14, the general configuration of the liquid crystal device according to the present embodiment of the invention is explained. The liquid crystal device 1B according to the present embodiment of the invention is provided with an element substrate 51 and a color filter substrate 52. The element substrate 51 and the color filter substrate 52 are adhered to each other with a cell gap being interposed therebetween, which is a clearance having a certain distance. Liquid crystal is injected and sealed inside the cell gap so as to constitute the liquid crystal layer 13. Nematic liquid crystal having a negative dielectric anisotropy is used as the liquid crystal component of the liquid crystal layer 13. In the present embodiment of the invention, the element substrate 51 is provided at a position closer to an observation side, whereas the color filter substrate 52 is provided at an opposite position that is not closer to the observation side. An illumination device that is not shown in the drawing is provided outside the color filter substrate 52. The illumination device functions as a backlight. Transmissive mode display is performed by means of light that is emitted from the illumination device.

The element substrate 51 has a substrate 54 that is made of a translucent material such as a silica glass, plastic, or the like. A second phase difference retardation film 55b is deposited on the outer surface of the substrate 54. A second polarization sheet (i.e., polarizing plate) 56b is deposited on the second phase difference retardation film 55b. If needed, a plurality of the second phase difference retardation films 55b may be provided. In the present embodiment of the invention, in which the liquid crystal device 1B performs transmissive mode display, the second phase difference retardation film 55b includes, as its constituent elements, without any limitation thereto, a $\lambda/4$ film (i.e., sheet/plate) that functions to form circularly-polarized light, a phase difference compensation film (i.e., sheet/plate) that functions to compensate for a phase difference.

A plurality of data lines 57, a plurality of element-substrate-side light shielding films 60, and a plurality of TFD elements 44 are provided on the inner surface of the translucent substrate 54. As illustrated in FIG. 12A, each of the plurality of the data lines 57 extends in the column direction (Y). The plurality of the data lines 57 is arrayed in parallel with one another with a predetermined X-directional pitch (i.e., interval) being allocated each between two adjacent data lines 57. Each of the data lines 57 supplies, for example, a data signal. As illustrated in FIG. 12A, each of the element-substrate-side light shielding films 60 is formed to have an elongated dot ("island") pattern extending in the row direction (X) each between two adjacent data lines 57. Each of the left end and the right end of each of the element-substrate-side light shielding films 60 is not in contact with the corresponding one of the data lines 57. As illustrated in FIGS. 13 and 14, a resin film 62 is deposited on the data lines 57, the element-substrate-side light shielding films 60, and the TFD elements 44. The resin film 62 is made of an insulating synthetic resin, or an insulating organic material. The pixel electrodes 5, which are made of ITO, IZO, or the like, are formed on the resin film 62. A vertical alignment film 64b is deposited on the pixel electrodes 5. Each of the pixel electrodes 5 has a special planar configuration for achieving vertically aligned (VA) mode operations.

The color filter substrate 52 has a substrate 68 that is made of a translucent material such as a silica glass, plastic, or the like. A first phase difference retardation film 55a is deposited on the outer surface of the substrate 68. A first polarization sheet (i.e., polarizing plate) 56a is deposited on the first phase difference retardation film 55a. As the second phase difference retardation film 55b includes, as its constituent elements, without any limitation thereto, the $\lambda/4$ film and the phase difference compensation film, so does the first phase difference retardation film 55a.

A coloration film 69, which constitutes a color filter, is provided on the inner surface of the translucent substrate 68. The suffixes attached to the reference numeral 69, that is, the letters "R, G, and B", indicate that the coloration films 69 (i.e., coloration films 69R, 69G, and 69B) are a red coloration film, a green coloration film, and a blue coloration film, respectively. In the present embodiment of the invention, a stripe array pattern is adopted. Accordingly, the coloration layers 69 of the same color component are arrayed to form a line in the column direction (Y). In the illustrated example of FIG. 13 (FIG. 12B), blue coloration layers 69B are aligned in the column direction (Y). When viewed from an orthogonal direction thereof, the coloration layers 69 of different color components, 69R, 69G, and 69B, are arrayed in a repetitive sequential order along the row direction (X) as shown in FIG. 14 (FIG. 12B). A color-filter-substrate-side light shielding film 70 is provided each between two adjacent coloration films 69. As illustrated in FIG. 12B, the color-filter-substrate-side light shielding film 70 is formed in a grid pattern so as to surround each of the coloration films 69. The color-filter-substrate-side light shielding film 70 may be made of a resin material having a light shutting property. Or, it may be made of a light-shutting metal material. As an example of another alternative configuration, the color-filter-substrate-side light shielding film 70 may be configured by overlaying at least one coloration film 69, which is a resin film, on another coloration film 69, where the above-mentioned at least one coloration film 69 and the above-mentioned another coloration film 69 have colors different from each other or one another. In the present embodiment of the invention, it is assumed that the color-filter-substrate-side light shielding film 70 is configured by overlaying at least one coloration film 69 on another coloration film 69, where the above-mentioned at least one coloration film 69 and the above-mentioned another coloration film 69 have colors different from each other or one another. If needed, a planarizing film may be deposited on the coloration film 69 and the color-filter-substrate-side light shielding film 70. A more detailed explanation of the color-filter-substrate-side light shielding film 70 will be given later.

A plurality of band-like common electrodes 71, each of which constitutes a counter electrode opposed to the corresponding one of the pixel electrodes 5, are provided on the coloration film 69 and the color-filter-substrate-side light shielding film 70. The common electrode 71 functions as a scanning line that supplies, for example, a scanning signal. The common electrode 71 is made of ITO, IZO, or the like, that is, the same material as that of the pixel electrode 5. Each of the plurality of the band-like common electrodes 71 extends in the row direction (X). The plurality of the common electrodes 71 is arrayed in parallel with one another with a predetermined Y-directional pitch (i.e., interval) being allocated each between two adjacent common electrodes 71. A plurality of projections 32 is provided on the surface of the common electrode 71. Each of the projections 32, which are made of dielectric substances, functions as an alignment control means. A vertical alignment film (i.e., vertical orientation film) 64a is deposited on the common electrode 71. The vertical alignment film 64a covers the projections 32.

Liquid crystal molecules of the liquid crystal layer 13 are oriented in a direction perpendicular to the surfaces of the substrates in its initial alignment state, that is, when an OFF voltage is applied thereto, through the functioning of the vertical alignment films 64a and 64b. The orientation direction perpendicular to the surfaces of the substrates is shown as the vertical direction in FIGS. 13 and 14. The liquid crystal molecules are aligned in an oblique direction (i.e., slanted, or inclined) in the proximity of each of the projections 32 in such a manner that the liquid crystal molecules are oriented to be perpendicular to the surface of each of the projections 32. With the initial alignment state of the liquid crystal molecules described above, the tilting orientation (i.e., direction) of the liquid crystal molecules at the time of application of an ON voltage to the liquid crystal layer 13 is specified in a desired manner so as to ensure a stable (i.e., reliable) orientation change operations of the liquid crystal molecules.

Next, with reference to FIGS. 12A and 12B, the planar configuration of one pixel is explained below. FIG. 12A illustrates the planar configuration of one pixel formed on the element substrate 51, which is viewed from the observation side of FIGS. 13 and 14, that is, the upper side of each of these drawings. On the other hand, FIG. 12B illustrates the planar configuration of the color filter substrate 52, which is viewed from the observation side of FIGS. 13 and 14, that is, the upper side of each of these drawings. A positional alignment between the element substrate 51 illustrated in FIG. 12A and the color filter substrate 52 illustrated in FIG. 12B is performed in such a manner that they become opposed to each other without inverting the orientation of either one thereof, for example, without turning it upside down. In other words, either one of the element substrate 51 illustrated in FIG. 12A and the color filter substrate 52 illustrated in FIG. 12B is translated (i.e., moved in parallel), which means that it is moved without changing its orientation illustrated in the drawing, to become opposed to the other. Liquid crystal is injected and sealed between the element substrate 51 illustrated in FIG. 12A and the color filter substrate 52 illustrated in FIG. 12B that are opposed to each other. It should be noted that the second phase difference retardation film 55b and the second polarization sheet 56b are not shown in FIG. 12A. In addition, the translucent substrate 54 is shown by means of virtual chain lines in FIG. 12A. On the other hand, the vertical alignment film 64a is not shown in FIG. 12B.

The plurality of the pixel electrodes 5 are arrayed on the element substrate 51 in a so-called matrix pattern that is made up of a plurality of rows extending in the X direction and a plurality of columns extending in the Y direction. On the other hand, each of the plurality of band-like, so-called "stripe-arrayed" common electrodes 71 that are formed on the color filter substrate 52 overlaps the corresponding one of the pixel electrodes 5 in a plan view when the element substrate 11 and the color filter substrate 12 are adhered to each other. Each of rectangular areas, which contain planar regions where the pixel electrodes 5 and the common electrodes 71 overlap each other (i.e., the pixel electrodes 5 are arrayed over the common electrodes 71, constitutes one sub pixel P. The sub pixel P constitutes the minimum unit for making a switchover between bright display (white display) and dark display (black display).

The plurality of sub pixels P is formed adjacent to one another in a pixel plane. These sub pixels P are arrayed in a so-called matrix pattern that is made up of a plurality of rows extending in the X direction and a plurality of columns extending in the Y direction. These sub pixels P make up, in combination thereof, an image display area. When viewed in two dimensions, that is, in a plan view, each individual sub pixel P corresponds to one color component of the coloration filter 69 provided on the color filter substrate 52 shown in FIG. 12B, that is, either one of the red coloration film 69R, the green coloration film 69G, and the blue coloration film 69B. Three color components, that is, R, G, and B, of the sub pixels P (i.e., three sub pixels P) arrayed in the row direction (X) make up one pixel. If the number of color components of the coloration film 69 is configured to be more than three, for example, if the number of color components of the coloration film 69 is configured to be four in a modified implementation of the invention, each one pixel is constituted by a group of four sub pixels P each of which corresponds to one color component different from the remaining three thereof.

The pixel electrodes 5 are arrayed in a matrix pattern that has a plurality of rows extending in the X direction and a plurality of columns extending in the Y direction. Each of the pixel electrodes 5 is made up of a plurality of sub pixel elements (i.e., pixel-electrode elements) each of which has a dot-like pattern, or in other words, an "island" pattern. In the present embodiment of the invention, it is assumed that one pixel electrode 5 has three sub pixel elements 5a, 5b, and 5c as its constituent elements. The sub pixel elements 5a and 5b are electrically connected to each other at the substantially central area of the gap space therebetween via the connection portion 35 that is configured as a narrow path. In addition, the sub pixel elements 5b and 5c are also electrically connected to each other at the substantially central area of the gap space therebetween via another connection portion 35 that is also configured as a narrow path. These sub pixel elements 5a, 5b, and 5c, which are electrically connected to one another by means of these connection portions 35, make up one pixel electrode 5 that is elongated in the column direction (Y). Each individual region at which the sub pixel element 5a, 5b, or 5c is provided is sometimes called as a sub dot. As illustrated in FIG. 12A, open gap regions that are provided both on the left and right of each of the connection portions 35 constitute "cutout" spaces that are not covered by the pixel electrode 5. Each of the cutout portions functions as a slit that generates an oblique electric field for controlling the orientation of liquid crystal molecules in the VA mode operations. In the illustrated example, each of the sub pixel elements 5a, 5b, and 5c is configured to have a substantially square shape; and in addition thereto, each of four corners thereof is rounded into an arc shape.

As illustrated in FIG. 12A, the TFD element 44 is provided at one corner of each of the sub pixels P formed on the element substrate 51. The TFD element 44 has a so-called "back-to-back" configuration. That is, as illustrated in its partial enlarged view FIG. 12C, each of the TFD elements 44 is made up of two TFD element components (i.e., sub-elements) 44a and 44b that are electrically connected in series in reversed polarity. Each of the TFD element components 44a and 44b is configured to have a laminated electrode structure. Specifically, when viewed from the translucent-substrate-(54)-side, each of the TFD element components 44a and 44b is made up of a first electrode made of Ta non-alloy or Ta-alloy, an anode oxide film formed on the first electrode (i.e., Ta oxide), and a second electrode formed on the anode oxide film, where the second electrode is made of Cr non-alloy or Cr alloy. Each of the TFD elements 44 turns into an ON state when a voltage of a predetermined level or greater is applied between the first electrode and the second electrode. The first electrode of the first TFD element component 44a of each of the TFD elements 44 is electrically connected to the corresponding one of the data lines 57. On the other hand, the second electrode of the second TFD element component 44b of each of the TFD elements 44 is connected to the sub pixel element 5a of the corresponding one of the pixel electrodes 5, which lies at the TFD-element (44) side, in an electrically conductive manner through a connection line portion 76, which extends from the above-mentioned second electrode thereof, and a contact hole 77. The contact hole 77 is formed at the substantially central position of each of the TFD-side sub pixel elements 5a.

As understood from FIGS. 12A and 12B, each of the projections 32 formed on the common electrode 71 as shown in FIG. 13, which functions as an alignment control means, is provided at the substantially central position of the corresponding one of the sub pixel elements 5a, 5b, and 5c, which is viewed along a normal direction with respect to the substrate in two dimensions. With such a configuration, the liquid crystal molecules become tilted in a direction from the center of each of the sub pixel elements 5a, 5b, and 5c toward the sides (i.e., edges) thereof when an ON voltage is applied to the liquid crystal. Each of the projections 32 has the shape of a circle in a plan view taken along the normal direction with respect to the substrate. On the other hand, when viewed horizontally along a direction parallel to the substrate, each of the projections 32 has the shape of a round chevron or a hemisphere that bulges outward. Such chevron-shaped or hemispheric projections 32 make it possible to obtain the radial orientation of the liquid crystal molecules around each of the projections 32. That is, in a plan view, the orientation direction of the liquid crystal molecules varies in a progressive manner in the angular range of three hundred and sixty (360°) degrees with each of the projections 32 being the center of the radial orientation thereof. By this means, it is possible to form a so-called "multi-domain" in a stable manner. Notwithstanding the foregoing, the shape of each of the projections 32 may be modified into any arbitrary one as long as the orientation of the liquid crystal molecules is controlled in a certain alignment direction.

Next, the layout of a light shielding film according to the present embodiment of the invention is described below. As illustrated in FIGS. 12A and 12B, a light shielding film according to the present embodiment of the invention is formed in an initially split configuration; that is, the light shielding film portion 60 is formed on the element substrate 51, whereas the light shielding film portion 70 is formed on the color filter substrate 52. The light shielding film portion 60, which is formed on the element substrate 51, is provided on a gap region between the sub pixel element 5a and the sub pixel element 5b as well as a gap region between the sub pixel element 5b and the sub pixel element 5c in each of the pixel electrodes 5. Each of the element-substrate-side light shielding films 60 is formed to have an elongated dot ("island") pattern each between two adjacent data lines 57. The plurality of element-substrate-side light shielding films 60 is arrayed to form "perforated" lines along the row direction (X) with the data lines 57 extending in the orthogonal direction thereof to cut each of the light-shielding lines. The element-substrate-side light shielding film 60 extends in a direction along the short sides of each of the pixel electrodes 5 (in the illustrated example, latitudinal direction of each of the pixel electrodes 5). In other words, the element-substrate-side light shielding film 60 extends in a direction along the short sides of each of the sub pixels P, that is, the row direction (X).

The element-substrate-side light shielding film 60 is formed both on a gap region which covers the connection portion 35 between the sub pixel element 5a and the sub pixel element 5b in each of the pixel electrodes 5 and on a gap region which does not cover the connection portion 35 between the sub pixel element 5a and the sub pixel element 5b in each of the pixel electrodes 5; and in addition, the element-substrate-side light shielding film 60 is also formed both on a gap region which covers the connection portion 35 between the sub pixel element 5b and the sub pixel element 5c in each of the pixel electrodes 5 and on a gap region which does not cover the connection portion 35 between the sub pixel element 5b and the sub pixel element 5c in each of the pixel electrodes 5. In addition, in the present embodiment of the invention, the element-substrate-side light shielding film 60 is formed to have a planar shape that matches with that of a gap region between each two of the plurality of sub pixel elements 5a, 5b, and 5c that are adjacent to each other. The element-substrate-side light shielding film 60 is patterned into such a planar configuration by means of a photolithography technique. That is, the element-substrate-side light shielding film 60 is formed to block the entire region of a gap between each two of the plurality of sub pixel elements 5a, 5b, and 5c that are adjacent to each other, which means that no clearance is formed therebetween. Since the element-substrate-side light shielding films 60 are formed on the same substrate as that of the pixel electrodes 5, it is possible to provide the element-substrate-side light shielding films 60 at accurate positions with respect to the pixel electrodes 5.

The layer structure of the element-substrate-side light shielding film 60 is the same as the partial lamination structure of the TFD element 44, specifically, a lamination of the first electrode and the anode oxide film. For example, the element-substrate-side light shielding film 60 is configured as a lamination of Ta oxide formed on Ta. Although it is possible to form the element-substrate-side light shielding film 60 by means of a dedicated material that is not common to the material of the TFD element 44, it is advantageous to use the same lamination structure as that of the TFD element 44 as described above because, if the same lamination structure is adopted, it is possible to use the same material both for the element-substrate-side light shielding film 60 and the TFD element 44 and thus to simplify their manufacturing process. Notwithstanding the foregoing, the element-substrate-side light shielding film 60 may be configured as a Ta monolayer, a Cr monolayer, or the like.

The light shielding film portion 70, which is provided on the color filter substrate 52, is formed in a grid pattern so as to surround each of the sub pixels P. That is, the color-filter-substrate-side light shielding film 70 has a linear portion that extends in the row direction (X) and a linear portion that extends in the column direction (Y), where the former portion and the latter portion intersect with each other. The color-filter-substrate-side light shielding film 70 is formed to block a gap region between each two of the plurality of sub pixels P that are arrayed adjacent to each other along the row direction (X) and a gap region between each two of the plurality of sub pixels P that are arrayed adjacent to each other along the column direction (Y). When the element substrate 51 and the color filter substrate 52 are adhered to each other, each of both ends along the row direction (X), that is, the left-end and the right end, of each of the element-substrate-side light shielding films 60 becomes in contact with the corresponding inner side of the longitudinal portion, which extends in the column direction (Y), of the color-filter-substrate-side light shielding film 70, which is provided on the counter substrate opposed to the element substrate 51, that is, the color filter substrate 52. In the configuration described above, it is preferable that each of both ends along the row direction (X) of each of the element-substrate-side light shielding films 60 should become in contact with the corresponding inner side of the longitudinal portion of the color-filter-substrate-side light shielding film 70 with no clearance being left therebetween.

The color-filter-substrate-side light shielding film 70 is formed in a so-called grid pattern. Specifically, the grid-arrayed color-filter-substrate-side light shielding film 70 has, in the illustrated example, a longitudinal portion that extends in a direction along the long sides of each of the pixel electrodes 5 (longitudinal direction of each of the pixel electrodes 5) that are provided on the element substrate 51, which is the counter substrate opposed to the color filter substrate 52 in which color-filter-substrate-side light shielding film 70 is provided. In other words, the grid-arrayed color-filter-substrate-side light shielding film 70 has the longitudinal portion that extends in a direction along the long sides of each of the sub pixels P, that is, the column direction (Y). In addition, the grid-arrayed color-filter-substrate-side light shielding film 70 further has, in the illustrated example, a latitudinal portion that extends in a direction along the short sides of each of the pixel electrodes 5 (latitudinal direction of each of the pixel electrodes 5). In other words, the grid-arrayed color-filter-substrate-side light shielding film 70 has the latitudinal portion that extends in a direction along the short sides of each of the sub pixels P, that is, the row direction (X). The longitudinal portion of the color-filter-substrate-side light shielding film 70 and the latitudinal portion thereof intersect with each other. The color-filter-substrate-side light shielding film 70 may be made of a photosensitive resin material having a light shutting property, where the photosensitive resin material is subjected to patterning treatment by means of a photolithography technique so as to form the color-filter-substrate-side light shielding film 70. Or, the color-filter-substrate-side light shielding film 70 may be made of two or three color components of the coloration films 69R, 69G, and 69B that make up the color filter, which are deposited one on another. As another non-limiting example of light shielding film formation methods/materials, the color-filter-substrate-side light shielding film 70 may be made of a light-shutting metal material, which is subjected to patterning treatment by means of a photo etching technique. As a few examples of the light-shielding metal material, tantalum (Ta) non-alloy, Ta alloy, chromium (Cr) non-alloy, or Cr alloy may be used though not limited thereto. In the present embodiment of the invention, it is assumed that the color-filter-substrate-side light shielding film 70 is configured by overlaying at least one coloration film 69 on another coloration film 69, where the above-mentioned at least one coloration film 69 and the above-mentioned another coloration film 69 have colors different from each other or one another.

As a result of the adhesion of the element substrate 11 to the color filter substrate 12, the color-filter-substrate-side light shielding film 70 is arrayed so as to surround each of the pixel electrodes 5 provided on the element substrate 51. In addition thereto, each of both ends along the row direction (X) of each of the element-substrate-side light shielding films 60 becomes in contact with the corresponding inner side of the longitudinal portion of the color-filter-substrate-side light shielding film 70, which extends in the column direction (Y). By this means, the entire gap region around each of the sub pixels P is light-shielded by the color-filter-substrate-side light shielding film 70, while, on the other hand, the entire gap region between each two of the plurality of sub pixel elements 5a, 5b, and 5c that are arrayed adjacent to each other in each of the plurality of the sub pixels P is light-shielded by the element-substrate-side light shielding film 60. It is prior art to provide the light shielding film portion 70 at gap regions between the sub pixels P that are arrayed adjacent to one another in the row direction (X) and in the column direction (Y) as illustrated in FIG. 12B. In contrast, in the prior art configuration, the light shielding film portion 60 has not been provided in gap regions between the sub pixel element 5a and the sub pixel element 5b as well as between the sub pixel element 5b and the sub pixel element 5c that are arrayed adjacent to each other in each of the plurality of the sub pixels P as illustrated in FIG. 12A so far.

In the operation of the VA mode liquid crystal device, an oblique electric field is generated in a gap region between the sub pixel element 5a and the sub pixel element 5b as well as a gap region between the sub pixel element 5*b* and the sub pixel element 5*c*. The generated oblique electric field specifies the tilting orientation of the liquid crystal molecules. The gap region where an oblique electric field is generated is susceptible to the leakage of light. For this reason, in the configuration of a liquid crystal device of prior art, which does not have the light shielding film portion corresponding to the above-mentioned gap region between the sub pixel elements, the problem of a contrast decrease is likely to occur due to the leakage of light, which could eventually degrade the quality of image display. In contrast, in the configuration of a liquid crystal device according to the present embodiment of the invention, the light shielding film portion 60 is provided on a gap region between the sub pixel element 5*a* and the sub pixel element 5*b* as well as a gap region between the sub pixel element 5*b* and the sub pixel element 5*c*. With such a unique configuration, it is possible to effectively prevent light from leaking through each gap region between these two sub pixel elements adjacent to each other. Therefore, it is further possible to prevent contrast from being decreased due to the leakage of light. As a result thereof, advantageously, the invention offers an enhanced image quality.

In the exemplary configuration according to the present embodiment of the invention, as illustrated in FIG. 12A, the light shielding film portion 60, which blocks every gap region between each two of the plurality of sub pixel elements 5*a*, 5*b*, and 5*c* that are adjacent to each other, that is, each gap region between the sub pixel element 5*a* and the sub pixel element 5*b* as well as each gap region between the sub pixel element 5*b* and the sub pixel element 5*c*, is formed to have the same (i.e., matching) planar shape as that of the above-mentioned gap region between each two of the plurality of sub pixel elements 5*a*, 5*b*, and 5*c* that are adjacent to each other. In the manufacturing process of a liquid crystal device according to the present embodiment of the invention, the element substrate 51 and the color filter substrate 52 are adhered to each other after determining the positions of the sides (i.e., edges) of the light shielding film portion 60 along the row direction (X) so that each of which is in alignment with the corresponding one of the sides of the sub pixel elements 5*a*, 5*b*, and 5*c* along the row direction (X) in a plan view taken along the normal direction with respect to these substrates. With such a distinctively characteristic configuration, the invention makes it possible to prevent the leakage of light through any gap region between each two of the plurality of sub pixel elements 5*a*, 5*b*, and 5*c* that are adjacent to each other without sacrificing the aperture ratio of each pixel.

Third Embodiment of Liquid Crystal Device

Figure 17:
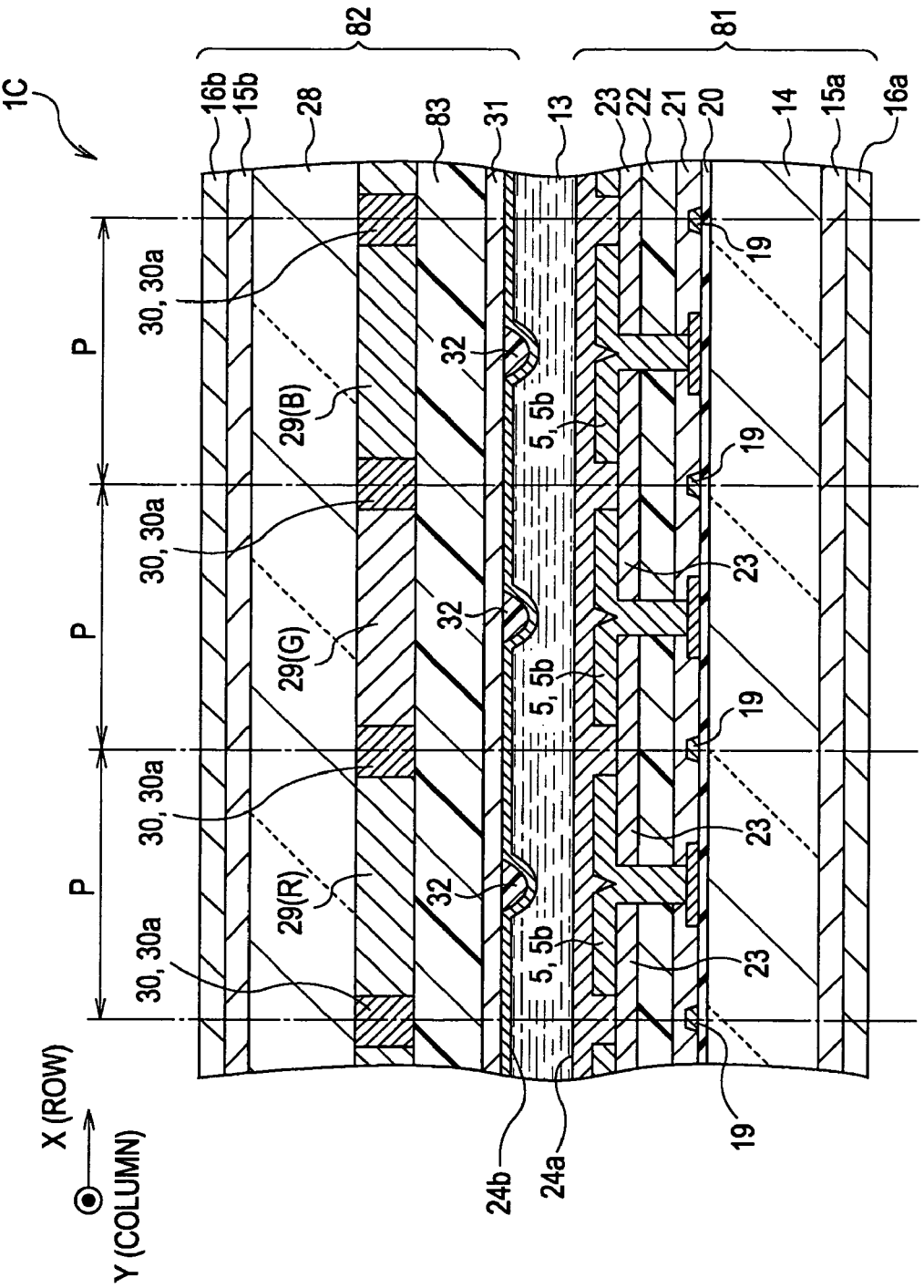
FIG. 17 is a sectional view taken along the line XVII-XVII of FIGS. 15A and 15B, which extends in the direction in which each row extends, that is, the X direction.

With reference to FIGS. 15, 16, and 17, a liquid crystal device according to a third embodiment of the invention is described below. In the third embodiment of the invention, the characteristic layout of a light shielding film according to the invention is applied to a transflective mode active matrix liquid crystal device that uses amorphous silicon TFTs as its switching elements. The term "transflective mode liquid crystal device" means a liquid crystal device that is capable of selecting one of transmissive mode display and reflective mode display optionally.

Figure 15A:
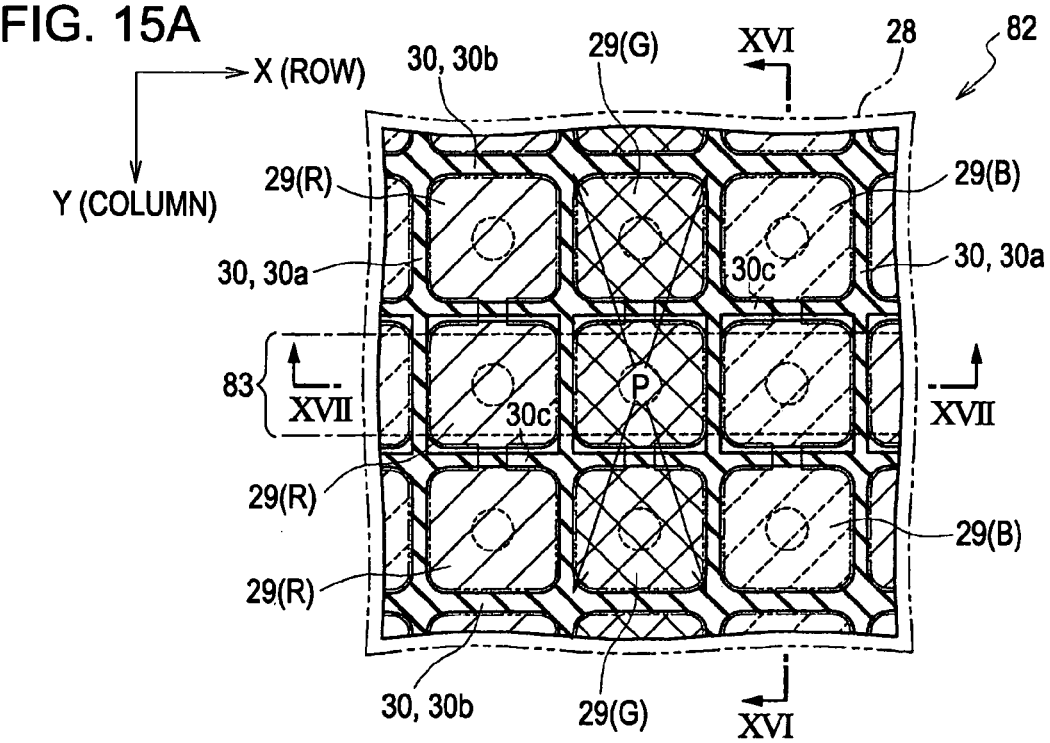
FIGS. 15A, 15B and 15C is a set of plan views that schematically illustrates an example of an essential part of a liquid crystal device according to a third embodiment of the invention, where
Figure 15B:
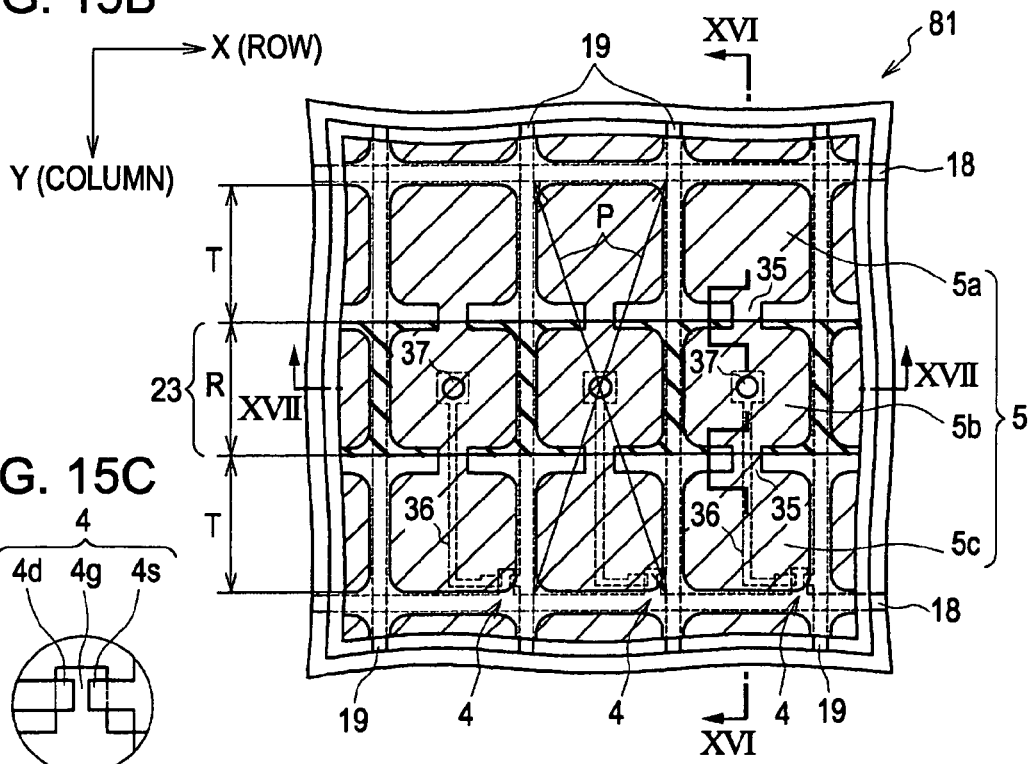
Figure 15C:
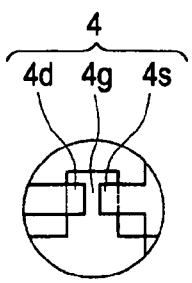

FIG. 15A is a plan view that schematically illustrates an example of the configuration of one pixel that lies on a color filter substrate. FIG. 15B is a plan view that schematically illustrates an example of the configuration of one pixel that lies on an element substrate. Each of FIGS. 15A and 15B shows a two-dimensional layout of pixel constituent elements of a substrate, which is viewed from the observation side. Specifically, FIG. 15A illustrates the planar configuration of one pixel formed on a color filter substrate, which is viewed from an outer side opposite to a liquid-crystal-layer side. On the other hand, FIG. 15B illustrates the planar configuration of one pixel formed on an element substrate, which is viewed from the liquid-crystal-layer side. FIG. 16 is a sectional view taken along the line XVI-XVI of FIGS. 15A and 15B, which extends in the direction in which each column extends, that is, the Y direction. FIG. 17 is a sectional view taken along the line XVII-XVII of FIGS. 15A and 15B, which extends in the direction in which each row extends, that is, the X direction.

The third embodiment of the invention described herein relates to an active matrix liquid crystal device that uses amorphous silicon TFT elements. The basic configuration of the liquid crystal device according to the present embodiment of the invention is the same as that of the liquid crystal device according to the first embodiment of the invention described above with reference to FIGS. 2, 3, and 4. The liquid crystal device according to the present embodiment of the invention differs from the liquid crystal device according to the first embodiment of the invention in that the liquid crystal device according to the present embodiment of the invention is configured as a transflective mode liquid crystal device that has a configuration for performing reflective mode display in addition to a configuration for performing transmissive mode display, whereas the liquid crystal device according to the first embodiment of the invention is configured as a transmissive mode liquid crystal device that does not have a configuration for performing reflective mode display. In order to further support and amplify the basic understanding of the difference between the liquid crystal device according to the present embodiment of the invention and the liquid crystal device according to the first embodiment of the invention, which will be obtained from the above brief explanation, more detailed explanation of the distinctively characteristic features and advantages of the liquid crystal device according to the present embodiment of the invention is given below. It should be noted that, in some part of the following description of the liquid crystal device according to the present embodiment of the invention, explanation is simplified or omitted for the same components/parts as those of the liquid crystal device according to the first embodiment of the invention described above. In addition, the same reference numerals are consistently used for the same components as those of the liquid crystal device according to the first embodiment of the invention so as to simplify or omit, if the context allows, any redundant explanation thereof.

First of all, with reference to the sectional views illustrated in FIGS. 16 and 17, the general configuration of the liquid crystal device according to the present embodiment of the invention is explained. The liquid crystal device 1C according to the present embodiment of the invention is provided with an element substrate 81 and a color filter substrate 82. Liquid crystal is injected and sealed inside a cell gap interposed between the element substrate 81 and the color filter substrate 82 so as to constitute the liquid crystal layer 13. Nematic liquid crystal having a negative dielectric anisotropy is used as the liquid crystal component of the liquid crystal layer 13. In the present embodiment of the invention, the color filter substrate 82 is provided at a position closer to an observation side, whereas the element substrate 81 is provided at an opposite position that is not closer to the observation side. An illumination device that is not shown in the drawing is provided outside the element substrate 81. The illumination device functions as a backlight. Transmissive mode display is performed by means of light that is emitted from the illumination device. A light reflective film is formed on the element substrate 81 that is provided at the "opposite-observation" side, in other words, liquid-crystal side, of the color filter substrate 82 that is provided at a position relatively close to the observation side. The light reflective film functions to reflect incident light coming from the outside (e.g., solar light, indoor light). By this means, reflective mode display is performed. A more detailed explanation of the light reflective film will be given later.

The element substrate 81 has a substrate 14 that is made of a translucent material such as a silica glass, plastic, or the like. A first phase difference retardation film 15a is deposited on the outer surface of the substrate 14. A first polarization sheet (i.e., polarizing plate) 16a is deposited on the first phase difference retardation film 15a. If needed, a plurality of the first phase difference retardation films 15a may be provided. In the configuration of the transflective liquid crystal device according to the present embodiment of the invention that performs transflective mode display, the first phase difference retardation film 15a is configured to include, though not necessarily limited thereto, (i) a λ/4 film (i.e., sheet/plate) that functions to form circularly-polarized light, (ii) a phase difference compensation film (i.e., sheet/plate) that functions to compensate for a phase difference, and (iii) a λ/2 film (i.e., sheet/plate) that constitutes a so-called wideband λ/4 film, which is a λ/4 film that is less susceptible to a wavelength-dependent phase shift.

Gate lines 18, source lines 19, and TFT elements 4 are provided on the inner surface of the translucent substrate 14. As illustrated in FIG. 15B, each of the plurality of the gate lines 18 extends in the row direction (X). The plurality of the gate lines 18 is arrayed in parallel with one another with a predetermined Y-directional pitch (i.e., interval) being allocated each between two adjacent gate lines 18. Each of the plurality of the source lines 19 extends in the column direction (Y). The plurality of the source lines 19 is arrayed in parallel with one another with a predetermined X-directional pitch (i.e., interval) being allocated each between two adjacent source lines 19. The TFT element 4 is provided at a position in the neighborhood of each intersection formed by the gate lines 18 and the source lines 19. Each of the gate lines 18 functions as a scanning line, whereas each of the source lines 19 functions as a data line. A gate insulation film 20 illustrated in FIGS. 16 and 17 is deposited between the gate lines 18 and the source lines 19. A passivation film 21 covers the TFT elements 4. A resin film 22 is deposited on the passivation film 21. A light reflective film 23 partially covers the resin film 22. Pixel electrodes 5 made of ITO, IZO, or the like are provided both on the light reflective film 23 and the resin film 22. A vertical alignment film (i.e., vertical orientation film) 24a is deposited on the pixel electrodes 5. Each of the pixel electrodes 5 has a special planar configuration for achieving vertically aligned (VA) mode operations.

The gate insulation film 20, the passivation film 21, and the resin film 22 are made of an insulating synthetic resin, or an insulating organic material. The light reflective film 23 is made of a light-reflective metal material such as aluminum (Al), silver (Ag), or alloy containing Al and Ag as its main components. The light reflective film 23 is configured to have a predetermined shape, which is formed by patterning the light-reflective metal material described above by means of a photo etching technique.

The color filter substrate 82 has a substrate 28 that is made of a translucent material such as a silica glass, plastic, or the like. A second phase difference retardation film 15b is deposited on the outer surface of the substrate 28. A second polarization sheet (i.e., polarizing plate) 16b is deposited on the second phase difference retardation film 15b. As the first phase difference retardation film 15a includes, as its constituent elements, without any limitation thereto, the λ/4 film, the phase difference compensation film, the λ/2 film, so does the second phase difference retardation film 15b.

A coloration film 29, which constitutes a color filter, is provided on the inner surface of the translucent substrate 28. The suffixes attached to the reference numeral 29, that is, the letters "R, G, and B", indicate that the coloration films 29 (i.e., coloration films 29R, 29G, and 29B) are a red coloration film, a green coloration film, and a blue coloration film, respectively. In the present embodiment of the invention, a stripe array pattern is adopted. Accordingly, the coloration layers 29 of the same color component are arrayed to form a line in the column direction (Y). In the illustrated example of FIG. 16 (FIG. 15A), blue coloration layers 29B are aligned in the column direction (Y). When viewed from an orthogonal direction thereof, the coloration layers 29 of different color components, 29R, 29G, and 29B, are arrayed in a repetitive sequential order along the row direction (X) as shown in FIG. 17 (FIG. 15A). A light shielding film 30 is provided each between two adjacent coloration films 29. As illustrated in FIG. 15A, the light shielding film 30 is formed in a grid pattern so as to surround each of the coloration films 29. The light shielding film 30 may be made of a light-shutting metal material. As an example of alternative configuration, the light shielding film 30 may be configured by overlaying at least one coloration film 29, which is a resin film, on another coloration film 29, where the above-mentioned at least one coloration film 29 and the above-mentioned another coloration film 29 have colors different from each other or one another. In the present embodiment of the invention, it is assumed that the light shielding film 30 is configured by overlaying at least one coloration film 29 on another coloration film 29, where the above-mentioned at least one coloration film 29 and the above-mentioned another coloration film 29 have colors different from each other or one another. If needed, a planarizing film may be deposited on the coloration film 29 and the light shielding film 30. A more detailed explanation of the light shielding film 30 will be given later.

As illustrated in FIG. 16, a layer thickness adjustment film 83 is partially deposited on the coloration films 29 and the light shielding film 30 of the color filter substrate 82. A common electrode 31 is deposited on the coloration films 29 and the light shielding film 30 in such a manner that the common electrode 31 covers the partially deposited layer thickness adjustment film 83. The common electrode 31 constitutes a counter electrode opposed to the pixel electrodes 5. The common electrode 31 is made of ITO, IZO, or the like, that is, the same material as that of the pixel electrode 5. The common electrode 31 is configured as a planar (i.e., sheet-type) electrode that is common to all sub pixels. In other words, the common electrode 31 is formed to cover the entire region of these sub pixels. A plurality of projections 32 is provided on the surface of the common electrode 31. Each of the projections 32, which are made of dielectric substances, functions as an alignment control means. A vertical alignment film (i.e., vertical orientation film) 24b is deposited on the common electrode 31. The vertical alignment film 24b covers the projections 32.

Liquid crystal molecules of the liquid crystal layer 13 are oriented in a direction perpendicular to the surfaces of the substrates in its initial alignment state, that is, when an OFF voltage is applied thereto, through the functioning of the vertical alignment films 24a and 24b. The orientation direction perpendicular to the surfaces of the substrates is shown as the vertical direction in FIGS. 16 and 17. The liquid crystal molecules are aligned in an oblique direction (i.e., slanted, or inclined) in the proximity of each of the projections 32 in such a manner that the liquid crystal molecules are oriented to be perpendicular to the surface of each of the projections 32. With the initial alignment state of the liquid crystal molecules described above, the tilting orientation (i.e., direction) of the liquid crystal molecules at the time of application of an ON voltage to the liquid crystal layer 13 is specified in a desired manner so as to ensure a stable (i.e., reliable) orientation change operations of the liquid crystal molecules.

Next, with reference to FIGS. 15A and 15B, the planar configuration of one pixel is explained below. FIG. 15A illustrates the planar configuration of one pixel formed on the color filter substrate 82, which is viewed from the observation side of FIGS. 16 and 17, that is, the upper side of each of these drawings. On the other hand, FIG. 15B illustrates the planar configuration of the element substrate 81, which is viewed from the observation side of FIGS. 16 and 17, that is, the upper side of each of these drawings. A positional alignment between the color filter substrate 82 illustrated in FIG. 15A and the element substrate 81 illustrated in FIG. 15B is performed in such a manner that they become opposed to each other without inverting the orientation of either one thereof, for example, without turning it upside down. In other words, either one of the color filter substrate 82 illustrated in FIG. 15A and the element substrate 81 illustrated in FIG. 15B is translated (i.e., moved in parallel), which means that it is moved without changing its orientation illustrated in the drawing, to become opposed to the other. Liquid crystal is injected and sealed between the color filter substrate 82 illustrated in FIG. 15A and the element substrate 81 illustrated in FIG. 15B that are opposed to each other. It should be noted that the second phase difference retardation film 15b and the second polarization sheet 16b are not shown in FIG. 15A. In addition, the translucent substrate 28 is shown by means of virtual chain lines in FIG. 15A. On the other hand, the vertical alignment film 24a is not shown in FIG. 15B.

On the element substrate 81 illustrated in FIG. 15B, each of rectangular regions demarcated by the gate lines 18, which are scanning lines, and the source lines 19, which are data lines, constitutes one sub pixel P. A plurality of the sub pixels P is formed adjacent to one another in a pixel plane. These sub pixels P are arrayed in a so-called matrix pattern that is made up of a plurality of rows extending in the X direction and a plurality of columns extending in the Y direction. These sub pixels P make up, in combination thereof, an image display area. When viewed in two dimensions, that is, in a plan view, each individual sub pixel P corresponds to one color component of the coloration filter 29 provided on the color filter substrate 82 shown in FIG. 15A, that is, either one of the red coloration film 29R, the green coloration film 29G, and the blue coloration film 29B. Three color components, that is, R, G, and B, of the sub pixels P (i.e., three sub pixels P) arrayed in the row direction (X) make up one pixel. If the number of color components of the coloration film 29 is configured to be more than three, for example, if the number of color components of the coloration film 29 is configured to be four in a modified implementation of the invention, each one pixel is constituted by a group of four sub pixels P each of which corresponds to one color component different from the remaining three thereof.

The TFT element 4 is formed at a position in the neighborhood of each intersection defined by the gate lines 18 and the source lines 19. Each of the pixel electrodes 5 is formed in a sub pixel P that is demarcated by corresponding two of the gate lines 18 and corresponding two of the source lines 19. The pixel electrodes 5 are arrayed in a matrix pattern that has a plurality of rows extending in the X direction and a plurality of columns extending in the Y direction. Each of the pixel electrodes 5 is made up of a plurality of sub pixel elements (i.e., pixel-electrode elements) each of which has a dot-like pattern, or in other words, an "island" pattern. In the present embodiment of the invention, it is assumed that one pixel electrode 5 has three sub pixel elements 5a, 5b, and 5c as its constituent elements. The sub pixel elements 5a and 5b are electrically connected to each other via a connection portion 35 that is configured as a narrow path. In addition, the sub pixel elements 5b and 5c are also electrically connected to each other via another connection portion 35 that is also configured as a narrow path. These sub pixel elements 5a, 5b, and 5c, which are electrically connected to one another by means of these connection portions 35, make up one pixel electrode 5 that is elongated in the column direction (Y). Each individual region at which the sub pixel element 5a, 5b, or 5c is provided is sometimes called as a sub dot. As illustrated in FIG. 15B, open gap regions that are provided both on the left and right of each of the connection portions 35 constitute "cutout" spaces that are not covered by the pixel electrode 5. Each of the cutout portions functions as a slit that generates an oblique electric field for controlling the orientation of liquid crystal molecules in the VA mode operations.

Each of the TFT elements 4 illustrated in FIG. 15B has, as illustrated in a partial enlarged view (FIG. 15C) thereof, a source region 4s and a drain region 4d formed in a semiconductor layer, which is made of an amorphous silicon, with a channel region being formed therebetween. The source line 19 (i.e., data line) is electrically connected to the source region 4s of each of the TFT elements 4. The drain region 4d of each of the TFT elements 4 is electrically connected to the corresponding one of the pixel electrodes 5 via a connection line portion 36, which extends from the drain region 4d thereof, and a contact hole 37. The gate line 18 (i.e., scanning line) has a portion opposed to the channel region of the semiconductor layer. The above-mentioned portion of the gate line 18 functions as the gate electrode 4g of each of the TFT elements 4.

As understood from FIGS. 15A and 15B, each of the projections 32 formed on the common electrode 31 as shown in FIG. 16, which functions as an alignment control means, is provided at the substantially central position of the corresponding one of the sub pixel elements 5a, 5b, and 5c, which is viewed along a normal direction with respect to the substrate in two dimensions. With such a configuration, the liquid crystal molecules become tilted in a direction from the center of each of the sub pixel elements 5a, 5b, and 5c toward the sides (i.e., edges) thereof when an ON voltage is applied to the liquid crystal.

Next, the layout of a light shielding film according to the present embodiment of the invention is described below. As illustrated in FIG. 15A, the light shielding film 30 is provided on the color filter substrate 82. The light shielding film 30 is formed in a so-called grid pattern. Specifically, the grid-arrayed light shielding film 30 has, in the illustrated example, a longitudinal portion that extends in a direction along the long sides of each of the pixel electrodes 5 (longitudinal direction of each of the pixel electrodes 5) that are provided on the element substrate 81, which is the counter substrate opposed to the color filter substrate 82 in which the light shielding film 30 is provided. In other words, the grid-arrayed light shielding film 30 has the longitudinal portion that extends in a direction along the long sides of each of the sub pixels P, that is, the column direction (Y). In addition, the grid-arrayed light shielding film 30 further has, in the illustrated example, a latitudinal portion that extends in a direction along the short sides of each of the pixel electrodes 5 (latitudinal direction of each of the pixel electrodes 5). In other words, the grid-arrayed light shielding film 30 has the latitudinal portion that extends in a direction along the short sides of each of the sub pixels P, that is, the row direction (X). The longitudinal portion of the light shielding film 30 and the latitudinal portion thereof intersect with each other. The light shielding film 30 may be made of a photosensitive resin material having a light shutting property, where the photosensitive resin material is subjected to patterning treatment by means of a photolithography technique so as to form the light shielding film 30. Or, the light shielding film 30 may be made of two or three color components of the coloration films 29R, 29G, and 29B that make up the color filter, which are deposited one on another. As another non-limiting example of light shielding film formation methods/materials, the light shielding film 30 may be made of a light-shutting metal material, which is subjected to patterning treatment by means of a photo etching technique. As a few examples of the light-shielding metal material, tantalum (Ta) non-alloy, Ta alloy, chromium (Cr) non-alloy, or Cr alloy may be used though not limited thereto. In the present embodiment of the invention, it is assumed that the light shielding film 30 is configured by overlaying at least one coloration film 29 on another coloration film 29, where the above-mentioned at least one coloration film 29 and the above-mentioned another coloration film 29 have colors different from each other or one another.

As illustrated in FIG. 15A, the light shielding film 30 is made up of three portions 30a, 30b, and 30c. The portion 30a (longitudinal portion) extends in the column direction (Y) between each two of the plurality of sub pixels P that are arrayed adjacent to each other along the row direction (X). The portion 30b (latitudinal portion) extends in the row direction (X) between each two of the plurality of sub pixels P that are arrayed adjacent to each other along the column direction (Y). The portion 30c extends in the row direction (X) between each two adjacent ones of three sub pixel elements 5a, 5b, and 5c that are arrayed (connected) adjacent to each other in each of the plurality of the sub pixels P, to be more specifically, between the sub pixel element 5a and the sub pixel element 5b as well as between the sub pixel element 5b and the sub pixel element 5c. It is prior art to provide the light shielding film portions 30a and 30b at gap regions between the sub pixels P that are arrayed adjacent to one another. In contrast, in the prior art configuration, the light shielding film portion 30c has not been provided in gap regions between the sub pixel element 5a and the sub pixel element 5b as well as between the sub pixel element 5b and the sub pixel element 5c in each of the plurality of sub pixels P so far.

In the operation of the VA mode liquid crystal device, an oblique electric field is generated in a gap region between the sub pixel element 5a and the sub pixel element 5b as well as a gap region between the sub pixel element 5b and the sub pixel element 5c. The generated oblique electric field specifies the tilting orientation of the liquid crystal molecules. The gap region where an oblique electric field is generated is susceptible to the leakage of light. For this reason, in the configuration of a liquid crystal device of prior art, which does not have the light shielding film portion corresponding to the above-mentioned gap region between the sub pixel elements, the problem of a contrast decrease is likely to occur due to the leakage of light, which could eventually degrade the quality of image display. In contrast, in the configuration of a liquid crystal device according to the present embodiment of the invention, the light shielding film portion 30c is provided on a gap region between the sub pixel element 5a and the sub pixel element 5b as well as a gap region between the sub pixel element 5b and the sub pixel element 5c. With such a unique configuration, it is possible to effectively prevent light from leaking through each gap region between these two sub pixel elements adjacent to each other. Therefore, it is further possible to prevent contrast from being decreased due to the leakage of light. As a result thereof, advantageously, the invention offers an enhanced image quality.

Each of the sub pixel elements 5a and 5c illustrated in FIG. 15B and FIG. 16 is configured as a transparent electrode without any light reflective film being formed thereunder. Therefore, each region corresponding to the sub pixel elements 5a/5c constitutes a transmissive mode display region T. On the other hand, each of the sub pixel elements 5b, which is positioned at the center of a set of three sub pixel elements 5a, 5b, and 5c, is configured as a transparent electrode under which a light reflective film is formed. Therefore, each region corresponding to the sub pixel elements 5b constitutes a reflective mode display region R. That is, the reflective mode display region R is formed at the center area of each of the plurality of sub pixels P, which is sandwiched between two of the transmissive mode display regions T formed at both longitudinal end regions thereof. Each of the TFT elements 4 is connected to the corresponding one of the pixel electrodes 5 in an electrically conductive manner through the contact hole 37 that is formed at the center sub pixel element 5b thereof, which constitutes the reflective mode display region R. Each of the connection line portions 36, which functions in combination with the contact hole 37 to connect each of the TFT elements 4 to the corresponding one of the pixel electrodes 5 in an electrically conductive manner, goes/extends under the sub pixel element 5c to reach the substantially central position of the center sub pixel element 5b thereof.

Although it is not illustrated in detail in the drawing, the liquid-crystal-side surface of the resin film 22 in the reflective mode display region R has been subjected to a photolithography treatment so as to form a rugged concavo-convex pattern thereon. Accordingly, the light reflective film 23 formed thereon also has a rugged concavo-convex pattern. Thanks to the rugged concavo-convex pattern, reflected light is scattered to a moderate degree, which ensures a desirable luminous reflection characteristics.

As illustrated in FIG. 15A and FIG. 16, the layer thickness adjustment film 83 that is formed on the color filter substrate 82 extends in the row direction (X) inside the reflective mode display region R. The layer thickness adjustment film 83 is made of an organic film such as acryl resin, or the like. The layer thickness adjustment film 83 is formed to protrude (i.e., is raised/elevated) inward, that is, toward the liquid crystal layer 13. With such a configuration, a layer thickness $d_0$ of the liquid crystal layer 13 in the reflective mode display region R is smaller than a layer thickness $d_1$ of the liquid crystal layer 13 in the transmissive mode display region T. As an exemplary configuration thereof, the layer thickness $d_1$ of the liquid crystal layer 13 in the transmissive mode display region T is within a range of 4-6 μm, whereas the thickness of the layer thickness adjustment film 83 is within a range of 2-3 μm. In such a configuration, the layer thickness $d_0$ of the liquid crystal layer 13 in the reflective mode display region R is configured to be approximately one half of the layer thickness $d_1$ of the liquid crystal layer 13 in the transmissive mode display region T. Each of the edge portions of the layer thickness adjustment film 83 viewed in the column direction (Y), or in other words, each of the edge portions of the layer thickness adjustment film 83 extending in the row direction (X), is configured as elevation surface. The elevation surface is slanted in such a manner that the thickness thereof changes gradually because of its inclination.

The connection portion 35 that connects the sub pixel element 5*a* and the sub pixel element 5*b* of each of the pixel electrodes 5 is formed at a region corresponding to one elevation surface, that is, one slanted surface, of the layer thickness adjustment film 83. In addition, the connection portion 35 that connects the sub pixel element 5*b* and the sub pixel element 5*c* of each of the pixel electrodes 5 is formed at a region corresponding to the other slanted elevation surface of the layer thickness adjustment film 83.

In the exemplary configuration of the present embodiment of the invention, since the layer thickness adjustment film 83 is formed in the reflective mode display region R, the layer thickness of the liquid crystal layer 13 in the reflective mode display region R is configured to be approximately one half of the layer thickness of the liquid crystal layer 13 in the transmissive mode display region T. With such a configuration, it is possible to make retardation ($\Delta n \cdot d$) (where "$\Delta n$" denotes a refractive index anisotropy, and "d" denotes a liquid crystal layer thickness) in the reflective mode display region R substantially equal to retardation in the transmissive mode display region. By this means, it is possible to enhance contrast. In addition, because the layer thickness adjustment film 83 is formed to protrude toward the liquid crystal layer 13, and further because the elevation surface of the layer thickness adjustment film 83 is formed as a slanted surface, liquid crystal molecules that are vertically aligned in their initial orientation state have a pre-tilt in the proximity of the above-mentioned slanted surface in accordance with its inclination. By this means, it is possible to control the alignment direction of the liquid crystal molecules at the time of application of a voltage. Therefore, it is further possible to effectively prevent the leakage of light so as to achieve high-contrast display.

In the exemplary configuration of the present embodiment of the invention, the layer thickness adjustment film 83 is formed in the reflective mode display region R; and in addition, each of both edge faces of the layer thickness adjustment film 83 is configured as a slanted surface. With such a configuration, the invention makes it possible for a transflective vertically aligned (VA) mode liquid crystal device to perform well-balanced reliable display both in the reflective mode display region R and the transmissive mode display region T and to perform stable alignment control of liquid crystal molecules.

As illustrated in FIG. 16, the dimension of each of edge portions of the light reflective film 23 viewed along the column direction (Y), or in other words, the dimension of each of edge portions of the light reflective film 23 extending in the row direction (X), is greater than that of each of edge portions of the center sub pixel element 5*b* viewed along the column direction (Y) by a distance D. The width $W_0$ of the light shielding film portion 30*c* formed on the color filter substrate 82 to cover a gap region between the sub pixel element 5*a* and the sub pixel element 5*b* of each of the pixel elements 5 as well as a gap region between the sub pixel element 5*b* and the sub pixel element 5*c* of each of the pixel elements 5 is configured to be smaller than the width $W_1$ of the above-mentioned gap region between each two of the plurality of sub pixel elements 5*a*, 5*b*, and 5*c* that are arrayed adjacent to each other in each of the pixel elements 5. According to the configuration described above, a clearance is formed at each inner marginal region next to the light shielding film portion 30*c*. Each of the clearances allows the edge portion of the light reflective film 23 to be visually observed through the coloration film 29. Such a configuration offers the advantageous effects of preventing any substantial decrease in a light reflection factor even in a case where some positional misalignment occurs between the element substrate 81 and the color filter substrate 82 when these substrates are adhered to each other.

Fourth Embodiment of Liquid Crystal Device

Figure 19:
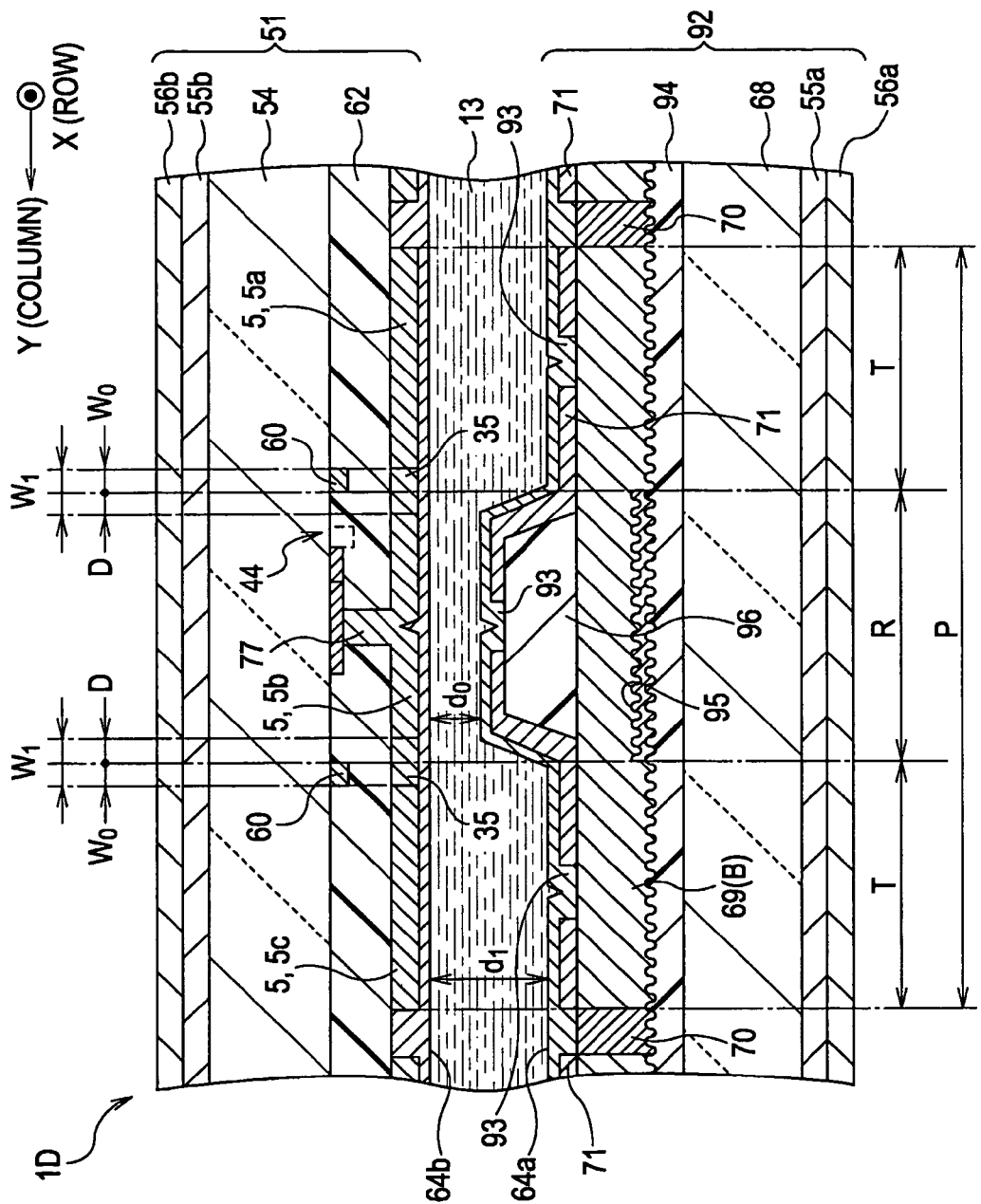
FIG. 19 is a sectional view taken along the line XIX-XIX of FIGS. 18A and 18B, which extends in the direction in which each column extends, that is, the Y direction.
Figure 20:
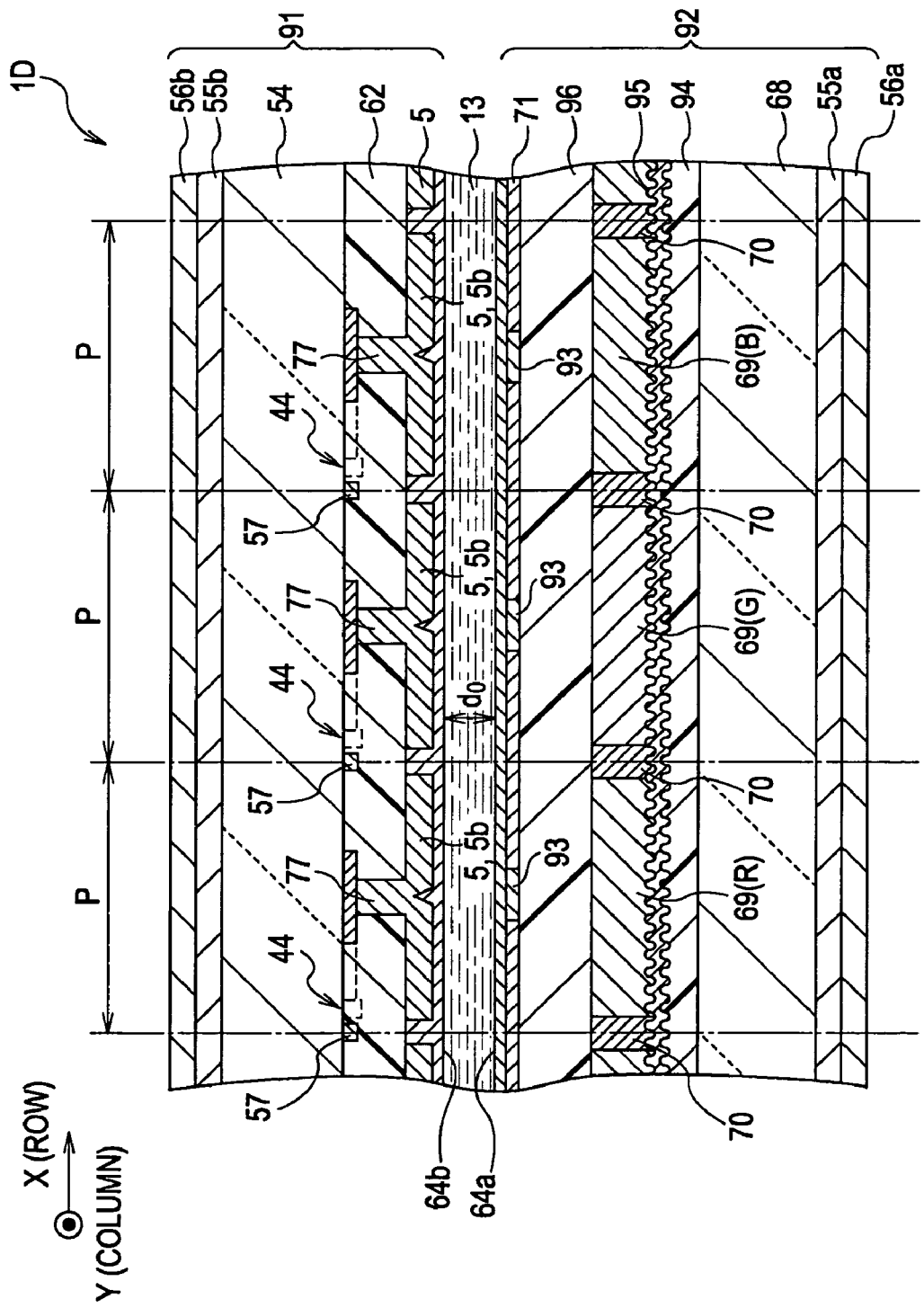
FIG. 20 is a sectional view taken along the line XX-XX of FIGS. 18A and 18B, which extends in the direction in which each row extends, that is, the X direction.

With reference to FIGS. 18, 19, and 20, a liquid crystal device according to a fourth embodiment of the invention is described below. In the fourth embodiment of the invention, the characteristic layout of a light shielding film according to the invention is applied to a transflective mode active matrix liquid crystal device that uses TFD elements as its switching elements.

FIG. 18A is a plan view that schematically illustrates an example of the configuration of one pixel that lies on an element substrate. FIG. 18B is a plan view that schematically illustrates an example of the configuration of one pixel that lies on a color filter substrate. Each of FIGS. 18A and 18B shows a two-dimensional layout of pixel constituent elements of a substrate, which is viewed from the observation side. Specifically, FIG. 18A illustrates the planar configuration of one pixel formed on an element substrate, which is viewed from an outer side opposite to a liquid-crystal-layer side. On the other hand, FIG. 18B illustrates the planar configuration of one pixel formed on a color filter substrate, which is viewed from the liquid-crystal-layer side. FIG. 19 is a sectional view taken along the line XIX-XIX of FIGS. 18A and 18B, which extends in the direction in which each column extends, that is, the Y direction. FIG. 20 is a sectional view taken along the line XX-XX of FIGS. 18A and 18B, which extends in the direction in which each row extends, that is, the X direction.

The fourth embodiment of the invention described herein relates to an active matrix liquid crystal device that uses TFD elements. The basic configuration of the liquid crystal device according to the present embodiment of the invention is the same as that of the liquid crystal device according to the second embodiment of the invention described above with reference to FIGS. 12, 13, and 14. The liquid crystal device according to the present embodiment of the invention differs from the liquid crystal device according to the second embodiment of the invention in that the liquid crystal device according to the present embodiment of the invention is configured as a transflective mode liquid crystal device that has a configuration for performing reflective mode display in addition to a configuration for performing transmissive mode display, whereas the liquid crystal device according to the second embodiment of the invention is configured as a transmissive mode liquid crystal device that does not have a configuration for performing reflective mode display. In order to further support and amplify the basic understanding of the difference between the liquid crystal device according to the present embodiment of the invention and the liquid crystal device according to the second embodiment of the invention, which will be obtained from the above brief explanation, more detailed explanation of the distinctively characteristic features and advantages of the liquid crystal device according to the present embodiment of the invention is given below. It should be noted that, in some part of the following description of the liquid crystal device according to the present embodiment of the invention, explanation is simplified or omitted for the same components/parts as those of the liquid crystal device according to the second embodiment of the invention described above. In addition, the same reference numerals are consistently used for the same components as those of the liquid crystal device according to the second embodiment of the invention so as to simplify or omit, if the context allows, any redundant explanation thereof.

First of all, with reference to the sectional views illustrated in FIGS. 19 and 20, the general configuration of the liquid crystal device according to the present embodiment of the invention is explained. The liquid crystal device 1D according to the present embodiment of the invention is provided with an element substrate 91 and a color filter substrate 92. The element substrate 91 and the color filter substrate 92 are adhered to each other with a cell gap being interposed therebetween, which is a clearance having a certain distance. Liquid crystal is injected and sealed inside the cell gap so as to constitute the liquid crystal layer 13. Nematic liquid crystal having a negative dielectric anisotropy is used as the liquid crystal component of the liquid crystal layer 13. In the present embodiment of the invention, the element substrate 91 is provided at a position closer to an observation side, whereas the color filter substrate 92 is provided at an opposite position that is not closer to the observation side. An illumination device that is not shown in the drawing is provided outside the color filter substrate 92. The illumination device functions as a backlight. Transmissive mode display is performed by means of light that is emitted from the illumination device. A light reflective film is formed on the color filter substrate 92 opposed to the element substrate 91, where the element substrate 91 is provided at a position relatively close to the observation side. The light reflective film functions to reflect incident light coming from the outside. By this means, reflective mode display is performed.

The element substrate 91 has a substrate 54 that is made of a translucent material such as a silica glass, plastic, or the like. A second phase difference retardation film 55b is deposited on the outer surface of the substrate 54. A second polarization sheet (i.e., polarizing plate) 56b is deposited on the second phase difference retardation film 55b. If needed, a plurality of the second phase difference retardation films 55b may be provided. In the configuration of the transflective liquid crystal device according to the present embodiment of the invention that performs transflective mode display, the second phase difference retardation film 55b is configured to include, though not necessarily limited thereto, (i) a λ/4 film (i.e., sheet/plate) that functions to form circularly-polarized light, (ii) a phase difference compensation film (i.e., sheet/plate) that functions to compensate for a phase difference, and (iii) a λ/2 film (i.e., sheet/plate) that constitutes a so-called wideband λ/4 film, which is a λ/4 film that is less susceptible to a wavelength-dependent phase shift.

A plurality of data lines 57, a plurality of element-substrate-side light shielding films 60, and a plurality of TFD elements 44 are provided on the inner surface of the translucent substrate 54. As illustrated in FIG. 18A, each of the plurality of the data lines 57 extends in the column direction (Y). The plurality of the data lines 57 is arrayed in parallel with one another with a predetermined X-directional pitch (i.e., interval) being allocated each between two adjacent data lines 57. Each of the data lines 57 supplies, for example, a data signal. As illustrated in FIG. 18A, each of the element-substrate-side light shielding films 60 is formed to have an elongated dot ("island") pattern extending in the row direction (X) each between two adjacent data lines 57. Each of the left end and the right end of each of the element-substrate-side light shielding films 60 is not in contact with the corresponding one of the data lines 57. As illustrated in FIGS. 19 and 20, a resin film 62 is deposited on the data lines 57, the element-substrate-side light shielding films 60, and the TFD elements 44. The resin film 62 is made of an insulating synthetic resin, or an insulating organic material. The pixel electrodes 5, which are made of ITO, IZO, or the like, are formed on the resin film 62. A vertical alignment film 64b is deposited on the pixel electrodes 5. Each of the pixel electrodes 5 has a special planar configuration for achieving vertically aligned (VA) mode operations.

The color filter substrate 92 has a substrate 68 that is made of a translucent material such as a silica glass, plastic, or the like. A first phase difference retardation film 55a is deposited on the outer surface of the substrate 68. A first polarization sheet (i.e., polarizing plate) 56a is deposited on the first phase difference retardation film 55a. As the second phase difference retardation film 55b includes, as its constituent elements, without any limitation thereto, the λ/4 film, the phase difference compensation film, the λ/2 film, so does the first phase difference retardation film 55a.

A resin film 94 is deposited on the inner surface of the translucent substrate 68. A light reflective film 95 partially covers the resin film 94. The resin film 94 is made of an insulating synthetic resin, or an insulating organic material. The light reflective film 95 is made of a light-reflective metal material such as Al, Ag, or alloy containing Al and Ag as its main components. The light reflective film 23 is configured to have a predetermined shape, which is formed by patterning the light-reflective metal material described above by means of a photo etching technique.

A coloration film 69, which constitutes a color filter, is provided on the resin film 94 and the light reflective film 95. The suffixes attached to the reference numeral 69, that is, the letters "R, G, and B", indicate that the coloration films 69 (i.e., coloration films 69R, 69G, and 69B) are a red coloration film, a green coloration film, and a blue coloration film, respectively. In the present embodiment of the invention, a stripe array pattern is adopted. Accordingly, the coloration layers 69 of the same color component are arrayed to form a line in the column direction (Y). In the illustrated example of FIG. 19 (FIG. 18B), blue coloration layers 69B are aligned in the column direction (Y). When viewed from an orthogonal direction thereof, the coloration layers 69 of different color components, 69R, 69G, and 69B, are arrayed in a repetitive sequential order along the row direction (X) as shown in FIG. 20 (FIG. 18B). A color-filter-substrate-side light shielding film 70 is provided each between two adjacent coloration films 69. As illustrated in FIG. 18B, the color-filter-substrate-side light shielding film 70 is formed in a grid pattern so as to surround each of the coloration films 69. The color-filter-substrate-side light shielding film 70 may be made of a resin material having a light shutting property. Or, it may be made of a light-shutting metal material. As an example of another alternative configuration, the color-filter-substrate-side light shielding film 70 may be configured by overlaying at least one coloration film 69, which is a resin film, on another coloration film 69, where the above-mentioned at least one coloration film 69 and the above-mentioned another coloration film 69 have colors different from each other or one another. In the present embodiment of the invention, it is assumed that the color-filter-substrate-side light shielding film 70 is configured by overlaying at least one coloration film 69 on another coloration film 69, where the above-mentioned at least one coloration film 69 and the above-mentioned another coloration film 69 have colors different from each other or one another. If needed, a planarizing film may be deposited on the coloration film 69 and the color-filter-substrate-side light shielding film 70.

A layer thickness adjustment film 96 is partially deposited on the coloration films 69 and the color-filter-substrate-side light shielding film 70 of the color filter substrate 92. A plurality of band-like common electrodes 71, each of which constitutes a counter electrode opposed to the corresponding one of the pixel electrodes 5, are provided over the coloration films 69 and the color-filter-substrate-side light shielding film 70 in such a manner that the common electrode 71 covers the partially deposited layer thickness adjustment film 96. The layer thickness adjustment film 96 is made of a transparent insulating material. The common electrode 71 functions as a scanning line that supplies, for example, a scanning signal. The common electrode 71 is made of ITO, IZO, or the like, that is, the same material as that of the pixel electrode 5. Each of the plurality of the band-like common electrodes 71 extends in the row direction (X). The plurality of the common electrodes 71 is arrayed in parallel with one another with a predetermined Y-directional pitch (i.e., interval) being allocated each between two adjacent common electrodes 71. A plurality of slits 93 is provided on the surface of the common electrode 71. Each slit 93 functions as an alignment control means. Each of the slits 93 has the shape of a circle in a plan view taken along the normal direction with respect to the substrate. A vertical alignment film (i.e., vertical orientation film) 64a is deposited on the common electrode 71. The vertical alignment film 64a covers the slits 93.

Liquid crystal molecules of the liquid crystal layer 13 are oriented in a direction perpendicular to the surfaces of the substrates in its initial alignment state, that is, when an OFF voltage is applied thereto, through the functioning of the vertical alignment films 64a and 64b. The orientation direction perpendicular to the surfaces of the substrates is shown as the vertical direction in FIGS. 19 and 20. An oblique electric field is generated at each of the slits 93 at the time of application of an ON voltage. Then, liquid crystal molecules are oriented (i.e., aligned) along the generated oblique electric field. With the alignment control of the liquid crystal molecules, the tilting orientation (i.e., direction) of the liquid crystal molecules at the time of application of an ON voltage to the liquid crystal layer 13 is specified in a desired manner so as to ensure a stable (i.e., reliable) orientation change operations of the liquid crystal molecules.

Next, with reference to FIGS. 18A and 18B, the planar configuration of one pixel is explained below. FIG. 18A illustrates the planar configuration of one pixel formed on the element substrate 91, which is viewed from the observation side of FIGS. 19 and 20, that is, the upper side of each of these drawings. On the other hand, FIG. 18B illustrates the planar configuration of the color filter substrate 92, which is viewed from the observation side of FIGS. 19 and 20, that is, the upper side of each of these drawings. A positional alignment between the element substrate 91 illustrated in FIG. 18A and the color filter substrate 92 illustrated in FIG. 18B is performed in such a manner that they become opposed to each other without inverting the orientation of either one thereof, for example, without turning it upside down. In other words, either one of the element substrate 91 illustrated in FIG. 18A and the color filter substrate 92 illustrated in FIG. 18B is translated (i.e., moved in parallel), which means that it is moved without changing its orientation illustrated in the drawing, to become opposed to the other. Liquid crystal is injected and sealed between the element substrate 91 illustrated in FIG. 18A and the color filter substrate 92 illustrated in FIG. 18B that are opposed to each other. It should be noted that the second phase difference retardation film 55b and the second polarization sheet 56b are not shown in FIG. 18A. In addition, the translucent substrate 54 is shown by means of virtual chain lines in FIG. 18A. On the other hand, the vertical alignment film 64a is not shown in FIG. 18B.

The plurality of the pixel electrodes 5 are arrayed on the element substrate 91 in a so-called matrix pattern that is made up of a plurality of rows extending in the X direction and a plurality of columns extending in the Y direction. On the other hand, each of the plurality of band-like, so-called "stripe-arrayed" common electrodes 71 that are formed on the color filter substrate 92 overlaps the corresponding one of the pixel electrodes 5 in a plan view when the element substrate 91 and the color filter substrate 92 are adhered to each other. Each of rectangular areas, which contain planar regions where the pixel electrodes 5 and the common electrodes 71 overlap each other (i.e., the pixel electrodes 5 are arrayed over the common electrodes 71, constitutes one sub pixel P. The sub pixel P constitutes the minimum unit for making a switchover between bright display (white display) and dark display (black display).

The plurality of sub pixels P is formed adjacent to one another in a pixel plane. These sub pixels P are arrayed in a so-called matrix pattern that is made up of a plurality of rows extending in the X direction and a plurality of columns extending in the Y direction. These sub pixels P make up, in combination thereof, an image display area. When viewed in two dimensions, that is, in a plan view, each individual sub pixel P corresponds to one color component of the coloration filter 69 provided on the color filter substrate 92 shown in FIG. 18B, that is, either one of the red coloration film 69R, the green coloration film 69G, and the blue coloration film 69B. Three color components, that is, R, G, and B, of the sub pixels P (i.e., three sub pixels P) arrayed in the row direction (X) make up one pixel. If the number of color components of the coloration film 69 is configured to be more than three, for example, if the number of color components of the coloration film 69 is configured to be four in a modified implementation of the invention, each one pixel is constituted by a group of four sub pixels P each of which corresponds to one color component different from the remaining three thereof.

The pixel electrodes 5 are arrayed in a matrix pattern that has a plurality of rows extending in the X direction and a plurality of columns extending in the Y direction. Each of the pixel electrodes 5 is made up of a plurality of sub pixel elements (i.e., pixel-electrode elements) each of which has a dot-like pattern, or in other words, an "island" pattern. In the present embodiment of the invention, it is assumed that one pixel electrode 5 has three sub pixel elements 5a, 5b, and 5c as its constituent elements. The sub pixel elements 5a and 5b are electrically connected to each other at the substantially central area of the gap space therebetween via the connection portion 35 that is configured as a narrow path. In addition, the sub pixel elements 5b and 5c are also electrically connected to each other at the substantially central area of the gap space therebetween via another connection portion 35 that is also configured as a narrow path. These sub pixel elements 5a, 5b, and 5c, which are electrically connected to one another by means of these connection portions 35, make up one pixel electrode 5 that is elongated in the column direction (Y). Each individual region at which the sub pixel element 5a, 5b, or 5c is provided is sometimes called as a sub dot. As illustrated in FIG. 18A, open gap regions that are provided both on the left and right of each of the connection portions 35 constitute "cutout" spaces that are not covered by the pixel electrode 5. Each of the cutout portions functions as a slit that generates an oblique electric field for controlling the orientation of liquid crystal molecules in the VA mode operations. In the illustrated example, each of the sub pixel elements 5a, 5b, and 5c is configured to have a substantially square shape; and in addition thereto, each of four corners thereof is rounded into an arc shape.

As illustrated in FIG. 18A, the TFD element 44 is provided at one corner of the center sub pixel element 5b of each of the pixel electrodes 5 formed on the element substrate 91. The TFD element 44 has a so-called "back-to-back" configuration. That is, as illustrated in its partial enlarged view FIG. 18C, each of the TFD elements 44 is made up of two TFD element components (i.e., sub-elements) 44a and 44b that are electrically connected in series in reversed polarity. Each of the TFD element components 44a and 44b is configured to have a laminated electrode structure. Specifically, when viewed from the translucent-substrate-(54)-side, each of the TFD element components 44a and 44b is made up of a first electrode made of Ta non-alloy or Ta alloy, an anode oxide film formed on the first electrode (i.e., Ta oxide), and a second electrode formed on the anode oxide film, where the second electrode is made of Cr non-alloy or Cr alloy. Each of the TFD elements 44 turns into an ON state when a voltage of a predetermined level or greater is applied between the first electrode and the second electrode. The first electrode of the first TFD element component 44a of each of the TFD elements 44 is electrically connected to the corresponding one of the data lines 57. On the other hand, the second electrode of the second TFD element component 44b of each of the TFD elements 44 is connected to the center sub pixel element 5b of the corresponding one of the pixel electrodes 5 in an electrically conductive manner through a connection line portion 76, which extends from the above-mentioned second electrode thereof, and a contact hole 77. The contact hole 77 is formed at the substantially central position of each of the center sub pixel elements 5b.

As understood from FIGS. 18A and 18B, each of the slits 93 formed in the common electrode 71 as shown in FIG. 19, which functions as an alignment control means, is provided at the substantially central position of the corresponding one of the sub pixel elements 5a, 5b, and 5c, which is viewed along a normal direction with respect to the substrate in two dimensions. With such a configuration, the liquid crystal molecules become tilted in a direction from the center of each of the sub pixel elements 5a, 5b, and 5c toward the sides (i.e., edges) thereof when an ON voltage is applied to the liquid crystal. Each of the slits 93 has the shape of a circle in a plan view taken along the normal direction with respect to the substrate. Such circular slits 93 make it possible to obtain the radial orientation of the liquid crystal molecules around each of the slits 93. That is, in a plan view, the orientation direction of the liquid crystal molecules varies in a progressive manner in the angular range of three hundred and sixty (360°) degrees with each of the slits 93 being the center of the radial orientation thereof. By this means, it is possible to form a so-called "multi-domain" in a stable manner. Notwithstanding the foregoing, the shape of each of the slits 93 may be modified into any arbitrary one as long as the orientation of the liquid crystal molecules is controlled in a certain alignment direction.

Next, the layout of a light shielding film according to the present embodiment of the invention is described below. As illustrated in FIGS. 18A and 18B, a light shielding film according to the present embodiment of the invention is formed in an initially split configuration; that is, the light shielding film portion 60 is formed on the element substrate 91, whereas the light shielding film portion 70 is formed on the color filter substrate 92. The light shielding film portion 60, which is formed on the element substrate 91, is provided on a gap region between the sub pixel element 5a and the sub pixel element 5b as well as a gap region between the sub pixel element 5b and the sub pixel element 5c in each of the pixel electrodes 5. Each of the element-substrate-side light shielding films 60 is formed to have an elongated dot ("island") pattern extending in the row direction (X) each between two adjacent data lines 57. The plurality of element-substrate-side light shielding films 60 is arrayed to form "perforated" lines along the row direction (X) with the data lines 57 extending in the orthogonal direction thereof to cut each of the light-shielding lines. The element-substrate-side light shielding film 60 extends in a direction along the short sides of each of the pixel electrodes 5 (in the illustrated example, latitudinal direction of each of the pixel electrodes 5). In other words, the element-substrate-side light shielding film 60 extends in a direction along the short sides of each of the sub pixels P, that is, the row direction (X).

The element-substrate-side light shielding film 60 is formed both on a gap region which covers the connection portion 35 between the sub pixel element 5a and the sub pixel element 5b in each of the pixel electrodes 5 and on a gap region which does not cover the connection portion 35 between the sub pixel element 5a and the sub pixel element 5b in each of the pixel electrodes 5; and in addition, the element-substrate-side light shielding film 60 is also formed both on a gap region which covers the connection portion 35 between the sub pixel element 5b and the sub pixel element 5c in each of the pixel electrodes 5 and on a gap region which does not cover the connection portion 35 between the sub pixel element 5b and the sub pixel element 5c in each of the pixel electrodes 5. Since the element-substrate-side light shielding films 60 are formed on the same substrate as that of the pixel electrodes 5, it is possible to provide the element-substrate-side light shielding films 60 at accurate positions with respect to the pixel electrodes 5.

The layer structure of the element-substrate-side light shielding film 60 is the same as the partial lamination structure of the TFD element 44, specifically, a lamination of the first electrode and the anode oxide film. For example, the element-substrate-side light shielding film 60 is configured as a lamination of Ta oxide formed on Ta. Although it is possible to form the element-substrate-side light shielding film 60 by means of a dedicated material that is not common to the material of the TFD element 44, it is advantageous to use the same lamination structure as that of the TFD element 44 as described above because, if the same lamination structure is adopted, it is possible to use the same material both for the element-substrate-side light shielding film 60 and the TFD element 44 and thus to simplify their manufacturing process. Notwithstanding the foregoing, the element-substrate-side light shielding film 60 may be configured as a Ta monolayer, a Cr monolayer, or the like.

The light shielding film portion 70, which is provided on the color filter substrate 92, is formed in a grid pattern so as to surround each of the sub pixels P. That is, the color-filter-substrate-side light shielding film 70 has a linear portion that extends in the row direction (X) and a linear portion that extends in the column direction (Y), where the former portion and the latter portion intersect with each other. The color-filter-substrate-side light shielding film 70 is formed to block a gap region between each two of the plurality of sub pixels P that are arrayed adjacent to each other along the row direction (X) and a gap region between each two of the plurality of sub pixels P that are arrayed adjacent to each other along the column direction (Y). When the element substrate 91 and the color filter substrate 92 are adhered to each other, each of both ends along the row direction (X), that is, the left end and the right end, of each of the element-substrate-side light shielding films 60 becomes in contact with the corresponding inner side of the longitudinal portion, which extends in the column direction (Y), of the color-filter-substrate-side light shielding film 70, which is provided on the counter substrate opposed to the element substrate 91, that is, the color filter substrate 92. In the configuration described above, it is preferable that each of both ends along the row direction (X) of each of the element-substrate-side light shielding films 60 should become in contact with the corresponding inner side of the longitudinal portion of the color-filter-substrate-side light shielding film 70 with no clearance being left therebetween.

The color-filter-substrate-side light shielding film 70 is formed in a so-called grid pattern. Specifically, the grid-arrayed color-filter-substrate-side light shielding film 70 has, in the illustrated example, a longitudinal portion that extends in a direction along the long sides of each of the pixel electrodes 5 (longitudinal direction of each of the pixel electrodes 5) that are provided on the element substrate 91, which is the counter substrate opposed to the color filter substrate 92 in which color-filter-substrate-side light shielding film 70 is provided. In other words, the grid-arrayed color-filter-substrate-side light shielding film 70 has the longitudinal portion that extends in a direction along the long sides of each of the sub pixels P, that is, the column direction (Y). In addition, the grid-arrayed color-filter-substrate-side light shielding film 70 further has, in the illustrated example, a latitudinal portion that extends in a direction along the short sides of each of the pixel electrodes 5 (latitudinal direction of each of the pixel electrodes 5). In other words, the grid-arrayed color-filter-substrate-side light shielding film 70 has the latitudinal portion that extends in a direction along the short sides of each of the sub pixels P, that is, the row direction (X). The longitudinal portion of the color-filter-substrate-side light shielding film 70 and the latitudinal portion thereof intersect with each other. The color-filter-substrate-side light shielding film 70 may be made of a photosensitive resin material having a light shutting property, where the photosensitive resin material is subjected to patterning treatment by means of a photolithography technique so as to form the color-filter-substrate-side light shielding film 70. Or, the color-filter-substrate-side light shielding film 70 may be made of two or three color components of the coloration films 69R, 69G, and 69B that make up the color filter, which are deposited one on another. As another non-limiting example of light shielding film formation methods/materials, the color-filter-substrate-side light shielding film 70 may be made of a light-shutting metal material, which is subjected to patterning treatment by means of a photo etching technique. As a few examples of the light-shielding metal material, tantalum (Ta) non-alloy, Ta alloy, chromium (Cr) non-alloy, or Cr alloy may be used though not limited thereto. In the present embodiment of the invention, it is assumed that the light shielding film 70 is configured by overlaying at least one coloration film 69 on another coloration film 69, where the above-mentioned at least one coloration film 69 and the above-mentioned another coloration film 69 have colors different from each other or one another.

As a result of the adhesion of the element substrate 91 that is illustrated in FIG. 18A to the color filter substrate 92 that is illustrated in FIG. 18B, the color-filter-substrate-side light shielding film 70 is arrayed so as to surround each of the pixel electrodes 5 provided on the element substrate 91. In addition thereto, each of both ends along the row direction (X) of each of the element-substrate-side light shielding films 60 becomes in contact with the corresponding inner side of the longitudinal portion of the color-filter-substrate-side light shielding film 70, which extends in the column direction (Y). By this means, the entire gap region around each of the sub pixels P is light-shielded by the color-filter-substrate-side light shielding film 70, while, on the other hand, the entire gap region between each two of the plurality of sub pixel elements 5a, 5b, and 5c that are arrayed adjacent to each other in each of the plurality of the sub pixels P is light-shielded by the element-substrate-side light shielding film 60. It is prior art to provide the light shielding film portion 70 at a gap region between the sub pixels P that are arrayed adjacent to one another in the row direction (X) and a gap region between the sub pixels P that are arrayed adjacent to one another in the column direction (Y) as illustrated in FIG. 18B. In contrast, in the prior art configuration, the light shielding film portion 60 has not been provided in gap regions between the sub pixel element 5a and the sub pixel element 5b as well as between the sub pixel element 5b and the sub pixel element 5c that are arrayed adjacent to each other in each of the plurality of the sub pixels P as illustrated in FIG. 18A so far.

In the operation of the VA mode liquid crystal device, an oblique electric field is generated in a gap region between the sub pixel element 5a and the sub pixel element 5b as well as a gap region between the sub pixel element 5b and the sub pixel element 5c. The generated oblique electric field specifies the tilting orientation of the liquid crystal molecules. The gap region where an oblique electric field is generated is susceptible to the leakage of light. For this reason, in the configuration of a liquid crystal device of prior art, which does not have the light shielding film portion corresponding to the above-mentioned gap region between the sub pixel elements, the problem of a contrast decrease is likely to occur due to the leakage of light, which could eventually degrade the quality of image display. In contrast, in the configuration of a liquid crystal device according to the present embodiment of the invention, the element-substrate-side light shielding film portion 60 is provided on a gap region between the sub pixel element 5a and the sub pixel element 5b as well as a gap region between the sub pixel element 5b and the sub pixel element 5c. With such a unique configuration, it is possible to effectively prevent light from leaking through each gap region between these two sub pixel elements adjacent to each other. Therefore, it is further possible to prevent contrast from being decreased due to the leakage of light. As a result thereof, advantageously, the invention offers an enhanced image quality.

In each of the sub pixels P illustrated in FIGS. 18A and 18B as well as FIG. 19, each area where the pixel electrode 5 and the common electrode 71 overlap each other in a plan view taken along the normal direction with respect to the substrate constitutes a display region. Among these display regions, a planar region on which the light reflective film 95 is provided constitutes a reflective mode display region R, whereas a planar region on which the light reflective film 95 is not provided, and thus light transmits therethrough, constitutes a transmissive mode display region T. In the exemplary configuration according to the present embodiment of the invention, since the light reflective film 95 is provided at a region corresponding to each of the center sub pixel elements 5b, the reflective mode display region R is formed at the center area of each of the plurality of sub pixels P, which is sandwiched between two of the transmissive mode display regions T formed at both longitudinal end regions thereof. Each of the TFD elements 44 is connected to the corresponding one of the pixel electrodes 5 in an electrically conductive manner through the contact hole 77 that is formed at the center sub pixel element 5b thereof, which constitutes the reflective mode display region R.

The liquid-crystal-side surface of the resin film 94, which lies under the light reflective film 95, has been subjected to a photolithography treatment so as to form a rugged concavo-convex pattern thereon. Accordingly, the light reflective film 95 formed thereon also has a rugged concavo-convex pattern. Thanks to the rugged concavo-convex pattern, reflected light is scattered to a moderate degree, which ensures a desirable luminous reflection characteristics.

As illustrated in FIG. 18B and FIG. 19, the layer thickness adjustment film 96 that is formed on the color filter substrate 92 extends in the row direction (X) inside the reflective mode display region R. The layer thickness adjustment film 96 is made of an organic film such as acryl resin, or the like. The layer thickness adjustment film 96 is formed to protrude (i.e., is raised/elevated) inward, that is, toward the liquid crystal layer 13. With such a configuration, a layer thickness $d_0$ of the liquid crystal layer 13 in the reflective mode display region R is smaller than a layer thickness $d_1$ of the liquid crystal layer 13 in the transmissive mode display region T. As an exemplary configuration thereof, the layer thickness $d_1$ of the liquid crystal layer 13 in the transmissive mode display region T is within a range of 4-6 μm, whereas the thickness of the layer thickness adjustment film 96 is within a range of 2-3 μm. In such a configuration, the layer thickness $d_0$ of the liquid crystal layer 13 in the reflective mode display region R is configured to be approximately one half of the layer thickness $d_1$ of the liquid crystal layer 13 in the transmissive mode display region T. Each of the edge portions of the layer thickness adjustment film 96 viewed in the column direction (Y), or in other words, each of the edge portions of the layer thickness adjustment film 96 extending in the row direction (X), is configured as elevation surface. The elevation surface is slanted in such a manner that the thickness thereof changes gradually because of its inclination.

The connection portion 35 that connects the sub pixel element 5a and the sub pixel element 5b of each of the pixel electrodes 5 is formed at a region corresponding to one elevation surface, that is, one slanted surface, of the layer thickness adjustment film 96. In addition, the connection portion 35 that connects the sub pixel element 5b and the sub pixel element 5c of each of the pixel electrodes 5 is formed at a region corresponding to the other slanted elevation surface of the layer thickness adjustment film 96.

In the exemplary configuration of the present embodiment of the invention, since the layer thickness adjustment film 96 is formed in the reflective mode display region R, the layer thickness of the liquid crystal layer 13 in the reflective mode display region R is configured to be approximately one half of the layer thickness of the liquid crystal layer 13 in the transmissive mode display region T. With such a configuration, it is possible to make retardation in the reflective mode display region R substantially equal to retardation in the transmissive mode display region. By this means, it is possible to enhance contrast. In addition, because the layer thickness adjustment film 96 is formed to protrude toward the liquid crystal layer 13, and further because the elevation surface of the layer thickness adjustment film 96 is formed as a slanted surface, liquid crystal molecules that are vertically aligned in their initial orientation state have a pre-tilt in the proximity of the above-mentioned slanted surface in accordance with its inclination. By this means, it is possible to control the alignment direction of the liquid crystal molecules at the time of application of a voltage. Therefore, it is further possible to effectively prevent the leakage of light so as to achieve high-contrast display.

In the exemplary configuration of the present embodiment of the invention, the layer thickness adjustment film 96 is formed in the reflective mode display region R; and in addition, each of both edge faces of the layer thickness adjustment film 96 is configured as a slanted surface. With such a configuration, the invention makes it possible for a transflective vertically aligned (VA) mode liquid crystal device to perform well-balanced reliable display both in the reflective mode display region R and the transmissive mode display region T and to perform stable alignment control of liquid crystal molecules.

As illustrated in FIG. 19, the dimension of each of edge portions of the light reflective film 95 viewed along the column direction (Y), or in other words, the dimension of each of edge portions of the light reflective film 95 extending in the row direction (X), is greater than that of each of edge portions of the center sub pixel element 5b viewed along the column direction (Y) by a distance D. The width $W_0$ of the element-substrate-side light shielding film 60 formed on the element substrate 91 to cover a gap region between the sub pixel element 5a and the sub pixel element 5b of each of the pixel elements 5 as well as a gap region between the sub pixel element 5b and the sub pixel element 5c of each of the pixel elements 5 is configured to be smaller than the width $W_1$ of the above-mentioned gap region between each two of the plurality of sub pixel elements 5a, 5b, and 5c that are arrayed adjacent to each other in each of the pixel elements 5. According to the configuration described above, a clearance is formed at each inner marginal region next to the element-substrate-side light shielding film 60. Each of the clearances allows the edge portion of the light reflective film 95 to be visually observed through the coloration film 69. Such a configuration offers the advantageous effects of preventing any substantial decrease in a light reflection factor even in a case where some positional misalignment occurs between the element substrate 91 and the color filter substrate 92 when these substrates are adhered to each other.

First Embodiment of Electronic Apparatus

Figure 21:
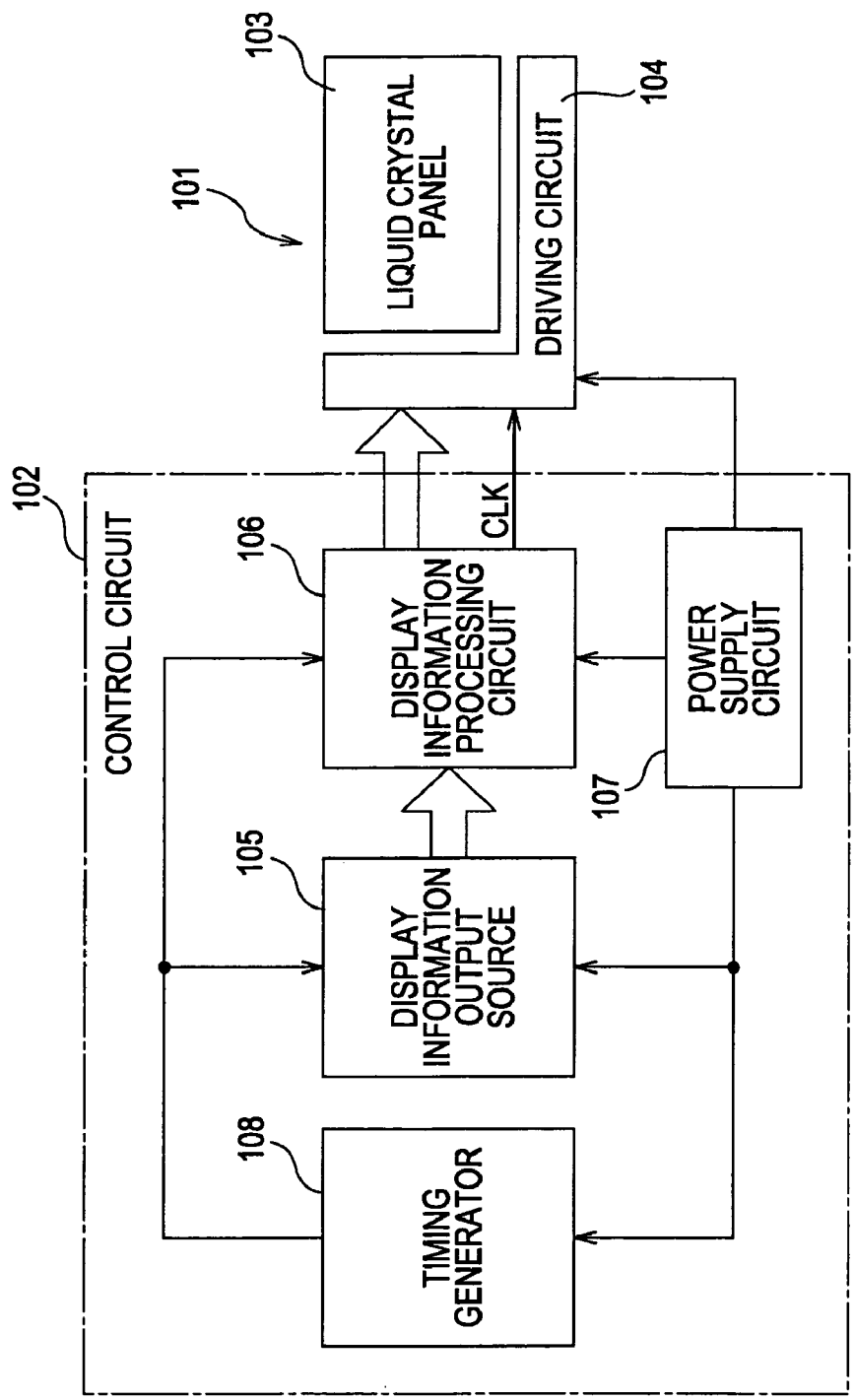
FIG. 21 is a block diagram that illustrates the configuration of an electronic apparatus according to an exemplary embodiment of the invention.

Next, an electronic apparatus according to an exemplary embodiment of the invention is explained below. Needless to say, the exemplary embodiment of the invention described below provides a mere example of application thereof without any intention to limit the technical scope of the invention. FIG. 21 is a block diagram that illustrates the configuration of an electronic apparatus according to an exemplary embodiment of the invention. The illustrated electronic apparatus is made up of a liquid crystal device 101 and a control circuit 102 that controls the liquid crystal device 101. The liquid crystal device 101 is provided with a liquid crystal panel 103 and a driving circuit 104. The control circuit 102 includes a display information output source 105, a display information processing circuit 106, a power supply circuit 107, and a timing generator 108.

The display information output source 105 has a memory such as a random access memory (RAM), a storage unit such as various kinds of discs, a tuned circuit that outputs a digital image signal, and the like. On the basis of various kinds of clock signals that are generated by the timing generator 108, the display information output source 105 supplies a variety of display information such as an image signal conforming to a certain image format, or the like, to the display information processing circuit 106.

The display information processing circuit 106 is provided with various kinds of well-known circuits including but not limited to an amplifier/inverter circuit, a rotation circuit, a gamma correction circuit, and a clamping circuit. The display information processing circuit 106 performs the processing of inputted display information so as to supply an image signal together with a clock signal CLK to the driving circuit 104. The driving circuit 104 collectively refers to a scanning line driving circuit, a data line driving circuit, an inspection circuit, though not limited thereto. The power supply circuit 107 functions to supply a predetermined power voltage to each of the constituent elements of the electronic apparatus described above.

As the liquid crystal device 101 of the electronic apparatus according to the present embodiment of the invention, for example, the liquid crystal device 1A described above with reference to FIGS. 1-4 can be adopted. In the configuration of the liquid crystal device 1A according to the foregoing exemplary embodiment of the invention, a light shielding film is provided on a gap region between each two of the plurality of sub pixel elements that are arrayed adjacent to each other in each of pixel electrodes that realize a vertically aligned (VA) mode. With such a unique configuration, the invention makes it possible to effectively prevent light from leaking through each gap region between these two sub pixel elements adjacent to each other. Therefore, the invention makes it further possible to prevent contrast from being decreased due to the leakage of light. As a result thereof, advantageously, the invention offers an enhanced image quality. Therefore, an electronic apparatus according to the present embodiment of the invention, which employs the liquid crystal device 1A as its constituent elements, also makes it possible to offer a high-quality image display.

Second Embodiment of Electronic Apparatus

Figure 22:
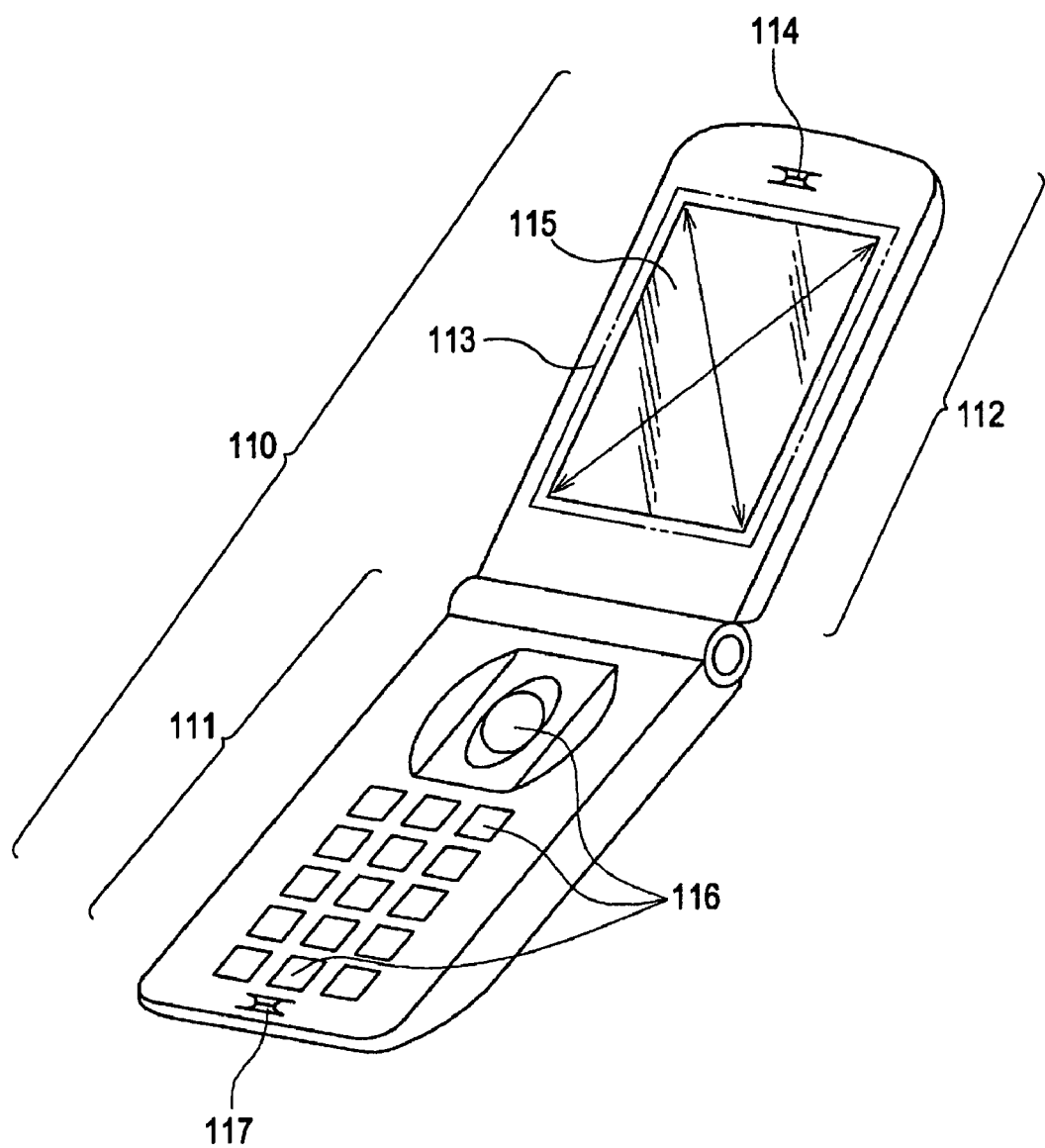
FIG. 22 is a perspective view that schematically illustrates the general appearance of a mobile phone, which is an electronic apparatus according to another exemplary embodiment of the invention.

FIG. 22 is a diagram that schematically illustrates the general appearance of a mobile phone, which is an electronic apparatus according to another exemplary embodiment of the invention. A mobile phone 110 illustrated in FIG. 22 has a main assembly unit portion 111 and a display unit portion 112. The display unit portion 112 can turn on a hinge to be opened/closed with respect to the main assembly unit portion 111. The display unit portion 112 has a display unit 113 and an earpiece unit 114. Various kinds of display information pertaining to telephone communication are displayed on a display screen 115 of the display unit 113. A control unit that controls the operation of the display unit 113 is built in either the main assembly unit portion 111 or the display unit portion 112. Such a display unit controller may be configured as a part of a central control unit that is responsible for controlling the entire operation of the mobile phone illustrated in the drawing. Or, alternatively, such a display unit controller may be configured as an individual unit that is separated from the central control unit. The main assembly unit portion 111 has manual operation buttons 116 and a mouthpiece unit 117.

As the display unit 113 of the electronic apparatus according to the present embodiment of the invention, for example, the liquid crystal device 1A described above with reference to FIGS. 1-4 can be adopted. In the configuration of the liquid crystal device 1A according to the foregoing exemplary embodiment of the invention, a light shielding film is provided on a gap region between each two of the plurality of sub pixel elements that are arrayed adjacent to each other in each of pixel electrodes that realize a vertically aligned (VA) mode. With such a unique configuration, the invention makes it possible to effectively prevent light from leaking through each gap region between these two sub pixel elements adjacent to each other. Therefore, the invention makes it further possible to prevent contrast from being decreased due to the leakage of light. As a result thereof, advantageously, the invention offers an enhanced image quality. Therefore, an electronic apparatus according to the present embodiment of the invention, which employs the liquid crystal device 1A as its constituent elements, also makes it possible to offer a high-quality image display.

Other Embodiment

Although an electronic apparatus having distinctively unique features of the present invention is described above while explaining a few preferred exemplary embodiments thereof, the invention should in no case be interpreted to be limited to the specific embodiments described above. The invention may be modified, altered, changed, adapted, and/or improved within a range not departing from the gist and/or spirit of the invention apprehended by a person skilled in the art from explicit and implicit description herein, where such a modification, an alteration, a change, an adaptation, and/or an improvement is also covered by the scope of the appended claims. Among a variety of electronic apparatuses to which a liquid crystal device having distinctively unique features of the invention is applicable are, other than the mobile phone described above, a handheld terminal, a PDA, a personal computer, a liquid crystal television, a video tape recorder of a viewfinder type or a direct monitor view type, a car navigation device, a pager, an electronic personal organizer, an electronic calculator, a word processor, a workstation, a videophone, a POS terminal, a digital still camera, an electronic book, and so forth.

What is claimed is:

1. A liquid crystal device comprising:
a pair of substrates;
a liquid crystal layer having a negative dielectric anisotropy, the liquid crystal layer being sandwiched between the pair of substrates;
a pixel electrode that is provided on the liquid crystal side of one of the pair of substrates;
a counter electrode that is provided on the liquid crystal side of the other of the pair of substrates, the counter electrode being opposed to the pixel electrode;
a vertical alignment film that aligns liquid crystal molecules of the liquid crystal layer in a direction in which the long axes of the liquid crystal molecules are oriented perpendicular to the pair of substrates; and
a light shielding film,
wherein the pixel electrode is made up of a plurality of island-pattern sub pixel elements each two adjacent ones of which are connected to each other via a connection portion having a width narrower than that of the sub pixel element; and
the light shielding film is formed, on at least one of the pair of substrates, at least in each region not corresponding to the connection portion between each two of the plurality of sub pixel elements that are adjacent to each other.

2. The liquid crystal device according to claim 1, wherein the light shielding film formed between each two of the plurality of sub pixel elements that are adjacent to each other has a portion that extends along, at least, a side of each of the island-pattern sub pixel elements; and the light shielding film formed between each two of the plurality of sub pixel elements that are adjacent to each other surrounds at least a part of the outer boundary of each of the island-pattern sub pixel elements.

3. The liquid crystal device according to claim 1, wherein the light shielding film is formed to have a planar shape that matches with that of a region between each two of the plurality of sub pixel elements that are adjacent to each other.

4. The liquid crystal device according to claim 1, wherein the light shielding film is formed on the above-mentioned one of the pair of substrates on which the pixel electrode is provided.

5. The liquid crystal device according to claim 4, wherein the width of the light shielding film is smaller than the width of the region between each two of the plurality of sub pixel elements that are adjacent to each other; and, in a plan view, a clearance is formed between a side of each of the sub pixel elements and the corresponding side of the light shielding film.

6. The liquid crystal device according to claim 1, wherein the light shielding film is formed on the above-mentioned other of the pair of substrates, which is opposed to the above-mentioned one of the pair of substrates on which the pixel electrode is provided.

7. The liquid crystal device according to claim 1, wherein a plurality of coloration films having colors different from each other or one another is provided on the above-mentioned other of the pair of substrates, which is opposed to the above-mentioned one of the pair of substrates on which the pixel electrode is provided; and the light shielding film is configured by overlaying at least one coloration film on another coloration film on the substrate.

8. An electronic apparatus that is provided with a liquid crystal device according to claim 1.

9. A liquid crystal device comprising:
a pair of substrates;
a liquid crystal layer having a negative dielectric anisotropy, the liquid crystal layer being sandwiched between the pair of substrates;
a pixel electrode that is provided on the liquid crystal side of one of the pair of substrates;
a counter electrode that is provided on the liquid crystal side of the other of the pair of substrates, the counter electrode being opposed to the pixel electrode;
a vertical alignment film that aligns liquid crystal molecules of the liquid crystal layer in a direction in which the long axes of the liquid crystal molecules are oriented perpendicular to the pair of substrates; and
a light shielding film,
wherein the pixel electrode is made up of a plurality of island-pattern sub pixel elements each two adjacent ones of which are connected to each other in a predetermined direction via a connection portion having a width narrower than that of the sub pixel element; and
the light shielding film, which has a first light shielding portion that extends in the predetermined direction along which the island-pattern sub pixel elements are connected to one another and further has a second light shielding portion that intersects with the first light shielding portion and protrudes from the first light shielding portion toward the connection portion, is provided on at least one of the pair of substrates in such a manner that the light shielding film does not cover each region corresponding to the connection portion.

10. The liquid crystal device according to claim 9, wherein the light shielding film does not cover a part of each of the sides of each of the island-pattern sub pixel elements; and the light shielding film has a cross shape.

11. A liquid crystal device comprising:
a pair of substrates;
a liquid crystal layer having a negative dielectric anisotropy, the liquid crystal layer being sandwiched between the pair of substrates;
a pixel electrode that is provided on the liquid crystal side of one of the pair of substrates;
a counter electrode that is provided on the liquid crystal side of the other of the pair of substrates, the counter electrode being opposed to the pixel electrode;
a vertical alignment film that aligns liquid crystal molecules of the liquid crystal layer in a direction in which the long axes of the liquid crystal molecules are oriented perpendicular to the pair of substrates; and
a light shielding film,
wherein the pixel electrode is made up of a plurality of island-pattern sub pixel elements each two adjacent ones of which are connected to each other via a connection portion having a width narrower than that of the sub pixel element; and
the light shielding film is formed, on at least one of the pair of substrates, in an entire region around each of the plurality of island-shaped sub pixel elements except each region corresponding to the connection portion.

* * * * *